(12) United States Patent
Uchiyama et al.

(10) Patent No.: US 11,589,198 B2
(45) Date of Patent: Feb. 21, 2023

(54) CONTROL APPARATUS, CONTROL METHOD, AND VEHICLE

(71) Applicant: SONY CORPORATION, Tokyo (JP)

(72) Inventors: Hiromasa Uchiyama, Tokyo (JP); Hiroaki Takano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 17/250,291

(22) PCT Filed: Jun. 21, 2019

(86) PCT No.: PCT/JP2019/024657
§ 371 (c)(1),
(2) Date: Dec. 28, 2020

(87) PCT Pub. No.: WO2020/008911
PCT Pub. Date: Jan. 9, 2020

(65) Prior Publication Data
US 2021/0266715 A1    Aug. 26, 2021

(30) Foreign Application Priority Data
Jul. 5, 2018 (JP) .............................. JP2018-128059

(51) Int. Cl.
*H04W 4/48* (2018.01)
*H04W 4/46* (2018.01)
*H04W 4/021* (2018.01)
*H04W 16/28* (2009.01)

(52) U.S. Cl.
CPC ............. *H04W 4/48* (2018.02); *H04W 4/021* (2013.01); *H04W 4/46* (2018.02); *H04W 16/28* (2013.01)

(58) Field of Classification Search
None
See application file for complete search history.

(56) References Cited

U.S. PATENT DOCUMENTS

| 2011/0012756 A1 | 1/2011 | Yamamoto | |
| 2014/0162688 A1* | 6/2014 | Edge | H04W 4/06 |
| | | | 455/456.1 |

FOREIGN PATENT DOCUMENTS

| EP | 2252111 A1 | 11/2010 | |
| JP | 2013-51520 A | 3/2013 | |
| JP | 2014-090376 A | 5/2014 | |
| WO | 2009/110465 A1 | 9/2009 | |
| WO | WO-2018168169 A1 * | 9/2018 | ........... H04L 1/1642 |

OTHER PUBLICATIONS

International Search Report and Written Opinion of PCT Application No. PCT/JP2019/024657, dated Sep. 10, 2019, 07 pages of ISRWO.

* cited by examiner

*Primary Examiner* — Khalid W Shaheed
(74) *Attorney, Agent, or Firm* — Chip Law Group

(57) ABSTRACT

Provided are a control apparatus, a control method, and a vehicle that realize highly reliable communication. The control apparatus includes a position prediction unit that predicts a position of an own terminal having a communication function, an information acquisition unit that acquires geographic information around the position of the own terminal, and a communication control unit that controls communication with another terminal by controlling a communication target, a communication method, and communication parameters on the basis of the geographic information.

17 Claims, 29 Drawing Sheets

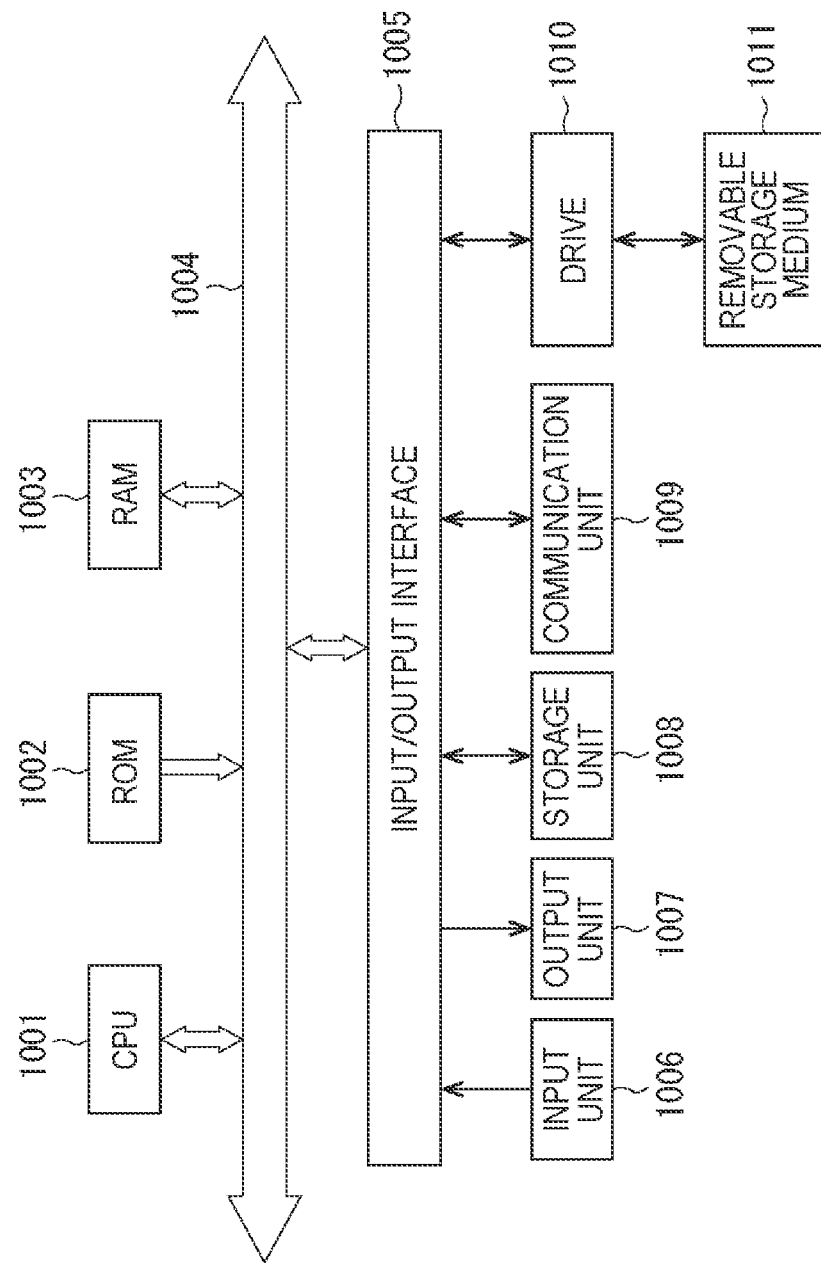

CONTROL APPARATUS, CONTROL METHOD, AND VEHICLE

CROSS REFERENCE TO RELATED APPLICATIONS

This application is a U.S. National Phase of International Patent Application No. PCT/JP2019/024657 filed on Jun. 21, 2019, which claims priority benefit of Japanese Patent Application No. JP 2018-128059 filed in the Japan Patent Office on Jul. 5, 2018. Each of the above-referenced applications is hereby incorporated herein by reference in its entirety.

TECHNICAL FIELD

The present disclosure relates to a control apparatus, a control method, a vehicle, and a program, and more particularly to a control apparatus, a control method, a vehicle, and a program that realize reliable communication in a vehicle.

BACKGROUND ART

In recent years, in-vehicle communication has been attracting attention in order to realize future automatic driving.

Among in-vehicle communication, there has been proposed an in vehicle-to-vehicle communication in which communication parameters are determined according to surrounding environments obtained from a sensor or the like (see Patent Document 1).

CITATION LIST

Patent Document

Patent Document 1: Japanese Patent Application Laid-Open No. 2013-51520

SUMMARY OF THE INVENTION

Problems to be Solved by the Invention

However, in the technique of Patent Document 1, since the communication parameters are only switched, it is not possible to sufficiently improve the reliability of the communication only by switching the communication parameters in consideration of geographical influences, and there is a possibility that delay or the like occurs.

The present disclosure has been made in view of such a situation, and in particular, by controlling communication on the basis of geographical information, highly reliable communication is realized.

Solutions to Problems

A control apparatus and a vehicle according to an aspect of the present disclosure is a control apparatus and a vehicle including: a position prediction unit that predicts a position of an own terminal having a communication function; an information acquisition unit that acquires geographic information around the position of the own terminal predicted by the position prediction unit; and a communication control unit that controls communication between the own terminal and another terminal having the communication function other than the own terminal on the basis of the geographic information.

A control method according to an aspect of the present disclosure is a control method including: position prediction processing of predicting a position of an own terminal having a communication function; information acquisition processing of acquiring geographic information around the position of the own terminal predicted by the position prediction processing; and communication control processing of controlling communication between the own terminal and another terminal having the communication function other than the own terminal on the basis of the geographic information.

A program according to an aspect of the present disclosure is a program causing a computer to function as: a position prediction unit that predicts a position of an own terminal having a communication function; an information acquisition unit that acquires geographic information around the position of the own terminal predicted by the position prediction unit; and a communication control unit that controls communication between the own terminal and another terminal having the communication function other than the own terminal on the basis of the geographic information.

According to an aspect of the present disclosure, a position of an own terminal having a communication function is predicted; geographic information around the position of the own terminal predicted is acquired; and communication between the own terminal and another terminal having the communication function other than the own terminal is controlled on the basis of the geographic information.

Effects of the Invention

According to one aspect of the present disclosure, it is possible to realize highly reliable communication, in particular, by controlling communication on the basis of geographical information.

BRIEF DESCRIPTION OF DRAWINGS

FIG. 29 is a diagram explaining a configuration example of a general-purpose computer.

MODE FOR CARRYING OUT THE INVENTION

Figure 1:
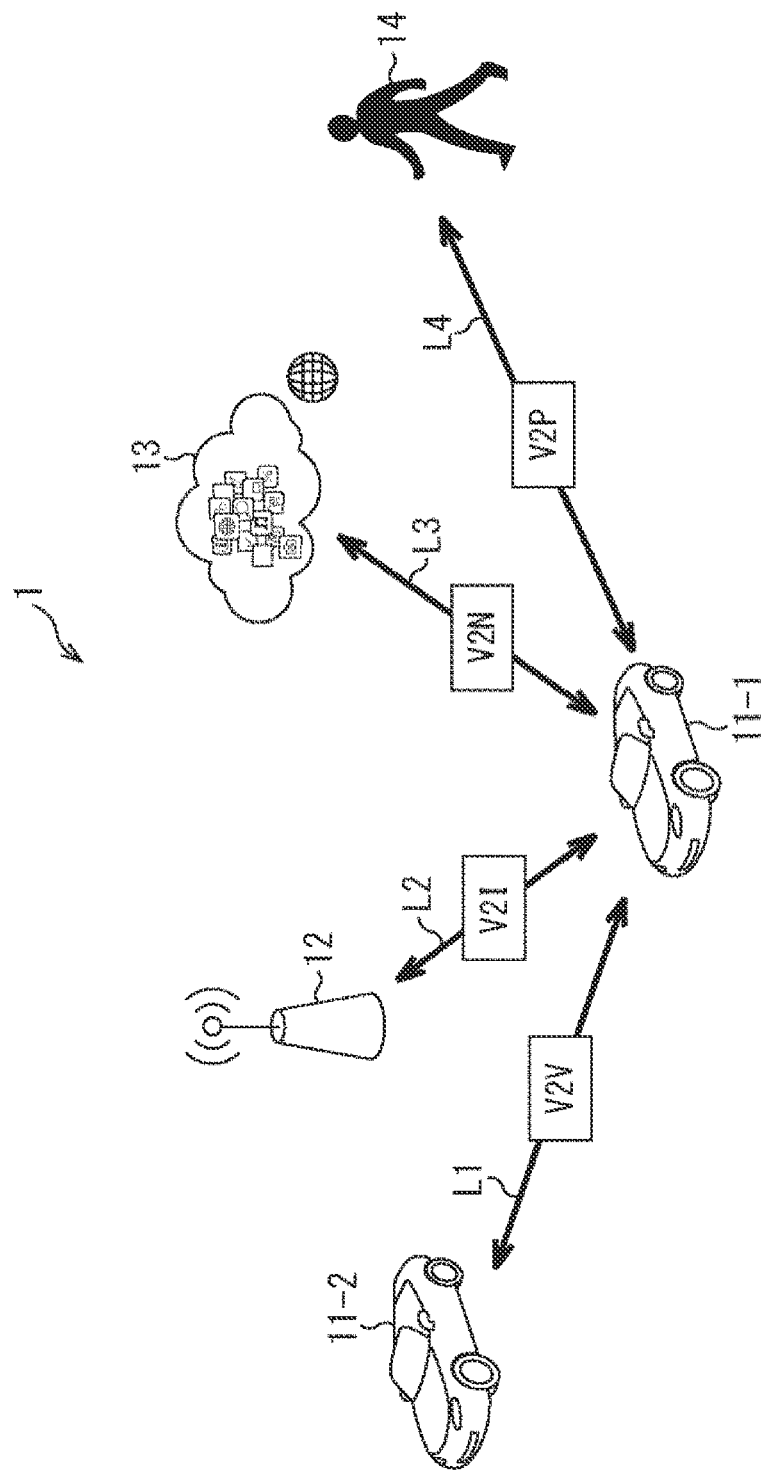
FIG. 1 is a diagram explaining V2X communication, which is an overview of the present disclosure.

Preferred embodiments of the present disclosure will be described in detail below with reference to the accompanying drawings. Note that, in this description and the drawings, configuration elements that have substantially the same function and configuration are denoted with the same reference numerals, and repeated explanation is omitted.

Modes for carrying out the present technology are described below. The description is provided in the following order.

1. Overview of the present disclosure
2. First Embodiment
3. Second Embodiment
4. Third Embodiment
5. Example of execution by software 1. Overview of the Present Disclosure In explaining the present disclosure, first, the overview of the present disclosure will be described.

In order to realize automatic driving in future, expectations for in-vehicle communication (V2X communication) have been increasing in recent years. The V2X communication is an abbreviation for Vehicle to X communication, and is communication performed between a vehicle and X (=communication target: hereinafter, simply referred to as communication target X).

The communication target X here includes, for example, a vehicle, an infrastructure, a network, a pedestrian, and the like, as shown in FIG. 1.

In a case where the communication target X is a vehicle, that is, communication L1 between vehicles 11-1 and 11-2 in FIG. 1 is referred to as vehicle to vehicle (V2V) communication.

Note that in the case where the communication target X is a vehicle 11, description will be made assuming that the vehicle 11 itself is a terminal having a communication function, but, for example, it also includes a mobile terminal represented by a smartphone possessed by a passenger (driver) of the vehicle 11.

Furthermore, hereinafter, in a case where it is not necessary to distinguish vehicles 11-11 to 11-13, they are simply referred to as the vehicle 11, and other configurations are also referred to in a similar manner.

Moreover, in a case where the communication target X is a road side unit (RSU) as an infrastructure provided along a road or at an intersection where the vehicle 11 travels, that is, for example, communication L2 between an RSU 12 and the vehicle 11 in FIG. 1 is called vehicle to infrastructure (V2I) communication.

Note that in a case where the communication target X is the RSU 12, description will be made assuming that the RSU 12 is a terminal having a communication function and provided along a road or at an intersection.

Furthermore, in a case where the communication target X is a network represented by a cloud computer, a network server, or the like, that is, for example, communication L3 between a network 13 and the vehicle 11 in FIG. 1 is called vehicle to network (V2N) communication.

Note that in a case where the communication target X is the network 13, description will be made assuming that it is a server computer on the network.

Moreover, in a case where the communication target X is a pedestrian (a terminal possessed by the pedestrian), that is, for example, communication L4 between a pedestrian 14 and the vehicle 11 in FIG. 1 is called vehicle to pedestrian (V2P) communication.

Note that in a case where the communication target X is the pedestrian 14, description will be made assuming that the pedestrian 14 is not a pedestrian itself, but a terminal having a communication function possessed by the pedestrian 14.

That is, in the following description, regardless of whether the communication target X is any of the vehicle 11, the RSU 12, the network 13, and the pedestrian 14, description will be made assuming that the communication target X is a terminal or computer having a communication function.

<Outline of V2X Communication System>

Figure 2:
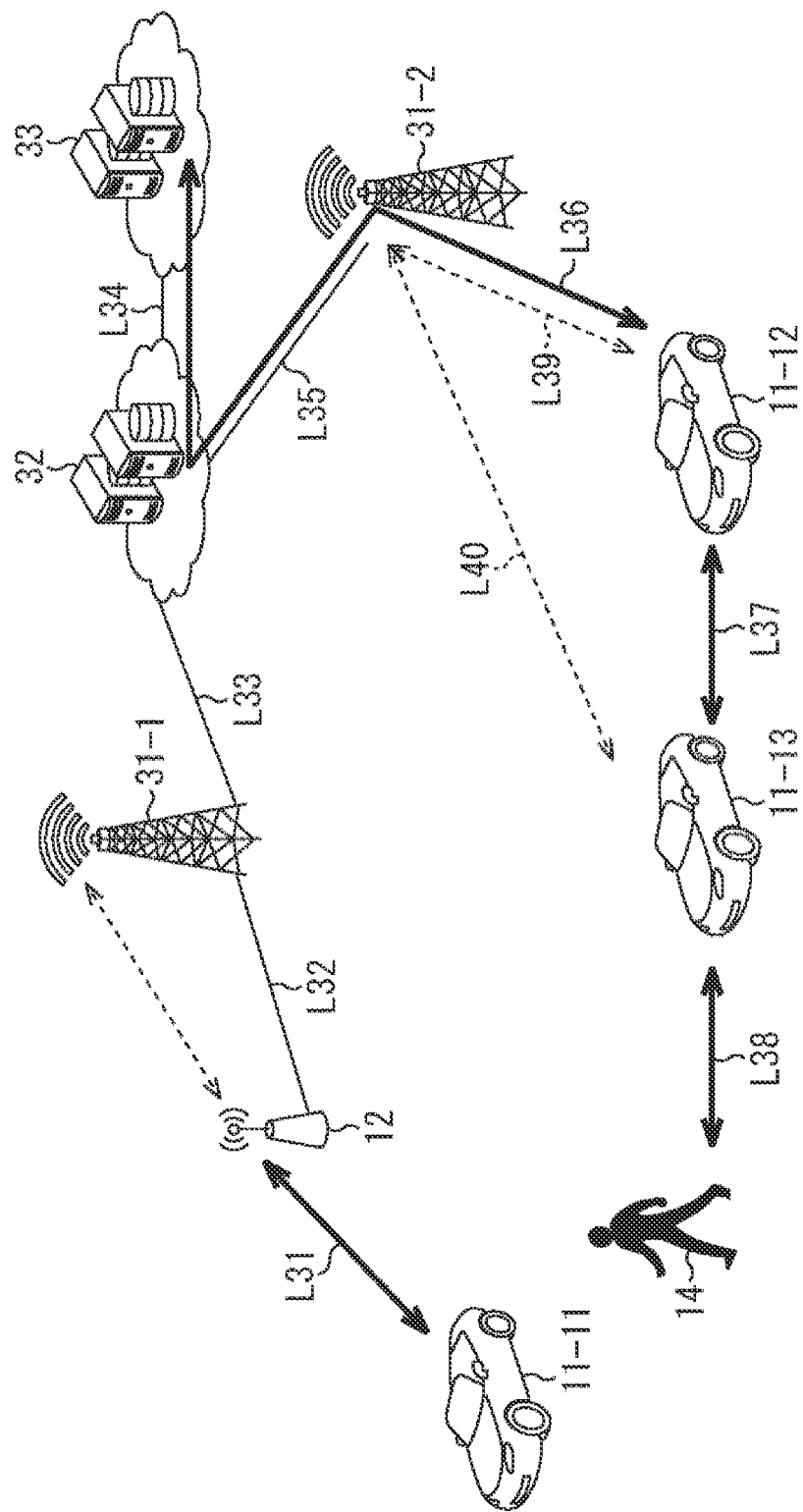
FIG. 2 is a diagram explaining an example of a system configuration that realizes V2X communication.

The outline of a V2X communication system has a configuration in which the communication modes (V2V communication, V2I communication, V2N communication, V2P communication) with the various communication targets X described above are combined, for example, the configuration shown in FIG. 2.

The V2X communication system of FIG. 2 includes the vehicles 11-11 to 11-13, the RSU 12, the network 13, the pedestrian 14, and base stations 31-1, 31-2.

The network 13 of FIG. 1 includes a V2X control server 32 and an application management server 33 of FIG. 2.

The V2X control server 32 functions as a core network server and controls mutual communication for the vehicles 11-11 to 11-13, the RSU 12, the network 13, the pedestrian 14, and the base stations 31-1, 31-2 via communication L31 to L40.

The application management server 33 manages application programs installed on each terminal of the vehicles 11-11 to 11-13 and the pedestrian 14. The application management server 33 causes the vehicle 11-12 to download the application programs and manages updates and the like via, for example, the communication L34 to L36.

The base stations 31-1, 31-2 realize Uu link communication (inter-base station communication). For example, in FIG. 2, the base station 31-2 realizes mutual communication between the base station 31-2 and each of the vehicles 11-12, 11-13 via the communication L39, L40 including Uu (inter-base station) link communication.

Note that, for the vehicles 11-12, 11-13, the Uu link communication is realized by the communication L39 and L40, the V2V communication as indicated by the communication L37 is realized, and further the V2P communication with the pedestrian 14 as indicated by the communication L38 is realized. Therefore, the communication targets X may be configured to communicate with each other in a plurality of communication modes.

The RSU 12 is provided along the road, at an intersection, or the like where the vehicle 11 travels, and connects the network 13 and the vehicle 11 to communicate with each other via the base station 31-1. The RSU 12 causes the vehicle 11-11 to download the application program from the application management server 33 or accepts the data relay via, for example, the communication L31 to L34.

The RSU 12 has a base station type having a function similar to that of the base station 31 and a user equipment (UE) type having a function similar to the terminal provided in the vehicle 11.

(LTE-Based V2X Use Case)

As wireless communication for automobiles, the development of IEEE802.11p-based dedicated short range communication (DSRC) has been mainly promoted, but in recent years, "LTE-based V2X", which is long term evolution (LTE)-based in-vehicle communication (V2X communication), has been standardized.

In LTE-based V2X communication, for example, the exchange of basic safety messages and the like is supported.

There are various examples of V2X communication use case regarding each of the V2V communication, the V2I communication, the V2N communication, and V2P communication.

Since the V2V communication is communication between the vehicles 11, for example, there are use cases such as, on the basis of mutual information of the vehicles 11, forward vehicle proximity alert, intersection collision prevention warning, emergency vehicle warning, overtaking stop warning, and road construction warning, and collaborative control processing during platooning.

The forward vehicle proximity alert is an alert presented when the proximity of a forward vehicle is detected.

The intersection collision prevention warning is a warning presented to prevent a collision between vehicles entering an intersection.

An emergency vehicle proximity warning is a warning presented when the proximity of an emergency vehicle is detected.

The overtaking stop warning is a warning presented to urge the driver to stop overtaking when the proximity of a rear vehicle in the lane to which the vehicle moves is detected immediately before the lane change for overtaking. The road construction warning warns of road construction ahead.

Moreover, the collaborative control processing during platooning is control for traveling while the positional relationship of a platooning state of a plurality of vehicles is maintained.

Furthermore, the V2I communication is communication with an infrastructure, for example, the RSU 12. Therefore, as use cases of the V2I communication, for example, there are use cases that it is used for distribution of road safety information distributed from a server, use of traffic light cooperation, presentation of assistance information for searching parking lot information (parking lot assistance), and billing processing (billing).

Moreover, the V2N communication is communication with the network 13. Therefore, as use cases of the V2N communication, for example, there are use cases that it is used for navigation by providing a dynamic map described later, it transmits control information to realize remote driving, it distributes content for use as entertainment in a car, or the like.

Furthermore, the V2P communication is communication with a terminal possessed by the pedestrian 14. Therefore, as use cases of the V2P communication, for example, there are use cases that it notifies a terminal of the pedestrian 14, who is a vulnerable road user with visual or hearing impairment, of a vulnerable road user warning to support walking of the vulnerable road user.

(NR V2X Communication Use Case)

On the other hand, with the aim of further improving the V2X communication, NR V2X communication using 5th generation (5G) technology (NR: New Radio) has been studied in recent years.

The NR V2X communication supports new use cases that require high reliability, low latency, high speed communication, and high capacity that LTE-based V2X communication could not previously support.

In the above example, use cases where high effect is expected by using the NR V2X communication include, for example, provision of a dynamic map, remote driving, and the like. In addition to this, there are use cases including sensor data sharing that exchanges sensor data by the V2V communication (vehicle-to-vehicle communication) and the V2I communication (vehicle to infrastructure communication), and platooning for platooning. Such use cases and requirements of the NR V2X communications are described in 3GPP TR22.886.

Typical use cases of the NR V2X communications include vehicles platooning, extended sensors, advanced driving, and remote driving.

The vehicles platooning is a use case of platooning in which a plurality of vehicles forms a platoon and travels in the same direction, and is a technology for exchanging information for controlling the platooning with the car leading the platooning. By exchanging such information, it becomes possible to further reduce the inter-vehicle distance of the platooning.

The extended sensors is a technology enabling exchanging of sensor-related information (raw data before data processing and processed data) between vehicles, for example. The sensor-related information is collected through local sensors, live video images between surrounding vehicles, RSUs, and pedestrians, the application management server 33, and the like. By exchanging these information, the vehicle 11 can obtain information that cannot be obtained by its own sensor information, and can acknowledge/recognize a wider range of environments. Communication requires a high data rate because a lot of information needs to be exchanged.

The advanced driving is a technology that enables semi-automatic traveling and fully automatic traveling. Each vehicle 11 can adjust the trajectory and operation of the vehicle 11 in synchronization and cooperation by sharing the acknowledgement/recognition information obtained from its own sensor or the like by the RSU with the surrounding vehicles. By using the advanced driving, each vehicle 11 can also share the intention and intent of driving with the surrounding vehicles.

The remote driving is a remote maneuvering technology that uses a remote maneuverer or an application program via the V2X communication. Remote manipulation is used for people who cannot drive or for dangerous areas. It is also possible to use cloud computing-based maneuver for public transportation where the route and the road to travel are fixed to some extent. High reliability and low transmission delay are required for communication.

(Physical layer enhancement) Further enhancement of a physical layer from LTE V2X is required to achieve the above requirements. Target links include the Uu link communication, which is a link between a terminal and an infrastructure such as the base station 31 and the road side unit (RSU) 12, and PC5 link, which is a link between terminals.

The main points of enhancement are, for example, channel format (flexible numerology, short transmission time interval (TTI), multi-antenna support, waveform, and the like), sidelink feedback communication (HARQ, channel status information (CSI)), and the like, sidelink resource allocation method, vehicle position information estimation technology, terminal-to-terminal relay communication, unicast communication, multicast communication support, multi-carrier communication, carrier aggregation, MIMO/beamforming, and high-frequency frequency support (example: 6 GHz or higher).

<V2X Operation Scenario>

Next, an example of an operation scenario of the V2X communication will be described with reference to FIGS. 3 and 4.

The V2N communication is simple because only download (DL)/upload (UL) communication between base station terminals is performed, but in the V2V communication, various communication paths can be considered.

Here, an example of an operation scenario using an example of the V2V communication is introduced, but a similar communication operation is also applicable for the V2P communication and the V2I communication. In that case, a communication destination is the pedestrian (terminal possessed by the pedestrian) 14 or the RSU 12.

Figure 3:
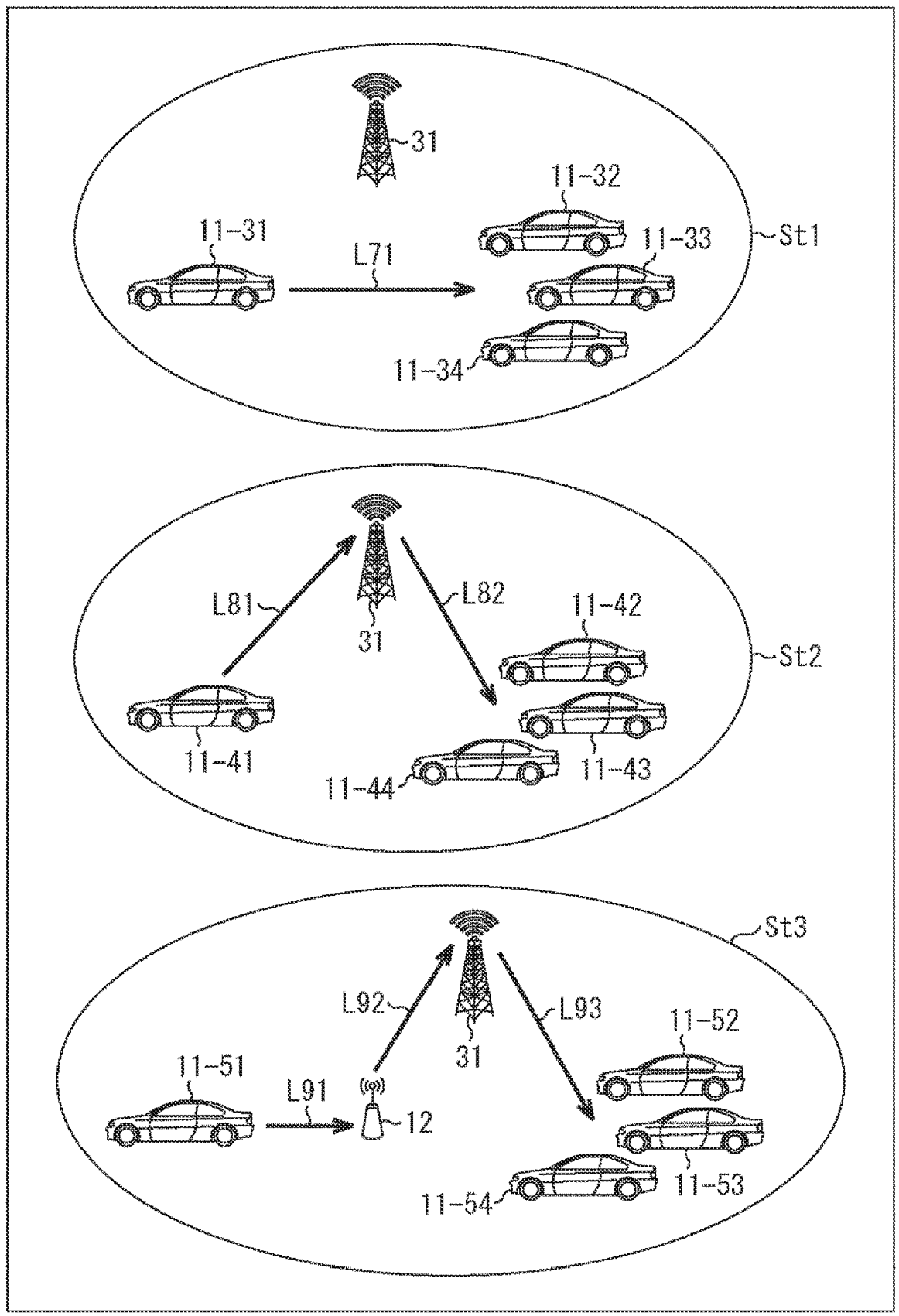
FIG. 3 is a diagram explaining a V2X operation scenario.

In a first scenario Sn1, for example, as shown in the upper part of FIG. 3, communication L71 including a terminal-to-terminal link (sidelink: PC5 link) is formed between a vehicle 11-31 and each of vehicles 11-32 to 11-34.

In the first scenario Sn1, the preceding vehicle 11-31 transmits information to the following vehicles 11-32 to 11-34 via the communication L71 including the terminal-to-terminal link (sidelink: PC5 link).

In a second scenario Sn2, for example, as shown in the middle part of FIG. 3, between a vehicle 11-41 and each of vehicles 11-42 to 11-44, communication L81, L82 including Uu links by an interface between the vehicles 11, which are terminals, are formed via the base station 31.

In the second scenario Sn2, the preceding vehicle 11-41 transmits information to the following vehicles 11-42 to 11-44 via the base station 31 using the communication L81, L82 including the Uu links.

In a third scenario Sn3, for example, as shown in the lower part of FIG. 3, between a vehicle 11-51 and each of vehicles 11-52 to 11-54, communication L91 including a terminal-to-terminal link (sidelink: PC5 link) between the vehicle 11-51 and the RSU 12 is formed, and between the RSU 12 and the base station 31 and between the base station 31 and the vehicles 11-52 to 11-54, communication L92, L93 including Uu links are formed.

Then, in the third scenario Sn3, the preceding vehicle 11-51 transmits information to the following vehicles 11-52 to 11-54 via the communication L91 including the terminal-to-terminal link (sidelink: PC5 link) between the vehicle 11-51 and the RSU 12, the communication L92 including the Uu link between the RSU 12 and the base station 31, and the communication L93 including the Uu link between the base station 31 and the vehicles 11-52 to 11-54.

Figure 4:
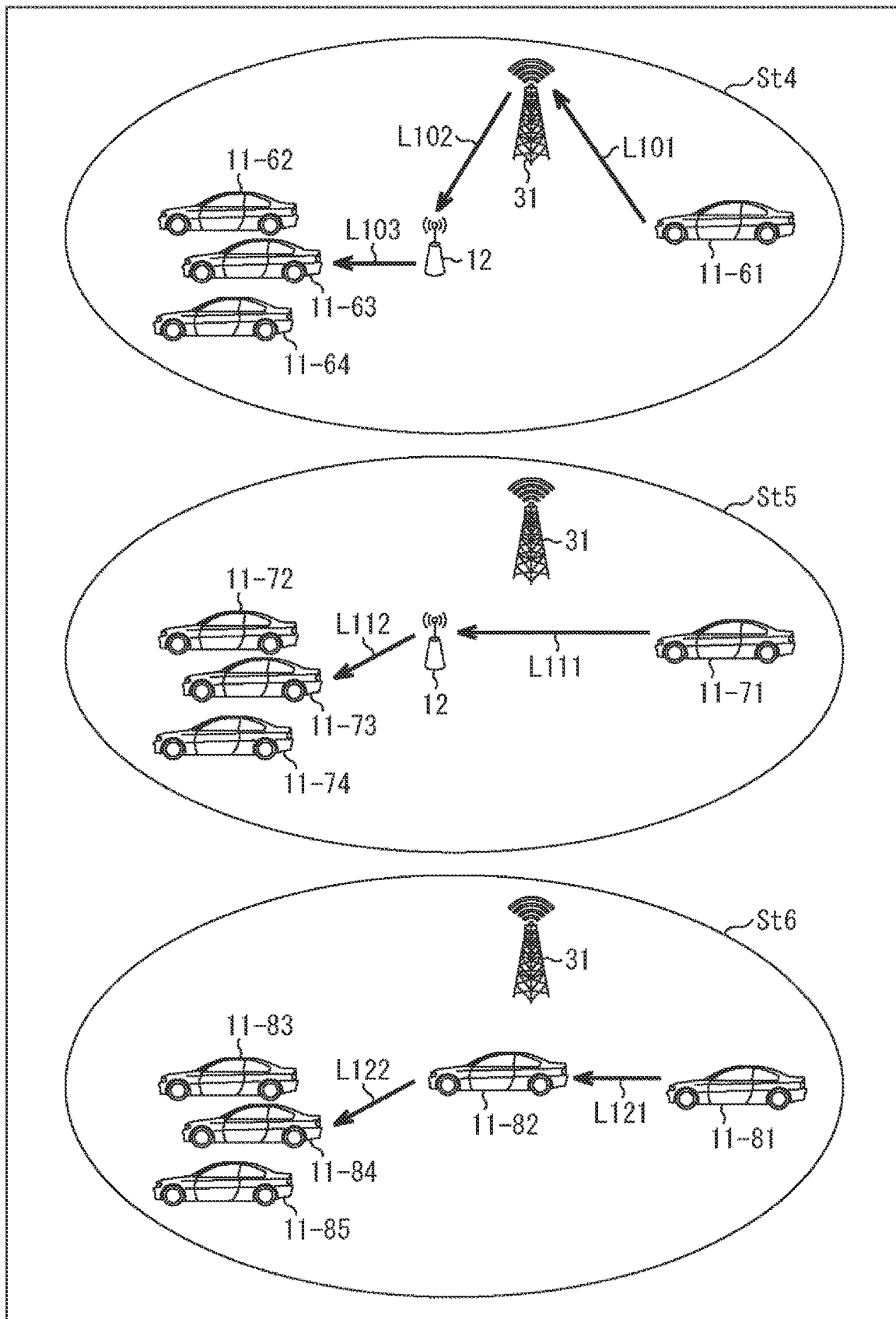
FIG. 4 is a diagram explaining a V2X operation scenario.

In a fourth scenario Sn4, for example, as shown in the upper part of FIG. 4, between a vehicle 11-61 and each of vehicles 11-62 to 11-64, communication L101, L102 including a terminal-to-terminal link (sidelink: PC5 link) between the vehicle 11-61 and the base station 31 and between base station 31 and the RSU 12 are formed, and between the RSU 12 and the vehicles 11-62 to 11-64, communication L103 including a Uu link is formed.

Then, in the fourth scenario Sn4, the following vehicle 11-61 transmits information to the preceding vehicles 11-62 to 11-64 via the communication L101, L102 including the terminal-to-terminal link (sidelink: PC5 link) between the vehicle 11-61 and the base station 31 and between the base station 31 and the RSU 12, and the communication L103 including the Uu link between the RSU 12 and the vehicles 11-62 to 11-64.

In a fifth scenario Sn5, for example, as shown in the middle part of FIG. 4, between a vehicle 11-71 and each of vehicles 11-72 to 11-74, communication L111 including a terminal-to-terminal link (sidelink: PC5 link) between the vehicle 11-71 and the RSU 12 is formed, and communication L112 including a terminal-to-terminal link (sidelink: PC5 link) between an RSUL 82 and each of the vehicles 11-72 to 11-74 is formed.

Then, in the fifth scenario Sn5, the following vehicle 11-71 transmits information to the preceding vehicles 11-72 to 11-74 via the communication L111 including the terminal-to-terminal link (sidelink: PC5 link) with the vehicle 11-82, and the communication L112 including the terminal-to-terminal link (sidelink: PC5 link) between the RSUL 82 and the vehicles 11-72 to 11-74.

In a sixth scenario Sn6, for example, as shown in the lower part of FIG. 4, communication L121 including a terminal-to-terminal link (sidelink: PC5 link) between vehicles 11-81, 11-82 is formed, and communication L122 including a terminal-to-terminal link (sidelink: PC5 link) between the vehicle 11-82 and each of vehicles 11-83 to 11-85 is formed.

Then, in the sixth scenario Sn6, the following vehicle 11-81 transmits information to the preceding vehicle 11-82 via the communication L121 including the terminal-to-terminal link (sidelink: PC5 link), and the vehicle 11-82 further transmits the information to the preceding vehicles 11-83 to 11-85 via the communication L122 including the terminal-to-terminal link (sidelink: PC5 link).

In the NRV2X so far, as can be seen in the example of the series of scenarios described above, the terminal-to-terminal link has basically been realized by single antenna transmission, transmission diversity transmission, and the like.

However, in the NRV2X so far, communication related to multiple input and multiple output (MIMO), which uses multiple antennas between transmission and reception, and beamforming has not been performed.

In particular, for beamforming in a V2X communication environment, it is necessary to establish a beamforming link in a short time, and an efficient connection establishment method is required. Furthermore, in a case where a beamforming technology is used for a terminal-to-terminal link (sidelink), the communication characteristics are easily affected by the surrounding geographical environment, and therefore for recovery measures when the link is broken, for example, processing according to the geographical environment is required.

Therefore, in the present disclosure, efficient communication connection and recovery using geographical information in an in-vehicle communication (V2X communication) environment is realized, and more reliable communication is realized.

2. First Embodiment

Next, a first embodiment of the communication system of the present disclosure will be described with reference to FIG. 5.

Figure 5:
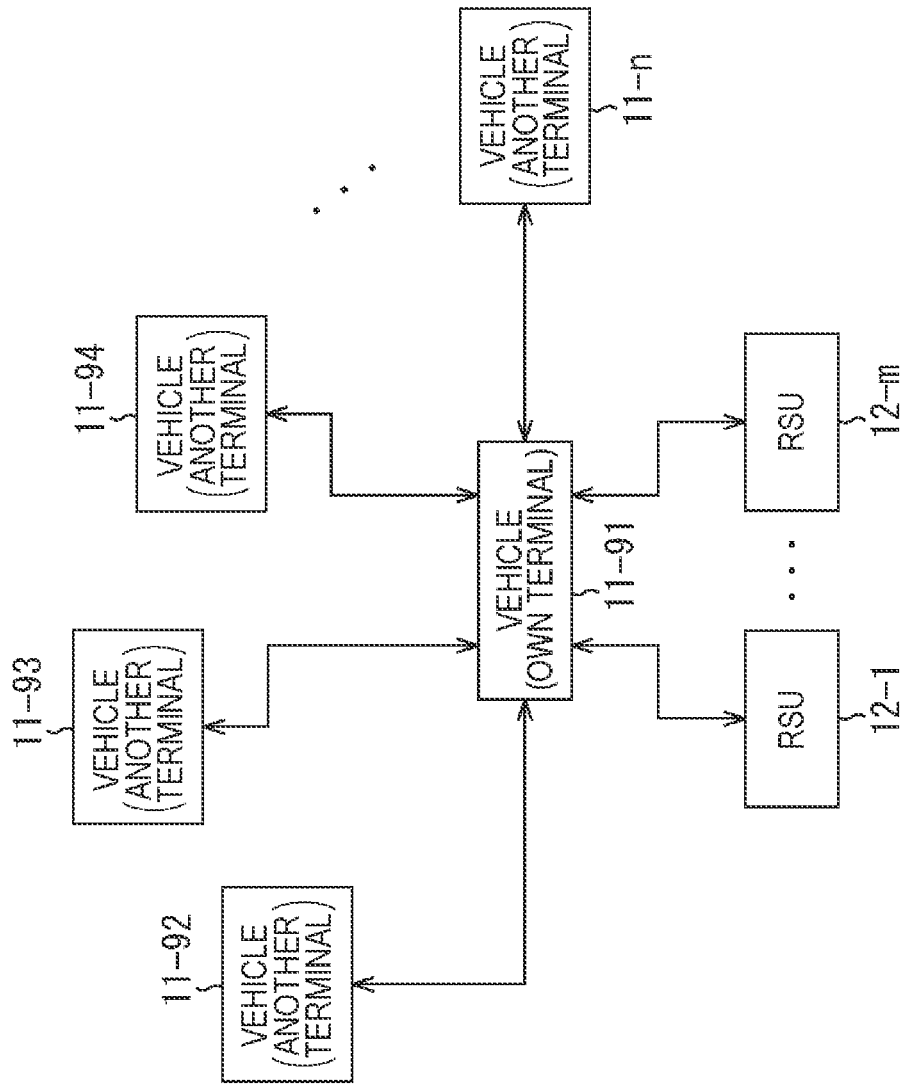
FIG. 5 is a diagram explaining a configuration example of a first embodiment in a communication system of the present disclosure.

A communication system 41 of FIG. 5 includes vehicles 11-91 to 11-$n$ and RSUs 12-1 to 12-$m$. In the communication system 41 of FIG. 5, the vehicle 11-91 is represented as own car, and vehicles that are the other vehicles are represented as the vehicles 11-92 to 11-$n$. The vehicle 11-91 can communicate with the vehicles 11-92 to 11-$n$, for example, by the V2V communication. In the present specification, the vehicle 11 is a terminal, the vehicle 11, which is the own car, is also referred to as the own terminal, and the other vehicles 11, the RSU 12, and the pedestrian 14 are also referred to as another terminal.

The vehicle 11-91 transmits its own position information to other vehicles 11-92 to 11-$n$, and acquires the position information of the other vehicles 11-92 to 11-$n$ and the RSUs 12-1 to 12-$m$.

The RSU 12 transmits its own position information to the vehicle 11 and other RSUs 12. Furthermore, the RSU 12 realizes the V2I communication between the vehicles 11-91 to 11-$n$, and relays communication, for example, between the vehicle 11-91 and each of the vehicles 11-92 to 11-$n$. Moreover, although not shown in FIG. 5, the RSU 12 also relays the communication between the vehicle 11 and the network 13 and the pedestrian 14 as described with reference to FIG. 1.

The vehicle 11-91 adjusts mutual communication parameters on the basis of the positional relationship with the other vehicles 11-92 to 11-$n$ and the RSUs 12-1 to 12-$m$, i.e., geographical information, and always maintains a state in which communication can be performed in an optimal state. Therefore, highly reliable, low latency V2X communication is realized.

<Configuration Example of Vehicle Control System that Realizes Vehicle Functions>

Figure 6:
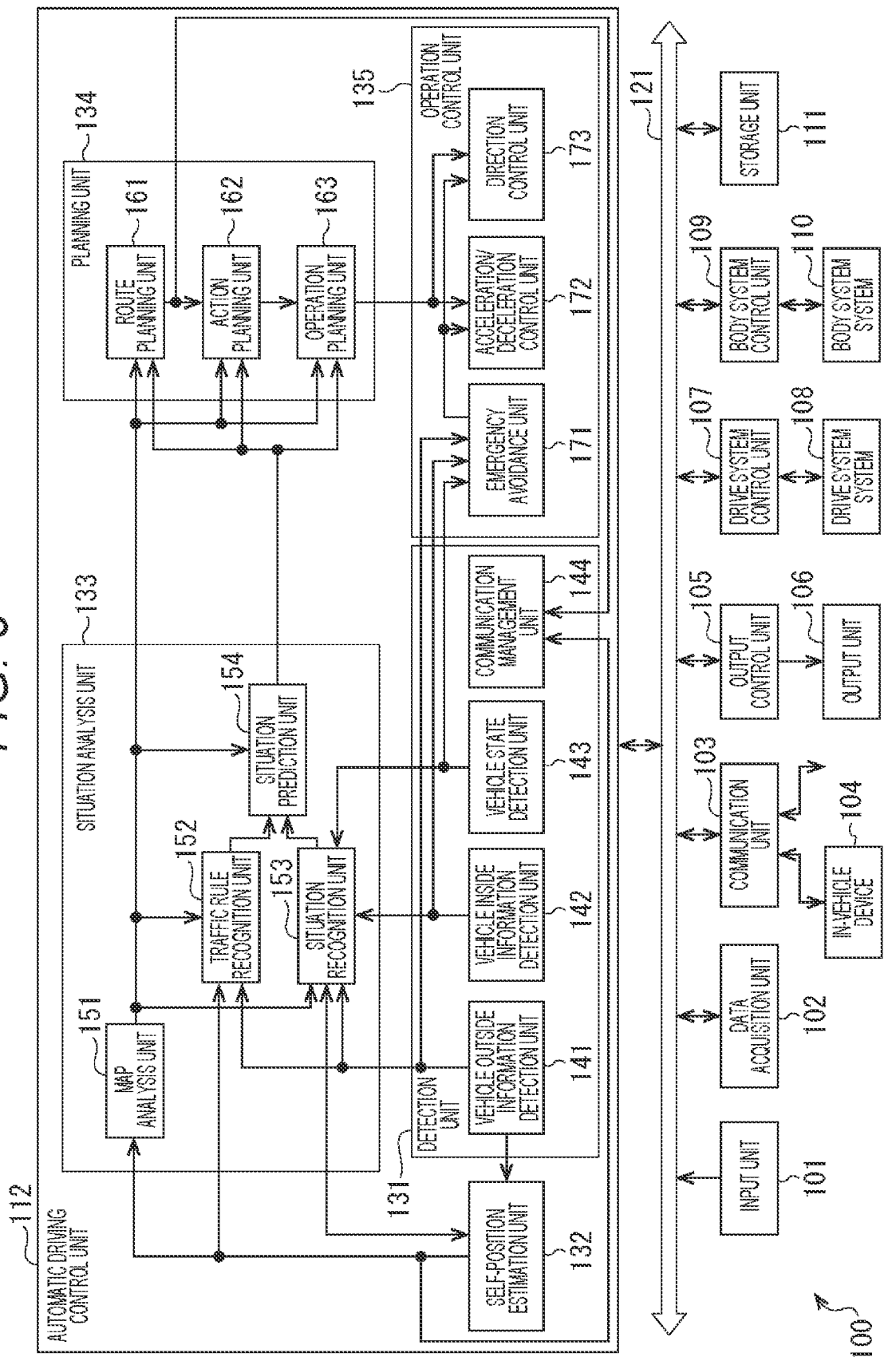
FIG. 6 is a diagram explaining a configuration example of a vehicle control system that realizes vehicle functions.

Next, referring to FIG. 6, it is a block diagram showing a schematic function configuration example of a vehicle control system 100, which is an example of a moving body control system that realizes the function of the vehicle 11.

Note that, hereinafter, in a case where a vehicle provided with the vehicle control system 100 is distinguished from other vehicles, it is referred to as the own car or the own vehicle.

The vehicle control system 100 includes an input unit 101, a data acquisition unit 102, a communication unit 103, an in-vehicle device 104, an output control unit 105, an output unit 106, a drive system control unit 107, a drive system system 108, a body system control unit 109, a body system system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an in-vehicle communication network, a bus, or the like such as a controller area network (CAN), a local interconnect network (LIN), a local area network (LAN), or FlexRay (registered trademark) that is compliant with any standard. Note that each unit of the vehicle control system 100 may be directly connected without the communication network 121.

Note that, hereinafter, in a case where each unit of the vehicle control system 100 performs communication via the communication network 121, the description of the communication network 121 is omitted. For example, in a case where the input unit 101 and the automatic driving control unit 112 communicate with each other via the communication network 121, it is simply described that the input unit 101 and the automatic driving control unit 112 communicate with each other.

The input unit 101 includes an apparatus used by a passenger to input various data, instructions, and the like. For example, the input unit 101 includes an operation device such as a touch panel, a button, a microphone, a switch, and a lever, an operation device that can perform inputting by a method other than manual operation, such as a voice or a gesture, and the like. Furthermore, for example, the input unit 101 may be a remote control apparatus that uses infrared rays or other radio waves, or an externally connected device such as a mobile device or a wearable device that corresponds to the operation of the vehicle control system 100. The input unit 101 generates an input signal on the basis of the data, instructions, and the like input by the passenger, and supplies the input signal to each unit of the vehicle control system 100.

The data acquisition unit 102 includes various sensors and the like that acquire data used for processing of the vehicle control system 100, and supplies the acquired data to each unit of the vehicle control system 100.

For example, the data acquisition unit 102 includes various sensors for detecting the state of the own car and the like. Specifically, for example, the data acquisition unit 102 includes a gyro sensor, an acceleration sensor, an inertial measurement unit (IMU), a sensor for detecting an accelerator pedal operation amount, a brake pedal operation amount, a steering wheel steering angle, an engine rotation rate, a motor rotation rate, or a wheel rotation rate, or the like, and the like.

Furthermore, for example, the data acquisition unit 102 includes various sensors for detecting information outside the own car. Specifically, for example, the data acquisition unit 102 includes an imaging apparatus such as a time of flight (ToF) camera, a stereo camera, a monocular camera, an infrared camera, or another camera. Furthermore, for example, the data acquisition unit 102 includes an environment sensor for detecting weather, climate, or the like, and a surrounding information detection sensor for detecting a surrounding object of the own car. The environment sensor includes, for example, a raindrop sensor, a fog sensor, a sunshine sensor, a snow sensor, and the like. The surrounding information detection sensor includes, for example, an ultrasonic sensor, a radar, a light detection and ranging, laser imaging detection and ranging (LiDAR), a sonar, and the like.

Moreover, for example, the data acquisition unit 102 includes various sensors for detecting the current position of the own car. Specifically, for example, the data acquisition unit 102 includes a global navigation satellite system (GNSS) receiver that receives a GNSS signal from a GNSS satellite, or the like.

Furthermore, for example, the data acquisition unit 102 includes various sensors for detecting information inside the car. Specifically, for example, the data acquisition unit 102 includes an imaging apparatus that captures an image of a driver, a biosensor that detects biometric information of the driver, a microphone that collects a sound in the vehicle interior, and the like. The biosensor is provided, for example, on a seating surface, a steering wheel, or the like, and detects biometric information of the passenger sitting on the seat or the driver gripping the steering wheel.

The communication unit 103 communicates with the in-vehicle device 104 and various devices outside the vehicle, a server, a base station, and the like, transmits data supplied from each unit of the vehicle control system 100, and supplies the received data to each unit of the vehicle control system 100. Note that a communication protocol supported by the communication unit 103 is not particularly limited, and furthermore, the communication unit 103 can support a plurality of types of communication protocols.

For example, the communication unit 103 performs wireless communication with the in-vehicle device 104 by wireless LAN, Bluetooth (registered trademark), near field communication (NFC), wireless USB (WUSB), or the like. Furthermore, for example, the communication unit 103 performs wired communication with the in-vehicle device 104 by, e.g., a universal serial bus (USB), a high-definition multimedia interface (HDMI (registered trademark)), or mobile high-definition link (MHL) via a connection terminal (and a cable if necessary), which is not illustrated.

Moreover, for example, the communication unit 103 performs communication with a device (such as an application server or a control server) on an external network (such as the Internet, a cloud network, or a network specific to a service provider), via a base station or an access point. Furthermore, for example, the communication unit 103 performs communication with a terminal (such as a terminal of a pedestrian or a store, or a machine type communication (MTC) terminal) in the vicinity of the own car using a peer-to-peer (P2P) technology. Moreover, for example, the communication unit 103 performs the V2X communication such as the vehicle to vehicle (V2V) communication, the vehicle to infrastructure (V2I) communication, the vehicle to network (V2N) communication, and the vehicle to pedestrian (V2P) communication. Furthermore, for example, the communication unit 103 includes a beacon receiving unit, receives radio waves or electromagnetic waves transmitted from a wireless station or the like installed on the road, and acquires information such as the current position, traffic congestion, traffic restrictions, or necessary time. The communication unit 103 performs communication based on the communication method and various communication parameters managed by the communication management unit 144.

The in-vehicle device 104 includes, for example, a mobile device or a wearable device that the passenger has, an information device that is carried in or attached to the own car, a navigation apparatus that searches for a route to an arbitrary destination, and the like.

The output control unit 105 controls the output of various types of information to the passengers of the own car or the outside of the vehicle. For example, the output control unit 105 generates an output signal including at least one of visual information (for example, image data) or auditory information (for example, audio data), and supplies the output signal to the output unit 106 to control the output of visual information and auditory information from the output unit 106. Specifically, for example, the output control unit 105 synthesizes image data captured by different imaging apparatuses of the data acquisition unit 102 to generate a bird's-eye image, a panoramic image, or the like and supplies an output signal including the generated image to the output unit 106. Furthermore, for example, the output control unit 105 generates audio data including a warning sound, a warning message, or the like for a danger such as collision, contact, or traveling to a dangerous zone, and supplies an output signal including the generated audio data to the output unit 106.

The output unit 106 includes an apparatus capable of outputting visual information or auditory information to a passenger of the own car or outside the vehicle. For example, the output unit 106 includes a display apparatus, an instrument panel, an audio speaker, headphones, a wearable device such as a glasses-type display worn by a passenger, a projector, a lamp, and the like. The display apparatus included in the output unit 106 may be, other than an apparatus having a normal display, for example, an apparatus that displays visual information in the field of view of the driver such as a head-up display, a transmissive display, an apparatus having an augmented reality (AR) display function.

The drive system control unit 107 controls the drive system system 108 by generating various control signals and supplying them to the drive system system 108. Furthermore, the drive system control unit 107 supplies a control signal to each unit other than the drive system system 108 as necessary to give a notification of the control state of the drive system system 108 and the like.

The drive system system 108 includes various apparatuses related to the drive system of the own car. For example, the drive system system 108 includes a drive force generation apparatus for generating a drive force such as an internal combustion engine, a drive motor, or the like, a drive force transmission mechanism for transmitting the drive force to the wheels, a steering mechanism for adjusting the steering angle, a braking apparatus that generates a braking force, an antilock brake system (ABS), an electronic stability control (ESC), an electric power steering apparatus, and the like.

The body system control unit 109 controls the body system system 110 by generating various control signals and supplying them to the body system system 110. Furthermore, the body system control unit 109 supplies a control signal to each unit other than the body system system 110 as necessary to give a notification of the control state of the body system system 110 and the like.

The body system system 110 includes various body system apparatuses mounted on a vehicle body. For example, the body system system 110 includes a keyless entry system, a smart key system, a power window apparatus, a power seat, a steering wheel, an air conditioning apparatus, various lamps (for example, headlights, backlights, brake lights, blinkers, fog lights, etc.), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the vehicle control system 100. For example, the storage unit 111 stores a map data such as a three-dimensional high-precision map such as a dynamic map, a global map which is less precise than the high-precision map and covers a large area, and a local map including information around the own car.

The automatic driving control unit 112 performs control related to automatic driving such as autonomous traveling or driving assistance. Specifically, for example, the automatic driving control unit 112 performs cooperative control for the purpose of realizing the functions of the advanced driver assistance system (ADAS) including collision avoidance or impact reduction of the own car, follow-up traveling based on the inter-vehicle distance, constant vehicle speed traveling, collision warning of the own car, lane deviation warning of the own car, or the like. Furthermore, for example, the automatic driving control unit 112 performs cooperative control for the purpose of automatic driving and the like that autonomously travels without depending on the operation of the driver. The automatic driving control unit 112 includes a detection unit 131, a self-position estimation unit 132, a situation analysis unit 133, a planning unit 134, and an operation control unit 135.

The detection unit 131 detects various kinds of information necessary for controlling automatic driving. The detection unit 131 includes a vehicle outside information detection unit 141, a vehicle inside information detection unit 142, a vehicle state detection unit 143, and a communication management unit 144.

The vehicle outside information detection unit 141 performs processing of detecting information outside the own car on the basis of data or signals from each unit of the vehicle control system 100. For example, the vehicle outside information detection unit 141 performs detection processing, recognition processing, and tracking processing with respect to an object around the own car, and processing of detecting a distance to the object. Objects to be detected include, for example, vehicles, people, obstacles, structures, roads, traffic lights, traffic signs, road markings, and the like. Furthermore, for example, the vehicle outside information detection unit 141 performs processing of detecting the environment around the own car. The surrounding environment to be detected includes, for example, weather, temperature, humidity, brightness, road surface condition, and the like. The vehicle outside information detection unit 141 supplies the data indicating the result of the detection processing to the self-position estimation unit 132, a map analysis unit 151, a traffic rule recognition unit 152, and a situation recognition unit 153 of the situation analysis unit 133, an emergency avoidance unit 171 of the operation control unit 135, and the like.

The vehicle inside information detection unit 142 performs processing of detecting information inside the car on the basis of data or signals from each unit of the vehicle control system 100. For example, the vehicle inside information detection unit 142 performs driver authentication processing and recognition processing, driver state detection processing, passenger detection processing, in-vehicle environment detection processing, and the like. The driver's state to be detected includes, for example, physical condition, arousal level, concentration level, fatigue level, line-of-sight direction, and the like. The in-vehicle environment to be detected includes, for example, temperature, humidity, brightness, odor, and the like. The vehicle inside information detection unit 142 supplies the data indicating the result of the detection processing to the situation recognition unit 153 of the situation analysis unit 133, the emergency avoidance unit 171 of the operation control unit 135, and the like.

The vehicle state detection unit 143 performs processing of detecting the state of the own car on the basis of data or signals from each unit of the vehicle control system 100. The state of the own car to be detected includes, for example, speed, acceleration, steering angle, presence/absence and content of abnormality, state of driving operation, position and inclination of power seat, state of door lock, state of other in-vehicle devices, and the like. The vehicle state detection unit 143 supplies the data indicating the result of the detection processing to the situation recognition unit 153 of the situation analysis unit 133, the emergency avoidance unit 171 of the operation control unit 135, and the like.

The communication management unit 144, on the basis of the information of the self-position and the position information of another car, an infrastructure, a network, a terminal of a pedestrian and the like, which is the communication target X, controls the communication method or communication parameters of the communication unit 103 according to the geographical information related to communication, and realizes highly reliable communication. Note that a specific configuration of the communication management unit 144 will be described later with reference to FIG. 7.

The self-position estimation unit 132 performs processing of estimating the position, orientation, and the like of the own car on the basis of the data or signals from each unit of the vehicle control system 100 such as the vehicle outside information detection unit 141, and the situation recognition unit 153 of the situation analysis unit 133. Furthermore, the self-position estimation unit 132 generates a local map (hereinafter referred to as a self-position estimation map) used for estimating the self-position, if necessary. The self-position estimation map is, for example, a high-precision map using a technique such as simultaneous localization and mapping (SLAM) and the like. The self-position estimation unit 132 supplies the data indicating the result of the estimation processing to the map analysis unit 151, the traffic rule recognition unit 152, and the situation recognition unit 153 of the situation analysis unit 133, and the like. Furthermore, the self-position estimation unit 132 causes the storage unit 111 to store the self-position estimation map.

The situation analysis unit 133 performs processing of analyzing the situation of the own car and the surroundings. The situation analysis unit 133 includes the map analysis unit 151, the traffic rule recognition unit 152, the situation recognition unit 153, and a situation prediction unit 154.

The map analysis unit 151, while using, as necessary, the data or signals from each unit of the vehicle control system 100 such as the self-position estimation unit 132 and the vehicle outside information detection unit 141, performs processing of analyzing various maps stored in the storage unit 111 to construct a map including information required for processing of automatic driving. The map analysis unit 151 supplies the constructed map to the traffic rule recognition unit 152, the situation recognition unit 153, the situation prediction unit 154, a route planning unit 161, an action planning unit 162, and an operation planning unit 163 of the planning unit 134, and the like.

The traffic rule recognition unit 152 performs processing of recognizing a traffic rule around the own car on the basis of the data or signals from each unit of the vehicle control system 100 such as the self-position estimation unit 132, the vehicle outside information detection unit 141 and the map analysis unit 151. By this recognition processing, for example, the position and state of traffic light around the own car, the content of traffic regulation around the own car, the lane on which the vehicle can travel, and the like are recognized. The traffic rule recognition unit 152 supplies data indicating the result of the recognition processing to the situation prediction unit 154 and the like.

The situation recognition unit 153 performs processing of recognizing situations regarding the own car on the basis of the data or signals from each unit of the vehicle control system 100 such as the self-position estimation unit 132, the vehicle outside information detection unit 141, the vehicle inside information detection unit 142, the vehicle state detection unit 143, and the map analysis unit 151. For example, the situation recognition unit 153 performs processing of recognizing the situation of the own car, the situation around the own car, the situation of the driver of the own car, and the like. Furthermore, the situation recognition unit 153 generates a local map (hereinafter referred to as a situation recognition map) used for recognizing the situation around the own car, if necessary. The situation recognition map is, for example, an occupancy grid map.

The situation of the own car to be recognized includes, for example, the position, orientation, movement (for example, speed, acceleration, moving direction, or the like) of the own car, the presence/absence and content of abnormality, and the like. The situation around the own car to be recognized includes, for example, the type and position of surrounding stationary objects, the type, position, movement (for example, speed, acceleration, moving direction, or the like) of surrounding moving objects, the configuration and road surface condition of surrounding roads, the surrounding weather, temperature, humidity, and brightness, and the like. The driver's state to be recognized includes, for example, physical condition, arousal level, concentration level, fatigue level, movement of line-of-sight, driving operation, and the like.

The situation recognition unit 153 supplies the data indicating the result of the recognition processing (including the situation recognition map, if necessary) to the self-position estimation unit 132, the situation prediction unit 154, and the like. Furthermore, the situation recognition unit 153 causes the storage unit 111 to store the situation recognition map.

The situation prediction unit 154 performs processing of predicting the situation regarding the own car on the basis of the data or signals from each unit of the vehicle control system 100 such as the map analysis unit 151, the traffic rule recognition unit 152, and the situation recognition unit 153. For example, the situation prediction unit 154 performs processing of predicting the situation of the own car, the situation around the own car, the situation of the driver, and the like.

The situation of the own car to be predicted includes, for example, the behavior of the own car, the occurrence of an abnormality, the travelable distance, and the like. The situation around the own car to be predicted includes, for example, the behavior of a moving object around the own car, a change in the state of traffic lights, a change in the environment such as weather, and the like. The situation of the driver to be predicted includes, for example, the behavior and physical condition of the driver, and the like.

The situation prediction unit 154 supplies the data indicating the result of the prediction processing, together with the data from the traffic rule recognition unit 152 and the situation recognition unit 153, to the route planning unit 161, the action planning unit 162, and the operation planning unit 163 of the planning unit 134, and the like.

The route planning unit 161 plans a route to a destination on the basis of the data or signals from each unit of the vehicle control system 100 such as the map analysis unit 151 and the situation prediction unit 154. For example, the route planning unit 161 sets a route from the current position to a designated destination on the basis of the global map. Furthermore, for example, the route planning unit 161 appropriately changes the route on the basis of situations such as traffic congestion, accidents, traffic restrictions, construction, the physical condition of the driver, and the like. The route planning unit 161 supplies the data indicating the planned route to the action planning unit 162 and the like.

The action planning unit 162 plans an action of the own car for safe traveling within a planned time on a route planned by the route planning unit 161 on the basis of the data or signals from each unit of the vehicle control system 100 such as the map analysis unit 151 and the situation prediction unit 154. For example, the action planning unit 162 makes plans such as start, stop, traveling direction (for example, forward, backward, left turn, right turn, direction change, or the like), driving lane, traveling speed, and overtaking The action planning unit 162 supplies the data indicating the planned action of the own car to the operation planning unit 163 and the like.

The operation planning unit 163 plans an operation of the own car for realizing the action planned by the action planning unit 162 on the basis of the data or signals from each unit of the vehicle control system 100 such as the map analysis unit 151 and the situation prediction unit 154. For example, the operation planning unit 163 makes plans such as acceleration, deceleration, and traveling trajectory. The operation planning unit 163 supplies the data indicating the planned operation of the own car to an acceleration/deceleration control unit 172 and a direction control unit 173 of the operation control unit 135, and the like.

The operation control unit 135 controls the operation of the own car. The operation control unit 135 includes the emergency avoidance unit 171, the acceleration/deceleration control unit 172, and the direction control unit 173.

On the basis of the detection results of the vehicle outside information detection unit 141, the vehicle inside information detection unit 142, and the vehicle state detection unit 143, the emergency avoidance unit 171 performs processing of detecting an emergency such as collision, contact, traveling to a dangerous zone, an abnormality of the driver, and an abnormality of the vehicle. In a case where the occurrence of an emergency is detected, the emergency avoidance unit 171 plans the operation of the own car for avoiding the emergency such as a sudden stop or a sharp turn. The emergency avoidance unit 171 supplies the data indicating the planned operation of the own car to the acceleration/deceleration control unit 172, the direction control unit 173, and the like.

The acceleration/deceleration control unit 172 performs acceleration/deceleration control for realizing the operation of the own car planned by the operation planning unit 163 or the emergency avoidance unit 171. For example, the acceleration/deceleration control unit 172 calculates a control target value of the drive force generation apparatus or the braking apparatus for realizing the planned acceleration, deceleration, or sudden stop, and supplies a control command indicating the calculated control target value to the drive system control unit 107.

The direction control unit 173 performs direction control for realizing the operation of the own car planned by the operation planning unit 163 or the emergency avoidance unit 171. For example, the direction control unit 173 calculates a control target value of the steering mechanism for realizing the traveling trajectory or sharp turn planned by the operation planning unit 163 or the emergency avoidance unit 171, and supplies a control command indicating the calculated control target value to the drive system control unit 107.

<Configuration Example of the Communication Management Unit in the Vehicle Control System that Realizes Vehicle Functions>

Next, a detailed configuration example of the communication management unit 144 will be described with reference to FIG. 7.

The communication management unit 144 includes a communication control unit 211, another terminal information acquisition unit 212, another terminal information storage unit 213, an own terminal position information acquisition unit 214, and an own terminal position information storage unit 215.

The communication control unit 211 includes an own terminal information transmission unit 221, a position prediction unit 222, an own terminal control unit 223, and a communication establishment unit 224, and controls the entire operation of the communication management unit 144.

The own terminal information transmission unit 221 controls the communication unit 103 to read own terminal position information stored in the own terminal position information storage unit 215, acquire route information supplied from the route planning unit 161 of the planning unit 134 and transmit the information to the surrounding vehicles 11.

The position prediction unit 222 predicts the current position or the position in the future for a predetermined time on the basis of the time-series own terminal position information stored in the own terminal position information storage unit 215 and the route information supplied from the route planning unit 161. Furthermore, the position prediction unit 222 predicts the current position on the basis of the time-series position information and route information of the another terminal such as the vehicle 11, the RSU 12, the pedestrian 14, and the base station 31 stored in the another terminal information storage unit 213. That is, the position prediction unit 222 predicts the current or future positions of the own terminal and the another terminal, thereby predicting the mutual positional relationship in the present or future as geographical information.

The own terminal control unit 223 specifies a communication target, a communication method (communication configuration and the like), and communication parameters, controls the communication unit 103, and establishes communication on the basis of the geographical information, which is information of the current or future positional relationship between terminals predicted by the position prediction unit 222.

The communication establishment unit 224 controls the communication unit 103 and establishes communication on the basis of the information of the vehicle 11 and the pedestrian 14. Furthermore, in a case where the communication establishment unit 224 is requested to establish communication by the vehicle 11, which is another car, via the communication unit 103, the communication establishment unit 224 acquires the information of the terminal requesting the establishment of communication and controls the communication unit 103 and establishes communication on the basis of the information of the vehicle 11 and the pedestrian 14 for which the establishment of communication has been demanded.

The another terminal information acquisition unit 212 controls the communication unit 103 to receive another terminal information including information of supported communication methods, position information, and route information transmitted from the surrounding vehicle 11, which is another car, and the RSU 12, and causes the another terminal information storage unit 213 to store the another terminal information. Note that the route referred to here includes a route that is expected to be moved by a navigation system or an automatic driving system.

The own terminal position information acquisition unit 214 acquires a self-position estimation result output from the self-position estimation unit 132 as the own terminal position information, and causes the own terminal position information storage unit 215 to store the self-position estimation result.

The own terminal control unit 223 of the communication control unit 211 determines a communication method or communication parameters and controls the communication unit 103 according to mutual positional relationship, i.e., geographical environment, based on the position information of the vehicle 11, which is another car, and the RSU 12 stored in the another terminal information storage unit 213, and the own terminal position information stored in the own terminal position information storage unit 215.

<Configuration Example of RSU>

Figure 8:
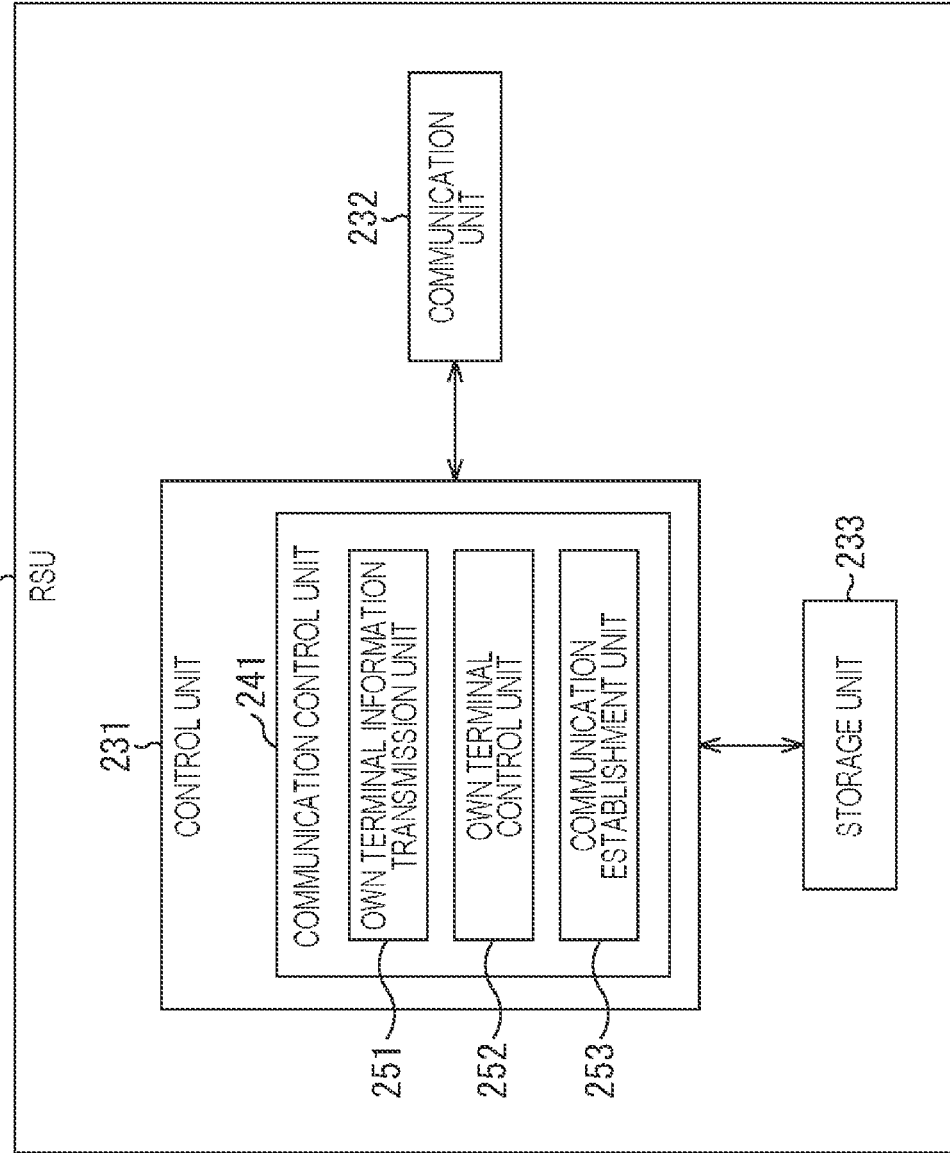
FIG. 8 is a diagram explaining a configuration example of an RSU of FIG. 6.

Next, a configuration example of the RSU 12 will be described with reference to FIG. 8.

The RSU 12 includes a control unit 231, a communication unit 232, and a storage unit 233.

The control unit 231 includes a communication control unit 241 and controls the entire operation of the RSU 12. The communication control unit 241 includes an own terminal information transmission unit 251, an own terminal control unit 252, and a communication establishment unit 253, and controls the communication unit 232.

The own terminal information transmission unit 251 controls the communication unit 232 to read the own terminal position information stored in the storage unit 233, information of supported communication methods, and information of the route planned by the route planning unit 161, and transmits the information to the surrounding vehicle 11 and pedestrian 14. That is, this information becomes another terminal information in another terminal.

The own terminal control unit 252 determines a communication method and communication parameters, and controls the communication unit 232.

The communication establishment unit 253 controls the communication unit 232 to establish communication with the terminals of the vehicle 11, the RSU 12, and the pedestrian 14.

<Communication Management Processing>

Figure 9:
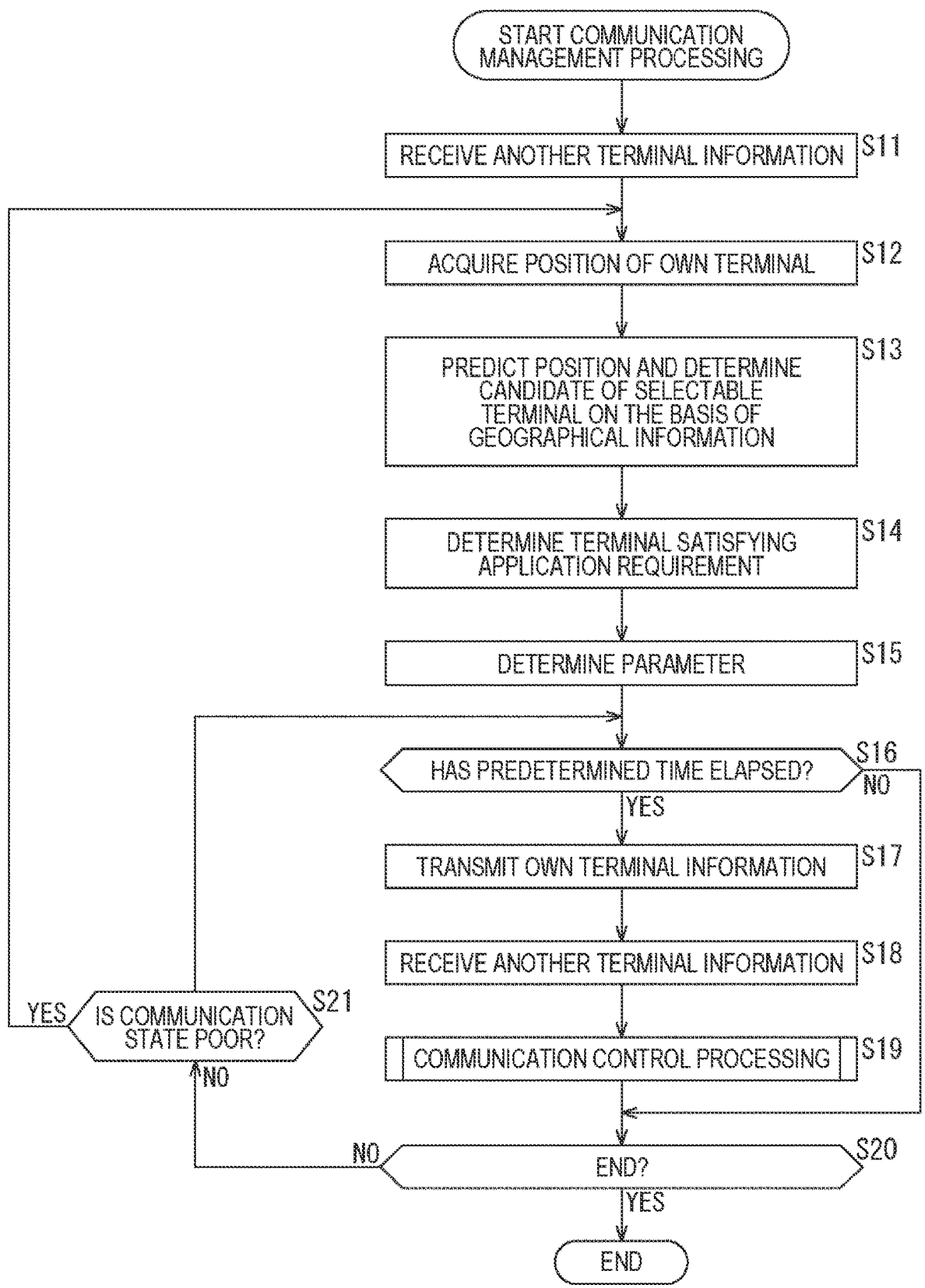
FIG. 9 is a flowchart explaining communication management processing according to the first embodiment.

Next, communication management processing in a case where the vehicle 11, which is the own car, communicates with the vehicle 11, which is another car, or the RSU 12 will be described with reference to the flowchart of FIG. 9.

In step S11, the another terminal information acquisition unit 212 controls the communication unit 103 to acquire another terminal information transmitted from another terminal such as the vehicle 11, which is another car, and the RSU 12, which is the another terminal information, and cause the another terminal information storage unit 213 to store information such as the position information or information of supported communication methods and the like included in the acquired another terminal information, as time-series information.

In step S12, the own terminal position information acquisition unit 214 acquires a self-position estimation result supplied from the self-position estimation unit 132 as the own terminal position information, and causes the own terminal position information storage unit 215 to store the self-position estimation result as time-series information.

In step S13, the position prediction unit 222 predicts the position of each terminal (the vehicle 11, the RSU 12, the pedestrian 14, and the like) as geographical information from the time-series position information and route information of the surrounding vehicle 11 and RSU 12 stored in the another terminal information storage unit 213, and the time-series own terminal position information and route information stored in the own terminal position information storage unit 215. The own terminal control unit 223 acquires the predicted geographical information (geographic information), and on the basis of the acquired geographical information (geographic information), selects a candidate for the vehicle 11 or the RSU 12 that can be a selectable terminal in consideration of each positional relationship.

Figure 10:
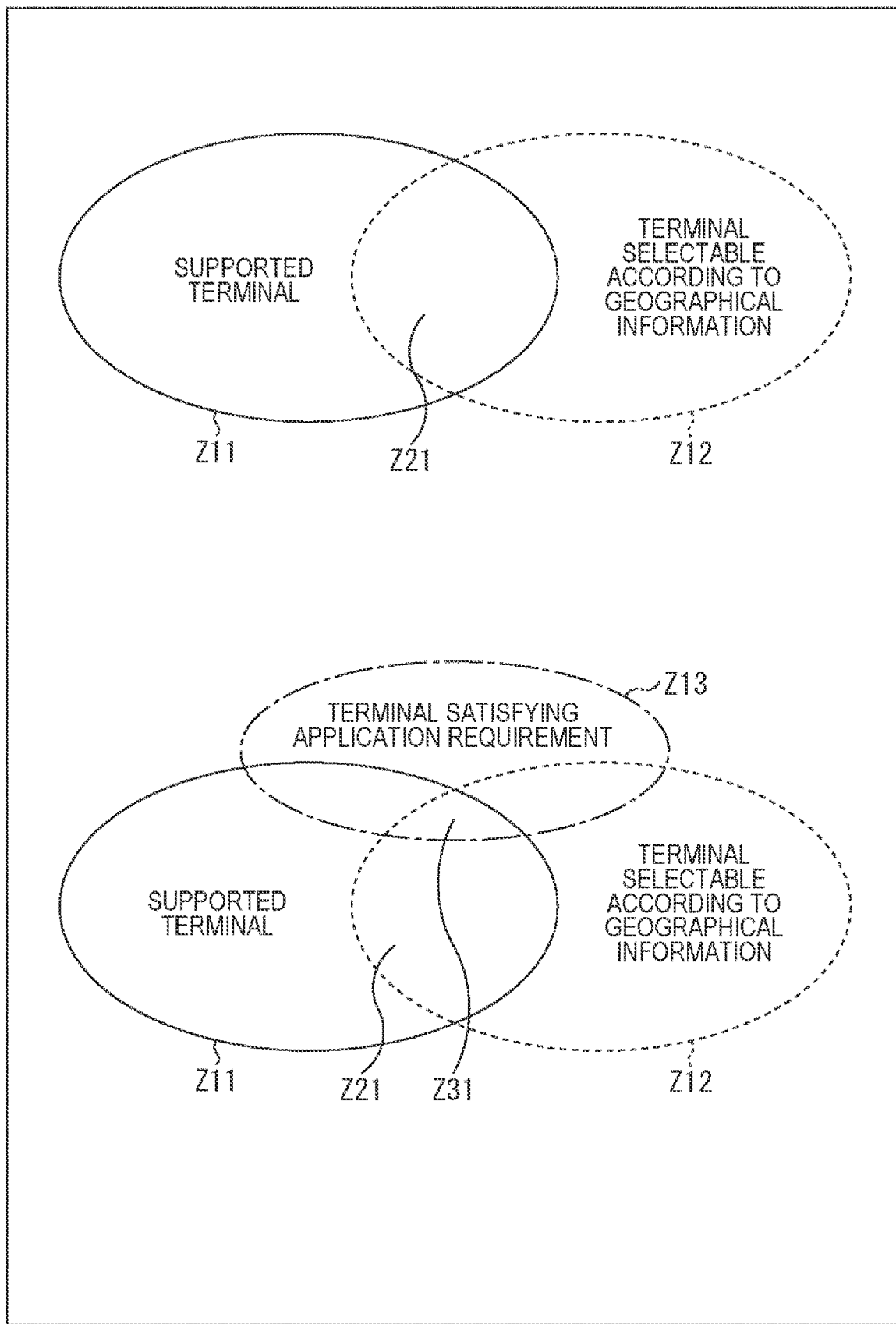
FIG. 10 is a diagram explaining a terminal selection method.

That is, as shown in the upper part of FIG. 10, in a case where, in the own terminal, in communication methods or communication parameters, a set of another terminals supported is expressed as a set Z11 and a set of another terminals that is determined to be usable on the basis of geographical information is expressed as a set Z12, the own terminal control unit 223 selects another terminal of a common set Z21 of the sets Z11, Z12 as a candidate.

For example, in a case where the own terminal supports the communication methods of DSRC V2V communication, Cellular 4G V2V communication, and Cellular 5G mmWave V2V communication, any another terminal adopting these communication methods is included in the set Z11.

On the other hand, in a case where any of these terminals are in a geographical state where linear radio wave propagation is difficult, for example, the terminal is physically surrounded by obstacles or the like (hereinafter, simply referred to as non line of sight (NLOS) state) on the basis of geographical information, another terminal adopting communication methods of DSRC V2V communication and Cellular 4G V2V communication capable of communication in the NLOS state is selected as a candidate. Note that, in the following, the state in which there is no obstacle and the like on the communication path and there is no particular problem in the propagation of radio waves is also referred to as a line of sight (LOS) state as opposed to the NLOS state.

In step S14, the own terminal control unit 223 selects, among another terminals selected as candidates, another terminal of the communication method supported in the application program adopted in the own terminal, as a terminal to communicate with.

That is, as shown in the lower part of FIG. 10, in a case where the set of another terminals supported in the application program of the own terminal is a set Z13, the own terminal control unit 223 selects, among the common set Z21, which is a set of another terminals selected as a candidate on the basis of geographical information, a terminal belonging to a common set Z31 (=common set of sets Z11, Z12, Z13) with the set Z13 as a terminal to communicate with.

That is, for example, in a case where the communication method supported by the application program is DSRC V2V communication, among another terminals adopting the communication methods of DSRC V2V communication and Cellular 4G V2V communication capable of communication in the NLOS state, another terminal adopting the communication method of DSRC V2V communication is selected as the terminal to communicate with.

In step S15, the own terminal control unit 223 sets communication parameters required for communication with the terminal selected as another terminal to communicate with on the basis of the geographical information, and starts the communication.

Here, the communication parameters to be set include, for example, a frequency band used, a resource pool (whether or not millimeter-wave communication can be performed, a license band, an unlicensed band, a license ITS band, a priority-based resource pool), a communication link (V2V communication, V2I communication, V2P communication, V2N communication, whether or not relay can be performed), whether or not carrier aggregation can be performed, whether or not dual connectivity can be performed, whether or not multiple antenna communication (TxD, MIMO) can be performed, beam steering, parameters regarding beamforming angle setting, parameters regarding beamforming measurement range, parameters regarding CSI acquisition, an allowable interference amount, carrier sensing parameters (threshold value, sensing period), filtering conditions in communication resource selection, resource selection conditions, modulation and coding set (MCS), maximum transmission power, transmission packet priority parameters, parameters regarding buffer status, threshold value parameters used for collision determination (weighting on a threshold value according to geographical environment), and the like.

A series of processing of steps S11 to S15 brings a state where an initial communication is started.

In step S16, the own terminal control unit 223 determines whether or not a predetermined time has elapsed, and in a case where the predetermined time has elapsed, the processing proceeds to step S17.

In step S17, the own terminal position information acquisition unit 214 acquires own terminal position information and causes the own terminal position information storage unit 215 to store the own terminal position information. The own terminal information transmission unit 221 controls the communication unit 103 to transmit the own terminal position information stored in the own terminal position information storage unit 215 and the information of the supported communication methods to another terminal.

In step S18, the another terminal information acquisition unit 212 controls the communication unit 103 to acquire another terminal information transmitted from another terminal such as the vehicle 11, which is another car, and the RSU 12, as the another terminal information, and cause the another terminal information storage unit 213 to store the position information in the acquired another terminal information or the information of supported communication methods as time-series information.

In step S19, the communication control unit 211 predicts the positions of the own terminal and the another terminal on the basis of the another terminal information stored in the another terminal information storage unit 213 and the own terminal position information stored in the own terminal position information storage unit 215, and generates geographical information. Then, the communication control unit 211 executes the communication control processing and adjusts the communication parameters on the basis of the predicted geographical information.

The communication control processing based on the geographical information is communication control processing according to the conditions obtained from various geographical information, and details will be described later with reference to FIGS. 11 to 15.

In step S20, the communication control unit 211 determines whether or not the end of processing has been instructed, and in a case where the end of processing has not been instructed, the processing proceeds to step S21.

In step S21, the communication control unit 211 confirms the communication situation of the communication unit 103, and determines whether or not the communication state is poor and communication is not possible. In step S21, in a case where the communication state is not poor and communication is not impossible, the processing returns to step S16.

Furthermore, in step S21, in a case where the communication state becomes poor and communication is not possible, the processing returns to step S13, a terminal as a communication destination is selected again, bringing a state where communication with another terminal can be started.

The communication control processing in step S19 realizes a highly reliable communication by realizing adjustment of parameters and switching of communication methods according to the communication state before the communication state becomes so poor that communication cannot be performed, thereby maintaining a stable communication state.

Then, in step S20, when the end is instructed, the processing ends.

Through the above processing, it is possible to realize communication with another terminal with which communication quality is easy to maintain on the basis of the geographical information and the conditions of the communication methods corresponding to the application program.

Thus, a highly reliable communication can be realized.

<Communication Control Processing that Changes Communication Parameters>

By the way, in a case where the communication state is determined to be poor in step S21 in the communication management processing described with reference to the flowchart of FIG. 9, in step S13 and subsequent steps, processing for resuming communication with new another terminal due to poor communication state is performed.

However, in this case, although the information of the another terminal for reconnection is available, because the connection procedure is restarted from the beginning, it may take time before the communication is resumed. As a result, the communication state may be unstable, and cause a delay in communication.

The communication control processing in step S19 is processing in step S21 that controls the communication unit 103 on the basis of the geographical information so that the communication state does not become so poor that communication cannot be performed.

Figure 11:
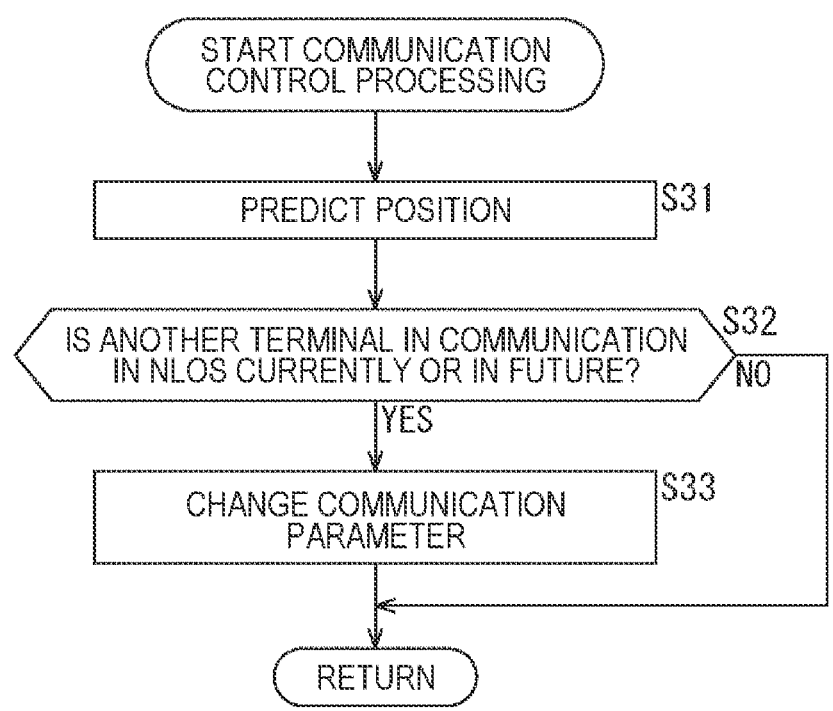
FIG. 11 is a flowchart explaining communication control processing that changes communication parameters.

Therefore, here, among the communication control processing for controlling the communication unit 103, the communication control processing that changes the communication parameters on the basis of the geographical information will be described with reference to the flowchart of FIG. 11.

In step S31, the position prediction unit 222 predicts the current and future positions of the own terminal and another terminal as geographical information on the basis of the time-series own terminal position information stored in the own terminal position information storage unit 215, the time-series another terminal information stored in the another terminal information storage unit 213 (including position information and route information), and the route information of the own terminal.

In step S32, the own terminal control unit 223 acquires the geographical information predicted by the position prediction unit 222, and, on the basis of the acquired geographical information, determines whether or not the another terminal in communication is currently NLOS or becomes NLOS until the future timing (from the present to the future) for a predetermined time (for example, 10 seconds).

Figure 12:
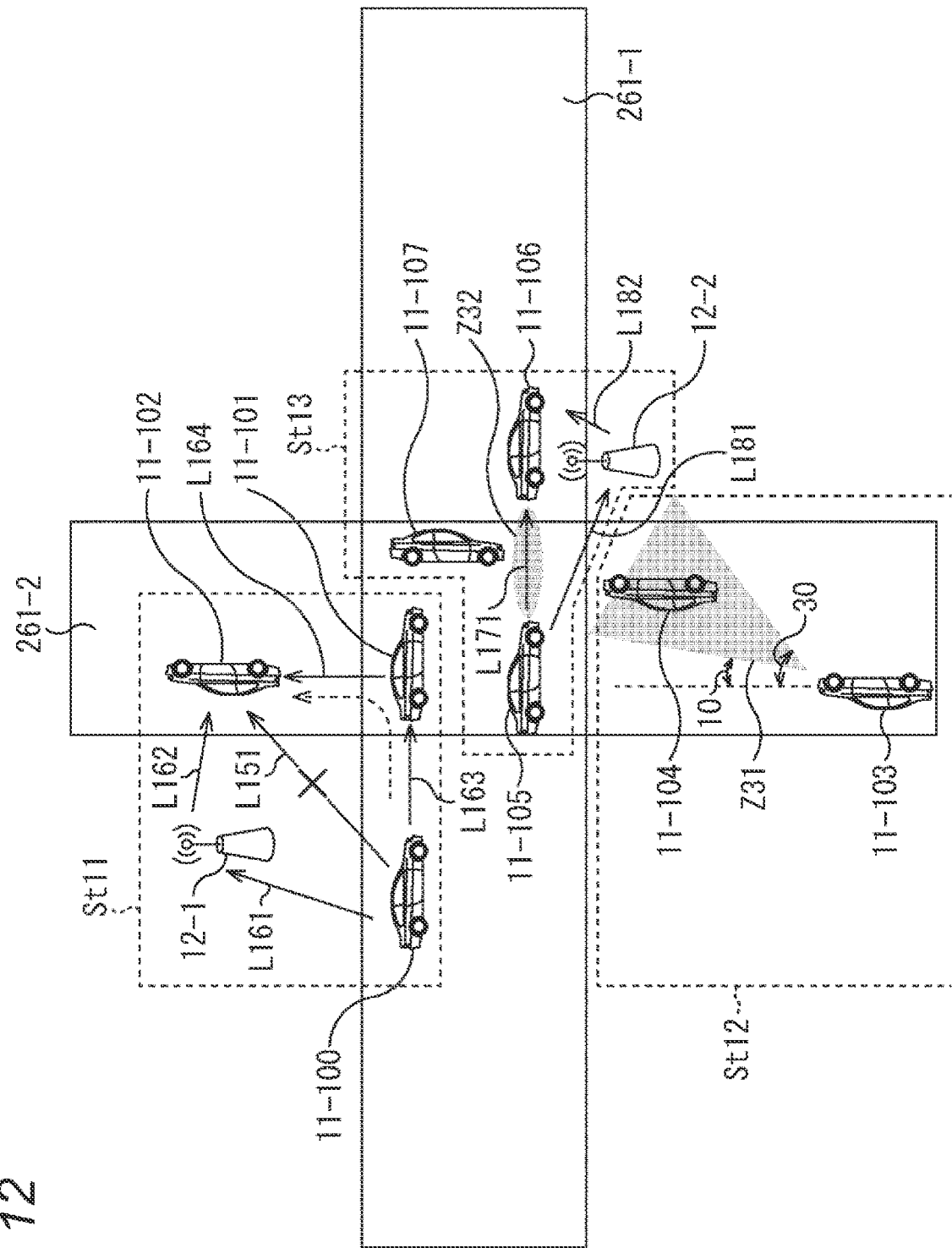
FIG. 12 is a diagram explaining an example of various situations in V2X.

For example, the case where a vehicle 11-100 in a situation St11 in FIG. 12 is the own vehicle is considered.

In the situation St11 in FIG. 12, it is assumed that the vehicle 11-100 is currently moving on a road 261-1 rightward in the drawing, and the V2V communication is realized between the vehicle 11-100 and a preceding vehicle 11-102.

However, it has been predicted that the vehicle 11-102 would turn left to a road 261-2 at a future timing for a predetermined time, as indicated by the dotted line. Therefore, communication L151 including the V2V communication between the vehicles 11-100, 11-102 in the drawing is in a state of straddling an area other than the roads 261-1, 261-2 as shown in FIG. 12. In consideration of the fact that buildings and the like exist in an area other than the roads 261-1, 261-2, in a case where the communication L151 including the V2V communication between the vehicles 11-100, 11-102 is beamforming communication, there is a possibility that the communication is blocked (expressed by a cross in the drawing).

At this time, the own terminal control unit 223 determines according to the geographical information that the vehicles 11-100, 11-102 will be in the NLOS state at a future timing for a predetermined time. Therefore, the processing proceeds to step S33.

In step S33, the own terminal control unit 223 changes the communication parameters at a timing immediately before being in the NLOS state in order to correspond to the situation of being in the NLOS state.

More specifically, the own terminal control unit 223 changes, for example, the frequency band of the communication unit 103 from 6 GHz to 700 MHz so that the communication L151 using robust communication resources can be performed with respect to NLOS. The own terminal control unit 223 increases the transmission power in the communication unit 103 to perform the communication L151 that is robust with respect to NLOS. At the same time, the own terminal control unit 223 makes a change for the communication L151 in modulajon and coding schemes (MCS) in the communication unit 103, for example, from 16QAM to QPSK, and in a case where MIMO is used, makes a change from MIMO to single input single output (SISO) communication.

Note that in a case where it is determined in step S32 that the state is not in the NLOS state, the processing of step S33 is skipped.

When it is predicted by the above processing that the NLOS state is reached in the latest future, it is possible to suppress the poor communication state by adjusting the communication parameters.

Thus, a highly reliable communication can be realized.

<Communication Control Processing that Changes the Configuration of the Communication Link>

Figure 13:
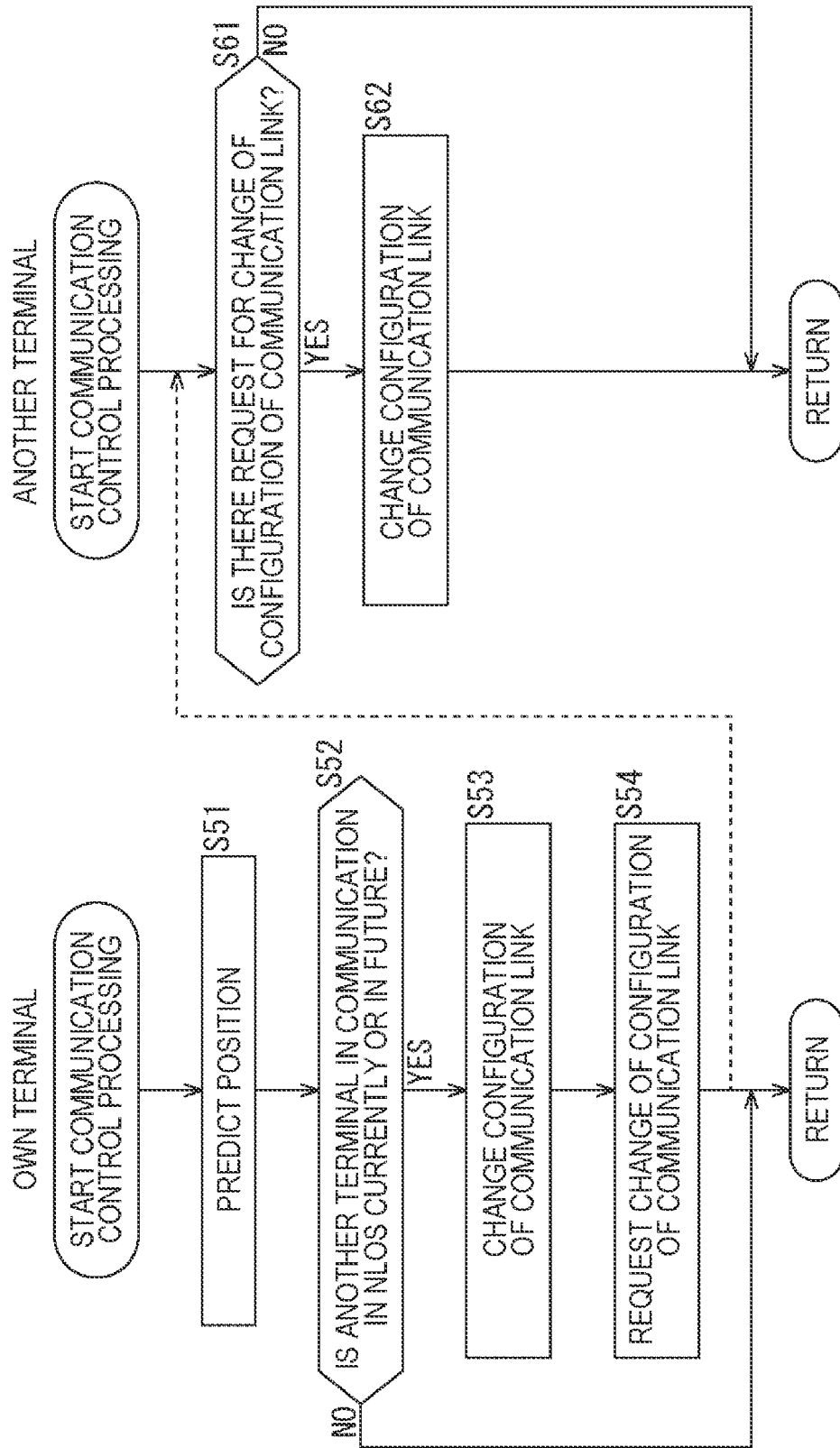
FIG. 13 is a flowchart explaining communication control processing that changes a communication link configuration on the basis of geographical information.

Next, among the communication control processing for controlling the communication unit 103, the communication control processing that changes the configuration of a communication link on the basis of the geographical information will be described with reference to the flowchart of FIG. 13.

In step S51, the position prediction unit 222 predicts the information of the relationship of the current and future positions of the own terminal and another terminal as geographical information on the basis of the time-series own terminal position information stored in the own terminal position information storage unit 215, the time-series another terminal information stored in the another terminal information storage unit 213 (including position information and route information), and the route information of the own terminal.

In step S52, the own terminal control unit 223 acquires the geographical information predicted by the position prediction unit 222, and, on the basis of the acquired geographical information, determines whether or not the another terminal in communication is currently in the NLOS state or becomes the NLOS state until the future timing (from the present to the future) for a predetermined time (for example, 10 seconds).

In a case where it is determined in step S52 that the NLOS state is reached, the processing proceeds to step S53.

In step S53, the own terminal control unit 223 changes the communication link at a timing immediately before being in the NLOS state in order to correspond to the situation of being in the NLOS state.

Also here, the case where the vehicle 11-100 in the situation St11 in FIG. 12 is the own vehicle is considered.

In the situation St11, an RSU 12-1 is provided on the upper left side of the intersection of the roads 261-1, 261-2 in the drawing. Therefore, the own terminal control unit 223 changes the configuration of the communication link of the communication with the vehicles 11-100, 11-102 from the communication L151 including the V2V communication to the communication L161, L162 including the V2I communication via the RSU 12-1.

Therefore, in step S54, the communication establishment unit 224 requests to establish communication by controlling the communication unit 103 at the timing immediately before being in the NLOS state (that is, almost at the same time as step S53) to form a communication link with respect to new another terminal. For example, it requests the RSU 12-1 to form the communication link.

In step S61, the communication establishment unit 253 controls the communication unit 232 to determine whether or not the communication link formation has been requested, and in a case where there has been a request, the processing proceeds to step S62.

In step S62, the communication establishment unit 253 controls the communication unit 232 to form a communication link with the vehicle 11 for which formation of a communication link has been requested, and establishes communication.

In a case where the NLOS state is predicted on the basis of the geographical information by the above series of processing, the communication link formation can be changed before the communication state deteriorates by changing the communication link in advance. Therefore, it is possible to prevent the communication from being deteriorated and being disconnected.

Thus, a highly reliable communication can be realized.

Note that, in the above, an example of changing from a communication link configuration based on the V2V communication to a communication link configuration based on the V2I communication via the RSU 12-1 has been described, but the communication link may be changed to communication L163, L164 including V2V2V communication via the vehicle 11-101.

In this case, when the formation of the communication link is requested, the angle of a beam in beamforming can be specified by providing the information of the traveling direction of the vehicle 11-101 when viewed from the vehicle 11-102, and it is possible to realize high-speed switching when the communication link is switched.

<Communication Control Processing that Limits the Beam Steering Area in Beamforming>

Figure 14:
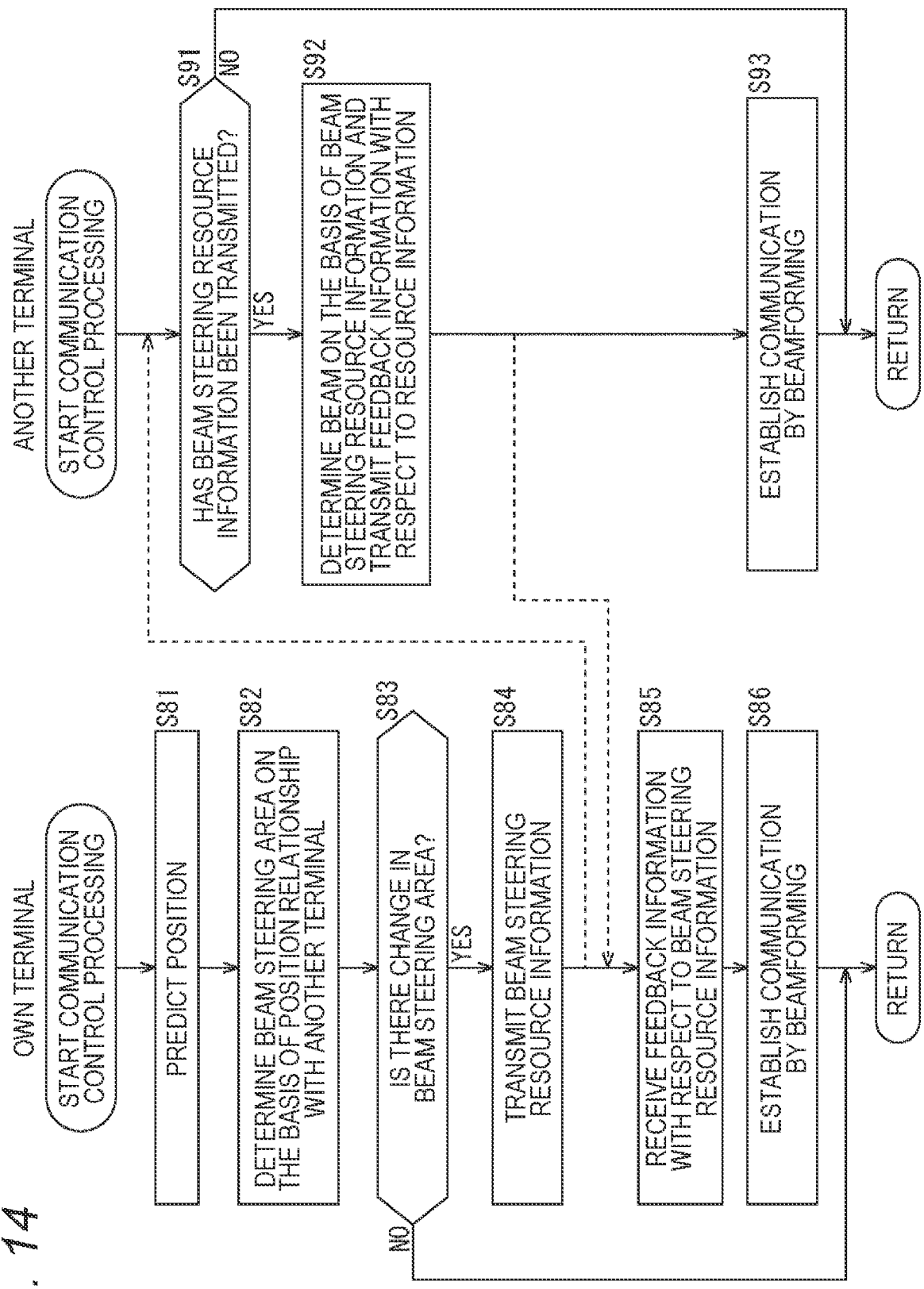
FIG. 14 is a flowchart explaining communication control processing that limits a beam steering area in beamforming.

Next, among the communication control processing for controlling the communication unit 103, the communication control processing for limiting the beam steering area when performing beamforming will be described with reference to the flowchart of FIG. 14.

In step S81, the position prediction unit 222 predicts the information of the relationship of the current and future positions of the own terminal and another terminal as geographical information on the basis of the time-series own terminal position information stored in the own terminal position information storage unit 215, the time-series another terminal information stored in the another terminal information storage unit 213 (including position information and route information), and the route information of the own terminal.

In step S82, the own terminal control unit 223 acquires the geographical information predicted by the position prediction unit 222, and, on the basis of the acquired geographical information, determines another terminal, which is a communication target, from the relative position relationship between the terminals: the own terminal and the another terminal, and sets an area for performing beam steering for the determined another terminal.

That is, general beam steering is performed with respect to 360 degrees around the own terminal, but the own terminal control unit 223 sets a beam steering area on the basis of the traveling direction of the vehicle 11, which is the own terminal, for example, to the vehicle 11, which is the another terminal as the communication target.

More specifically, as shown in the situation St12 of FIG. 12, it is assumed that vehicles 11-103, 11-104 travel on the road 261-2 upward in the drawing (toward the intersection of the roads 261-1, 261-2).

In this case, it is assumed that the vehicle 11-103 selects the vehicle 11-104 as the communication target on the basis of the positional relationship between the position information of the another terminal based on the another terminal information in the vicinity and the own terminal position information.

At this time, the own terminal control unit 223 of the vehicle 11-103 sets a range Z31 in which the vehicle 11-104, which is a communication target, exists as the beam steering area with respect to its own traveling direction. More specifically, the own terminal control unit 223 sets, for example, a range Z31 of 10 to 30 degrees on the right side of the drawing as a beam steering area with respect to its own traveling direction.

In step S83, the own terminal control unit 223 determines whether or not there is a change in the current beam steering area, and in a case where there is a change, the processing proceeds to step S84.

In step S84, the own terminal control unit 223 controls the communication unit 103 to transmit beam steering resource information and beam ID information to the vehicle 11, which is another terminal and is a communication target. At the same time, a candidate beam steering area may be transmitted to the another terminal. At this time, the another terminal does not necessarily have to be a communication object, and broadcast communication may be used. The information transmitted from such transmission terminals may be used in peripheral terminals for grasping an interference situation in the surroundings. A notification of such information is given using sidelink control information (SCI) in the sidelink. This SCI may be transmitted in a frequency band different from the frequency for beamforming.

In step S91, for example, the communication establishment unit 224 of the vehicle 11, which is another terminal, controls the communication unit 103 to receive the beam steering resource information and the beam ID information. Furthermore, the candidate beam steering area may be transmitted to and received by surrounding vehicles.

In step S92, the own terminal control unit 223 of the vehicle 11, which is another terminal, controls the communication unit 103 to transmit feedback information of the beam steering resource information and the beam ID information to the vehicle 11 (of the own terminal), which is a transmission source.

In step S84, the own terminal control unit 223 of the vehicle 11, which is the own terminal, receives the feedback information of the beam steering resource information and the beam ID information.

After this series of processing, in the processing of steps S85, S93, channel state information (CSI) acquisition is performed, between the own terminal, which is the vehicle 11 as the transmission source, and the another terminal, which is the vehicle 11 as a communication target, by the communication establishment units 224 of the own terminal and the another terminal, and the number of MIMO layers, a modulation and coding scheme (MCS) to be used, and transmission power are determined, so that communication by beamforming is established.

Note that in a case where there is no change in the beam steering area in step S82, the processing of steps S83 to S85 is skipped. In this case, since the beam steering resource information is not transmitted in step S91, the processing of steps S92, S93 is skipped, and the current communication is maintained.

By the above processing, it is possible to set only the range in which the communication target exists with a high probability as a beam steering range according to the geographical information, and it is possible to establish the communication with the communication target more quickly, so that the occurrence of delay or the like can be suppressed. Furthermore, since it is not necessary to set the beam steering range for an unnecessary range, it is possible to reduce the power consumption.

Thus, a highly reliable communication can be realized.

<Communication Control Processing that Prepares a Backup Communication Line when it is Determined that Blockage Occurs During Beamforming Communication in V2V Communication>

Figure 15:
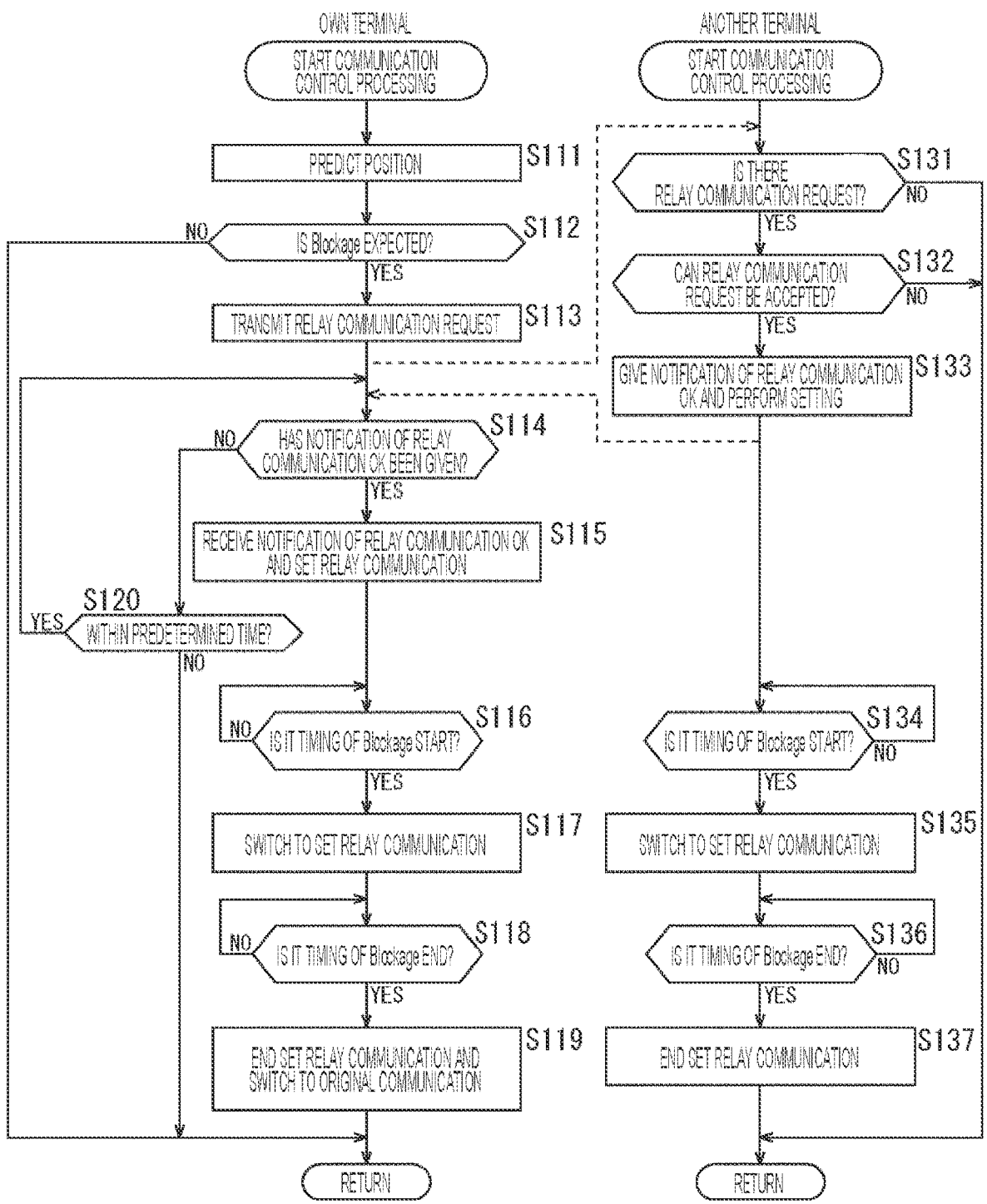
FIG. 15 is a diagram explaining communication control processing that prepares a backup communication line when it is determined that blockage occurs during beamforming communication in V2V communication.

Next, referring to the flowchart of FIG. 15, among communication control processing for controlling the communication unit 103, description is given of the communication control processing that prepares a backup communication line when it is determined that blockage occurs during millimeter wave beamforming communication in the V2V communication.

In step S111, the position prediction unit 222 predicts the information of the relationship of the current and future positions of the own terminal and another terminal as geographical information on the basis of the time-series own terminal position information stored in the own terminal position information storage unit 215, the time-series another terminal information stored in the another terminal information storage unit 213 (including position information and route information), and the route information of the own terminal.

In step S112, the own terminal control unit 223 acquires the geographical information predicted by the position prediction unit 222, and, on the basis of the acquired geographical information, determines whether or not blockage of a communication path is expected to occur, for example, due to entry of another vehicle 11 with respect to the another terminal, which is a communication target, on the basis of the acquired geographical information.

That is, for example, as shown in a situation St13 in FIG. 12, it is assumed that vehicles 11-105, 11-106 travel on the road 261-1 rightward in the drawing with communication L171 being established by beamforming communication.

Here, in a case where it is predicted that a vehicle 11-107 will travel on the road 261-2 from the upper side in the drawing downward in the drawing and cross between the vehicles 11-105, 11-106, it is assumed that occurrence of blockage due to the vehicle 11-107 is predicted in the range Z32 on the path of communication L171 between the vehicles 11-105, 11-106.

That is, in this case, in step S112, it is determined that blockage of the communication path may occur, and the processing proceeds to step S113.

In step S113, the own terminal control unit 223 searches for a communication target for relay communication from the relative positional relationship between the own terminal and the another terminal based on the geographical information predicted by the position prediction unit 222. Then, the own terminal control unit 223 controls the communication unit 103, and requests relay communication in line with the timing (start time, and end time (or blockage time)) at which the communication path blockage may occur to the searched communication target for relay communication.

Here, it is assumed that an RSU 12-2 in FIG. 12 is selected as the communication target for relay communication.

In step S131, the communication establishment unit 253 controls the communication unit 232 to determine whether or not there has been a request for relay communication, and in a case where there has been a request for relay communication, the processing proceeds to step S132.

In step S132, the own terminal control unit 252 determines whether or not the relay communication can be accepted on the basis of the received relay communication request. The own terminal control unit 252 determines whether or not relay communication is possible at the timing when blockage occurs such as whether or not there is a room for the number of communicable lines and the like.

In a case where the own terminal control unit 252 determines in step S132 that the relay communication can be accepted, the processing proceeds to step S133.

In step S133, the own terminal control unit 252 controls the communication unit 232 to give a notification that the relay communication can be accepted.

In step S114, the own terminal control unit 223 of the vehicle 11-103 controls the communication unit 103 to determine whether or not the notification indicating that the relay communication can be accepted has been given from the communication target for which the relay communication has been requested.

In a case where the notification indicating that the relay communication can be accepted is not given in step S114, the processing proceeds to step S120.

In step S120, the own terminal control unit 252 determines whether or not a predetermined time has elapsed after transmission of the relay communication request, and in a case where the predetermined time has not elapsed, the processing returns to step S114.

That is, in a case where it is within the predetermined time after requesting relay communication, the own terminal control unit 223 continues to wait for a response to the request for relay communication.

Then, in step S114, when a notification indicating that the relay communication can be accepted is given, the processing proceeds to step S115.

In step S115, the own terminal control unit 223 receives the notification indicating that the relay communication can be accepted. Furthermore, the communication establishment unit 224 sets the communication target for the relay communication on the basis of the notification indicating that the relay communication can be accepted. That is, here, the RSU 12-2 is set as a communication target.

In steps S116, S134, the communication establishment units 224, 253 determine whether or not the blockage start timing is reached, and similar processing is repeated until the blockage start timing is reached.

In steps S116, S134, when the blockage start timing is reached, the processing proceeds to steps S117, S135, respectively.

In steps S117, S135, the communication establishment units 224, 253 control the respective communication units 103, 232 to bring them into the set relay communication state.

That is, as shown in FIG. 12, at the blockage start timing, the communication establishment units 224, 253 control the respective communication units 103, 232 to switch the state of the communication L171 including the V2V communication to communication L181, L182 including the V2I communication via the RSU 12-2.

As a result, even if the vehicle 11-107 cuts in between the vehicles 11-105, 11-106 and the path of the communication L171 is blocked, the communication can be continued by the relay communication via the communication L181, L182.

In steps S118, S136, the communication establishment units 224, 253 determine whether or not a blockage end timing is reached, and similar processing is repeated until the blockage end timing is reached.

Then, in steps S118, S136, when the blockage end timing is reached, the processing proceeds to steps S119, S137, respectively.

In steps S119, S137, the communication establishment units 224, 253 control the respective communication units 103, 232 to end the set relay communication and return to the original communication.

That is, as shown in FIG. 12, at the blockage end timing, the communication establishment units 224, 253 control the respective communication units 103, 232 to switch the state from the communication L181, L182 including the V2I communication to the communication L171 including the V2V communication.

As a result, the communication between vehicles 11-105, 11-106 is returned to the original state.

Note that in a case where no communication blockage is expected in step S111 or in a case where a predetermined time has elapsed in step S120, the processing of steps S113 to S120 is skipped.

Furthermore, in a case where there is no relay communication request in step S131 or in a case where relay communication is not accepted in step S132, the processing of steps S133 to S137 is skipped.

By the above processing, in a case where communication blockage is expected on the basis of geographical information, relay communication can be prepared in advance and the relay communication can be used only at the timing when communication blockage occurs. Therefore, it is possible to continue the communication state by avoiding communication blockage in advance.

Thus, a highly reliable communication can be realized.

3. Second Embodiment

In the above, description is given of the example of controlling the communication on the basis of the predicted geographical information, but information of the actual communication state of another terminal is created in a database according to the geographical information, and on the basis of the database, a mapping table that maps the communication type, parameters, and communication quality according to the position information may be generated, and the optimum communication may be selected by using this mapping table.

Figure 16:
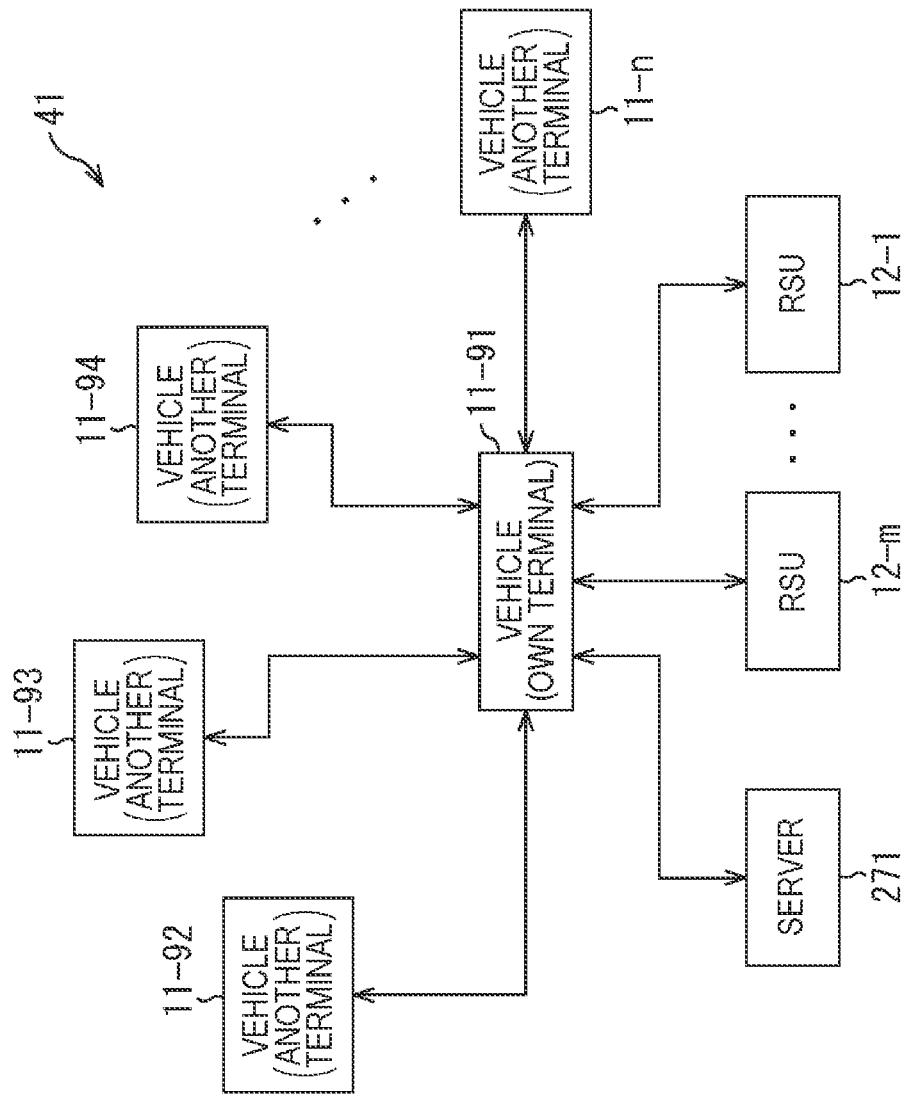
FIG. 16 is a diagram explaining a configuration example of a second embodiment in a communication system of the present disclosure.

FIG. 16 is a configuration example of a communication system 41 in which information based on the actual communication state of another terminal is created in a database according to geographical information, and on the basis of the database, a mapping table that maps the communication type, parameters, and communication quality according to the position information is generated, and the mapping table is distributed to each vehicle (each terminal) so that the optimum communication can be selected on the basis of the information in the mapping table corresponding to the predicted position.

Note that, in FIG. 16, the configurations having the same functions as the communication system 41 of FIG. 5 are designated by the same reference numerals, and the description thereof will be omitted as appropriate.

That is, in FIG. 16, the difference from the communication system 41 of FIG. 5 is that a server 271 is provided.

That is, the server 271 generates a communication information database, generates a mapping table that maps the communication type, parameters, and communication quality according to the position information, and distributes the mapping table to the vehicle 11.

Upon receiving the distribution of the mapping table, the vehicle 11 stores the mapping table in advance, and manages the communication state by referring to the mapping table according to the position information of the own terminal at each time in moving.

Note that the communication management unit 144 in the vehicle control system of the vehicle 11 has also been changed so that communication management can be performed based on the mapping table, and the details will be described later with reference to FIG. 18.

<Configuration Example of the Server that Generates Mapping Table>

Figure 17:
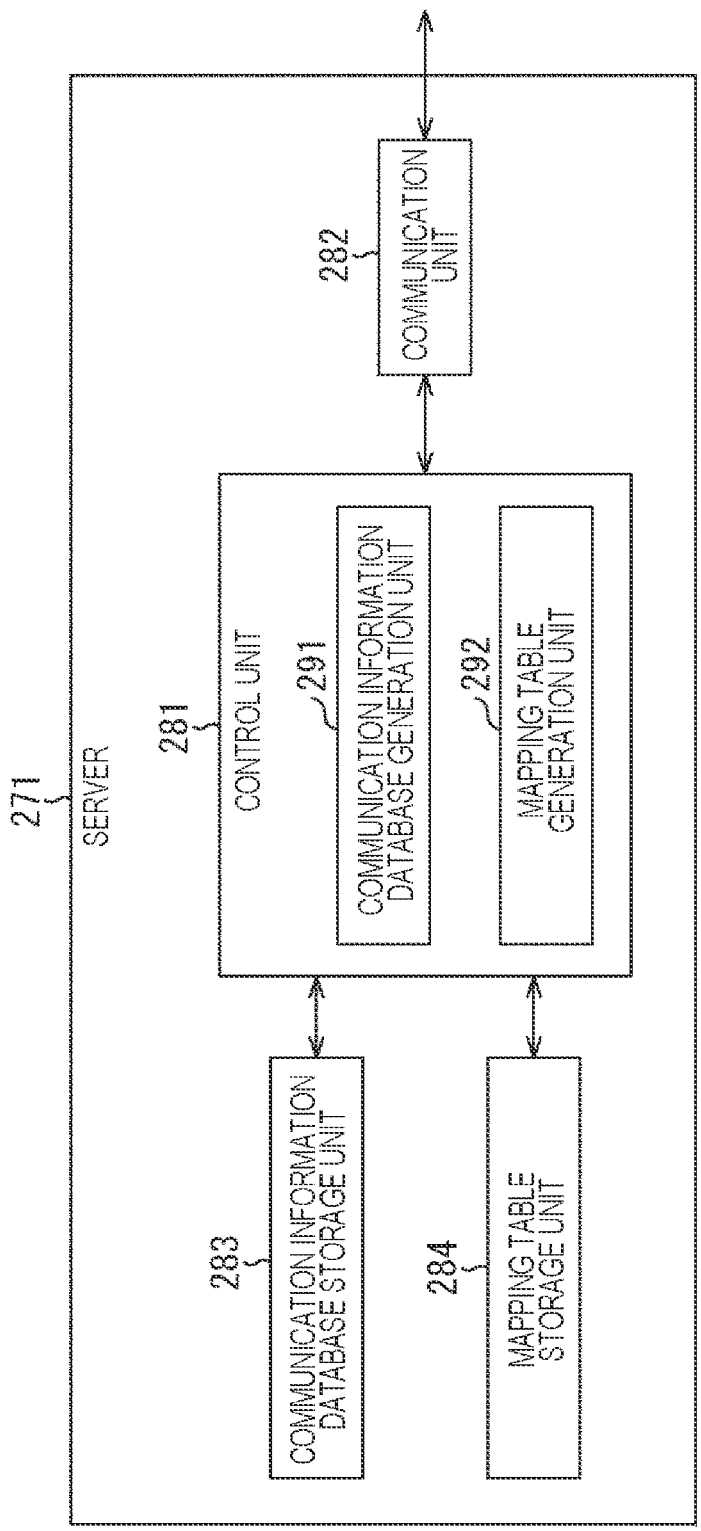
FIG. 17 is a diagram explaining a configuration example of a server of FIG. 16.

Next, a configuration example of the server 271 that generates the mapping table will be described with reference to FIG. 17.

The server 271 includes a control unit 281, a communication unit 282, a communication information database storage unit 283, and a mapping table storage unit 284.

The control unit 281 includes a communication information database generation unit 291 and a mapping table generation unit 292, and controls the entire operation of the server 271.

The communication information database generation unit 291 controls the communication unit 282 to acquire the terminal ID information, the terminal position information, the communication type (communication method) at the time of transmission at each position, and the communication parameter of each terminal as transmission information.

Furthermore, the communication information database generation unit 291 controls the communication unit 282 to acquire the terminal ID information, the terminal position information, the type of communication method at the time of reception at each position, and whether or not reception is possible of each terminal as reception information.

Moreover, the communication information database generation unit 291 registers the transmission information and the reception information in the communication information database stored in the communication information database storage unit 283.

The mapping table generation unit 292 generates, on the basis of the communication information database stored in the communication information database storage unit 283, a mapping table that maps communication information including communication quality information indicating communication performance to be obtained, and a communication method and communication parameter to be used for each position information, and causes the mapping table storage unit 284 to store the mapping table.

The control unit 281 controls the communication unit 282 and distributes the mapping table stored in the mapping table storage unit 284 to each terminal including the vehicle 11.

The vehicle 11 acquires the mapping table and stores it in advance, and when moving, collates the mapping table on the basis of the own terminal position information, reads communicate information including the type of communication method, communication parameters, and communication quality, and controls communication on the basis of the read communication information.

<Configuration Example of the Communication Management Unit that Manages Communication Using the Mapping Table>

Next, a configuration example of the communication management unit 144 that manages communication by using the mapping table will be described with reference to FIG. 18. Note that in the configuration of the communication management unit 144 of FIG. 18, the configurations having the same functions as the configuration of the communication management unit 144 of FIG. 7 are designated by the same reference numerals, and the description thereof will be omitted as appropriate.

Figure 7:
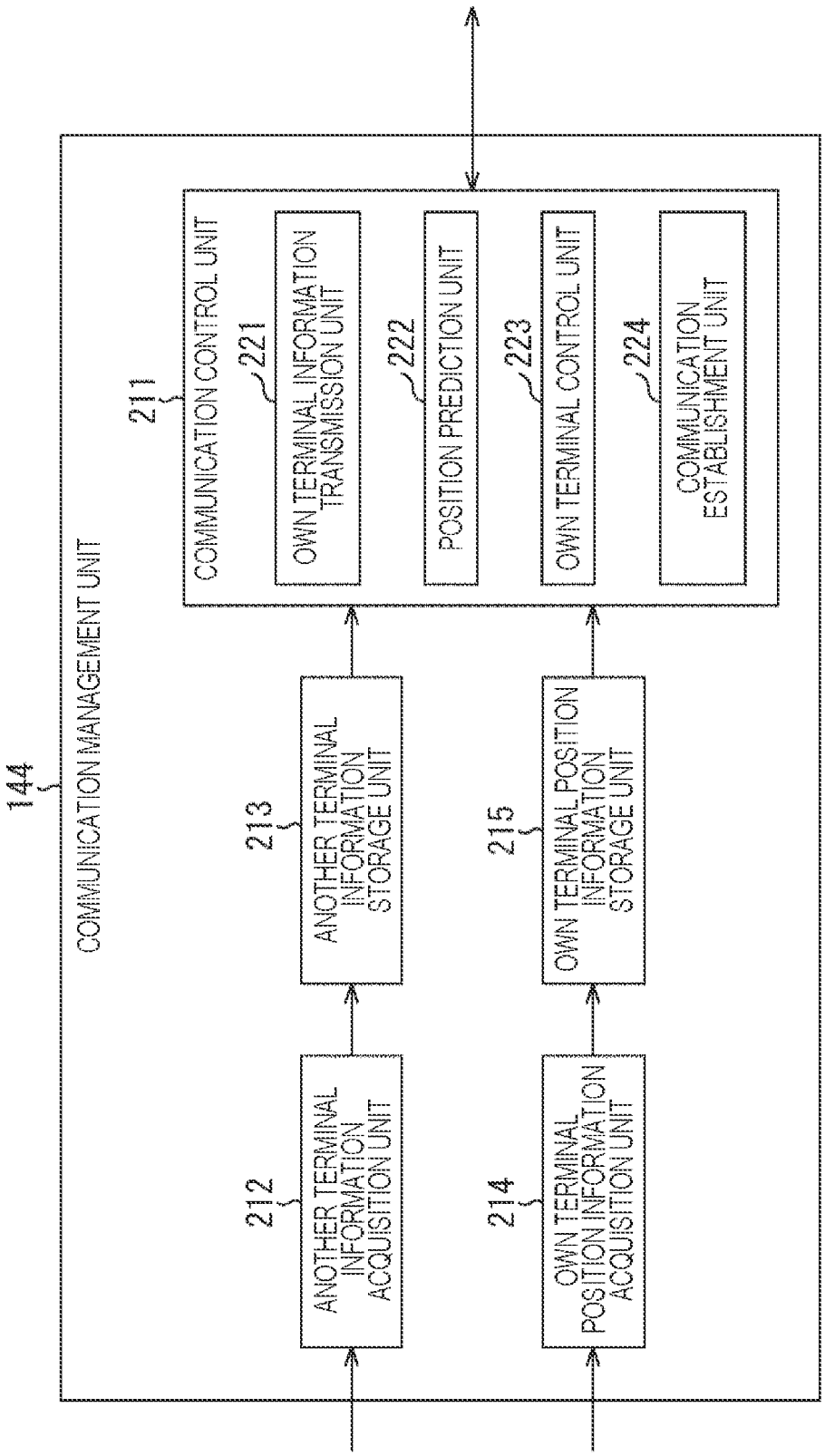
FIG. 7 is a diagram explaining a configuration example of the first embodiment of a communication management unit of FIG. 6.
Figure 18:
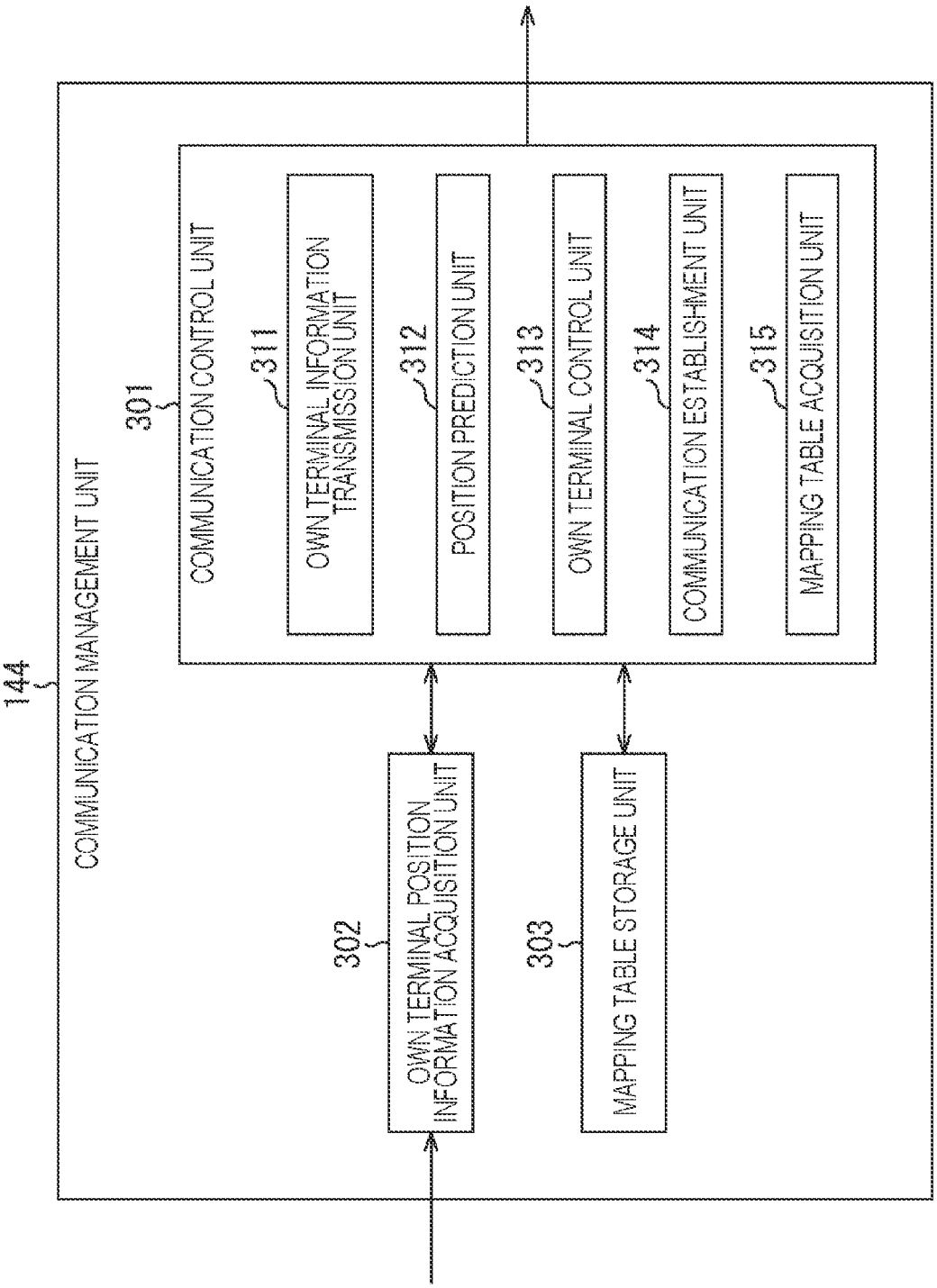
FIG. 18 is a diagram explaining a configuration example of the second embodiment of the communication management unit of FIG. 6.

That is, the communication management unit 144 of FIG. 18 is different from the communication management unit 144 of FIG. 7 in that a communication control unit 301 is provided in place of the communication control unit 211 and a mapping table storage unit 302 is newly provided.

The communication control unit 301 includes an own terminal information transmission unit 311, a position prediction unit 312, an own terminal control unit 313, a communication establishment unit 314, and a mapping table acquisition unit 315, and controls the entire operation of the communication management unit 144.

Note that since the own terminal information transmission unit 311, the position prediction unit 312, and the communication establishment unit 314 have the same functions as the own terminal information transmission unit 221, the position prediction unit 222, and the communication establishment unit 224 of FIG. 7, the description will be omitted as appropriate.

The own terminal control unit 313 controls the position prediction unit 312 to predict the positions of the own terminal and another terminal, collates the mapping table stored in the mapping table 303 according to the predicted position information, reads the communication information registered in association with the position information, and controls the communication unit 103.

The mapping table acquisition unit 315 controls the communication unit 103 to acquire the mapping table distributed from the server 271 and store it in the mapping table storage unit 302.

The mapping table storage unit 302 stores the mapping table acquired by the mapping table acquisition unit 315, and also provides the communication information corresponding to the own terminal position information by the own terminal control unit 313.

<Communication Control Processing Using the Mapping Table>

Figure 19:
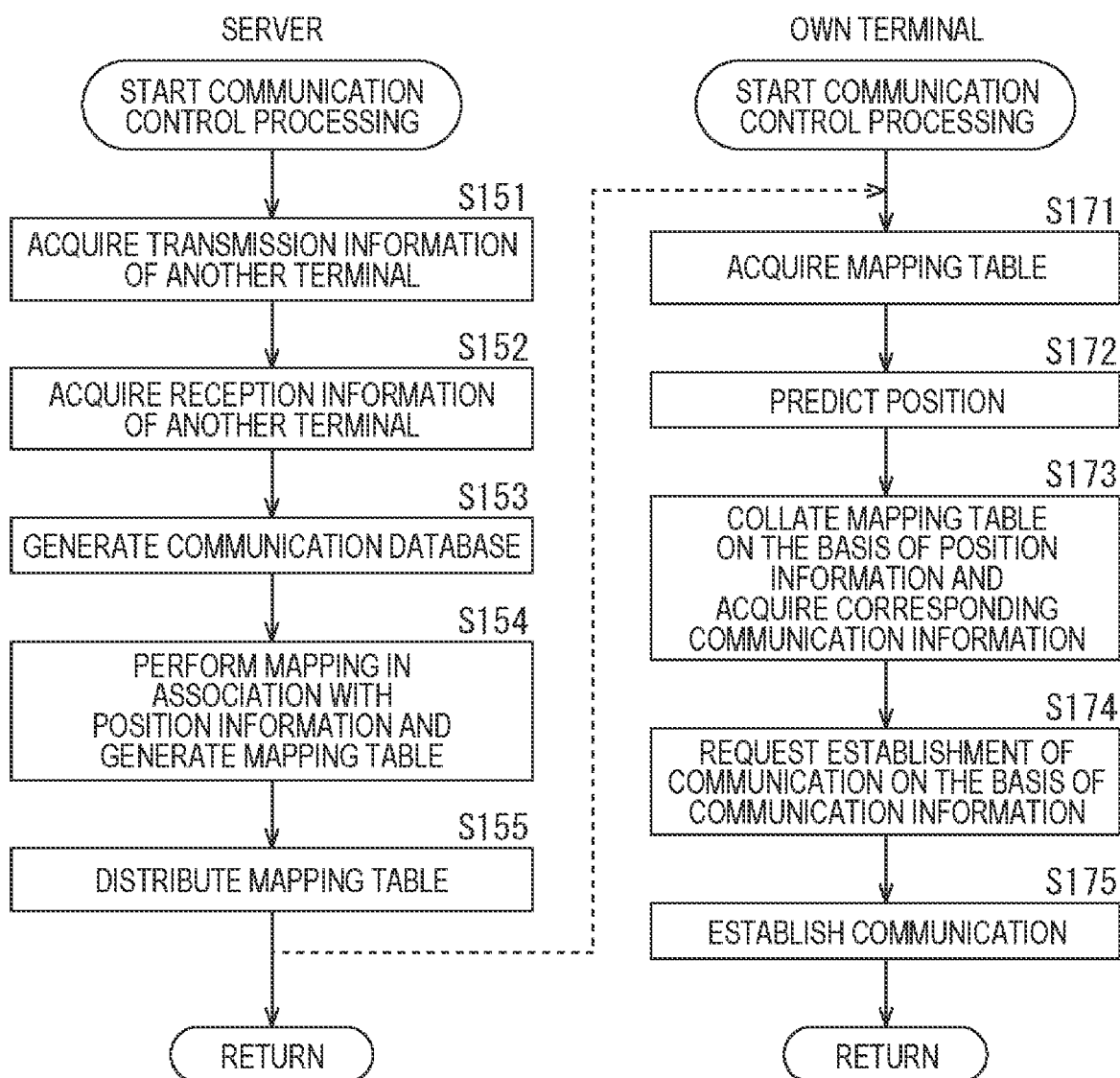
FIG. 19 is a flowchart explaining communication management processing according to the second embodiment.

Next, the communication control processing using the mapping table will be described with reference to the flowchart of FIG. 19. Note that although the description includes the processing of generating the mapping table by the server 271 as a part of the communication control processing, the processing of generating the mapping table may be executed independently. Furthermore, since the communication management processing is similar to the processing described with reference to the flowchart of FIG. 9, the description thereof will be omitted.

In step S151, the communication information database generation unit 291 of the server 271 controls the communication unit 282 to acquire the terminal ID information of a terminal including each vehicle 11, the terminal position information, and the type of communication method and communication parameters at the time of transmission in each terminal position information as transmission information.

In step S152, the communication information database generation unit 291 controls the communication unit 282 to acquire the terminal ID information of each terminal measured in advance, the terminal position information, the type of communication method at the time of reception in each terminal position information, and whether or not reception is possible as reception information.

In step S153, the communication information database generation unit 291 creates a database of the acquired transmission information and reception information, and registers the database as the communication information database stored in the communication information database storage unit 283.

In step S154, the mapping table generation unit 292 generates, on the basis of the communication information database stored in the communication information database storage unit 283, a mapping table that maps communication information including communication quality information indicating communication performance to be obtained, and a communication method and communication parameter to be used for each position information, and causes the mapping table storage unit 284 to store the mapping table.

In step S155, the control unit 281 distributes the mapping table stored in the mapping table storage unit 284 to the terminal including each vehicle 11.

In step S171, the mapping table acquisition unit 315 of the communication management unit 144 in the vehicle control system 100 constituting the vehicle 11 controls the communication unit 103 to acquire the mapping table distributed by the server 271 as geographical information, and causes the mapping table storage unit 302 to store the mapping table.

In step S172, the position prediction unit 312 predicts the information of the relationship of the current and future positions of the own terminal and another terminal as geographical information on the basis of the time-series own terminal position information stored in the own terminal position information storage unit 215, the time-series another terminal information stored in the another terminal information storage unit 213 (including position information and route information), and the route information of the own terminal.

In step S173, the own terminal control unit 313 acquires the predicted geographical information, collates the mapping table according to the position information based on the acquired geographical information, and reads the type of communication method, parameters, and communication quality information, which are corresponding communication information.

In step S174, the communication establishment unit 314 selects the optimum communication target terminal on the basis of the acquired communication information, controls the communication unit 103 by the corresponding communication method and communication parameters, and requests establishment of communication to the terminal, which is the communication target.

In step S175, the communication establishment unit 314 controls the communication unit 103 to establish communication.

By the above processing, the communication information including the type of communication method, parameters, and communication quality information is read from the mapping table on the basis of the position information, the optimum communication target with the highest communication quality is selected on the basis of the communication information, thereby realizing highly reliable communication.

4. Third Embodiment

In the above, the description is given of the example in which the communication information corresponding to the position information is distributed as a mapping table in advance, the mapping table is collated on the basis of the geographical information, and the optimum communication target is selected on the basis of the communication information read from the mapping table, but the optimum communication target may be selected by using dynamic three-dimensional map information called a dynamic map.

<Dynamic Map>

Here, the dynamic map will be described. The dynamic map is a map in which a time axis is added to a three-dimensional map (3D map), and furthermore, a map in which a plurality of layers is set according to the magnitude of time-series changes, for example, a map M1 shown in FIG. 20.

Figure 20:
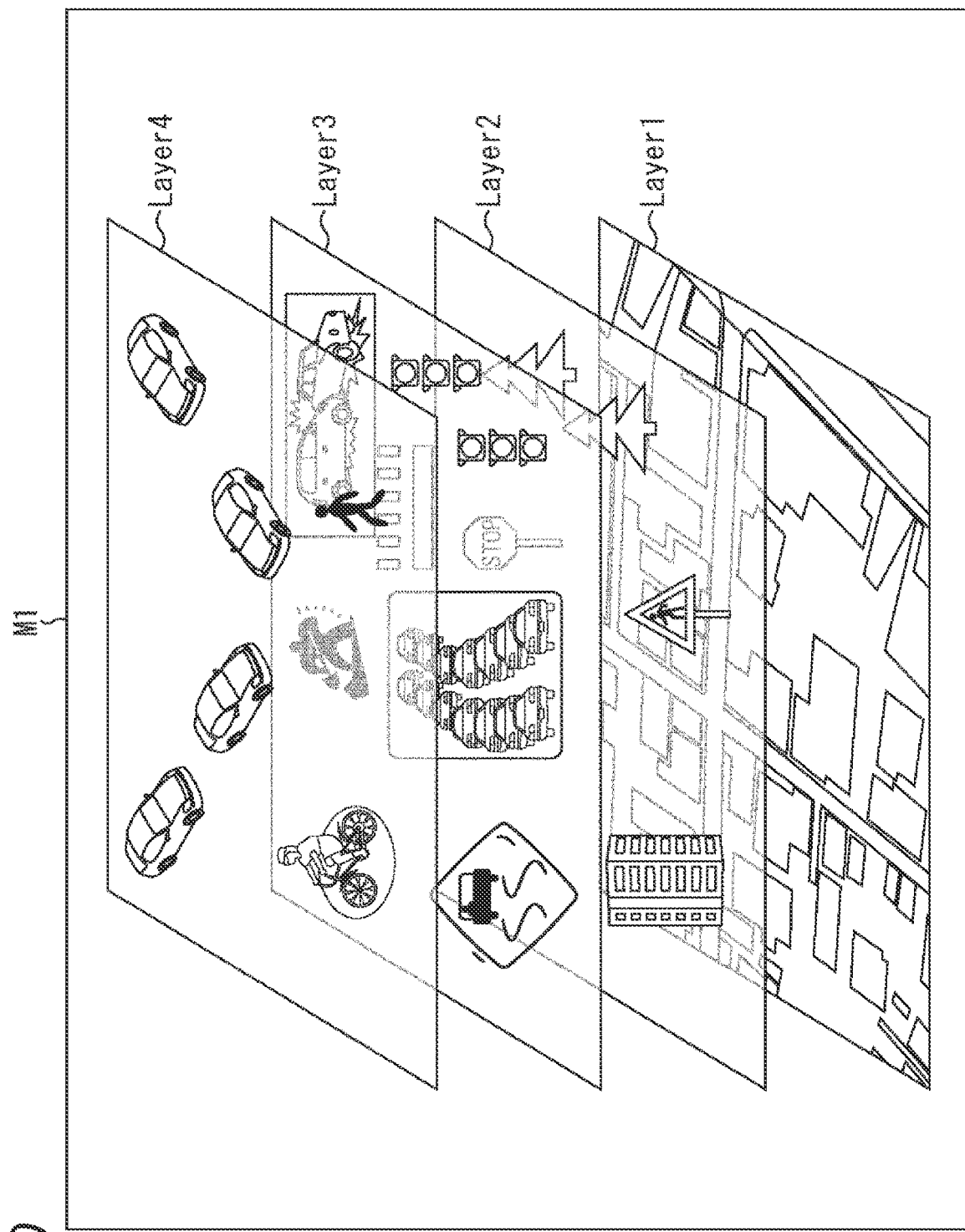
FIG. 20 is a diagram explaining a dynamic map.

The dynamic map M1 of FIG. 20 is a three-dimensional map including four types of layers including a first layer (Layer 1) to a fourth layer (Layer 4). Note that the number of layers is not limited to this, but may be four or more or four or less.

Here, the first layer (Layer 1) is a high-precision road map in which there are almost no time-series changes. Furthermore, the second layer (Layer 2) is a map in which buildings, signs, and the like that change little next to the road are arranged. Moreover, the third layer (Layer 3) is a map including road surface conditions, traffic lights, traffic congestion information, and the like that change depending on the situations. Furthermore, the fourth layer (Layer 4) is a map indicating the positions of the vehicles 11, pedestrians, bicycles, and the like which change from moment to moment. That is, in the dynamic map, layers are set according to the frequency of changes in time series.

This dynamic map is distributed to the vehicle 11 while being sequentially updated by the server, and the vehicle 11 controls communication while estimating the communication situations on the basis of the dynamic map.

At this time, the vehicle 11 identifies the propagation path from the road map on which it travels and the arrangement of three-dimensional structures such as buildings, and estimates the communication state. At this time, the vehicle 11 acquires, for example, a three-dimensional map M11 as shown in FIG. 21 from the information of the first layer and the second layer constituting the dynamic map M1, and estimates the communication state in the propagation path during communication.

Figure 21:
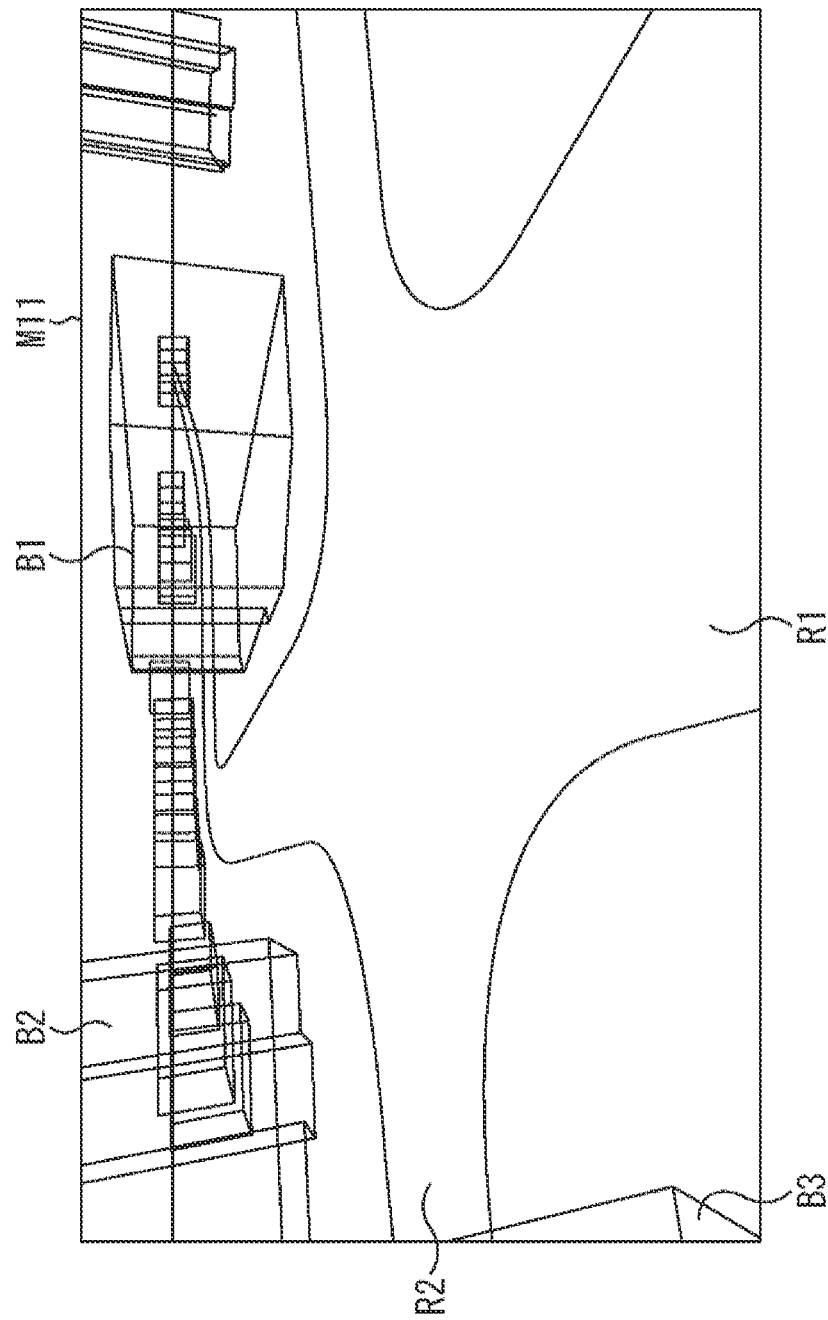
FIG. 21 is a diagram explaining a three-dimensional map.

Note that, in FIG. 21, the intersection of roads R1, R2 is drawn in the center of the drawing, and three-dimensionally displayed buildings B1 to B3 are drawn at the corners of the intersection.

The vehicle 11 generates a three-dimensional map as shown in FIG. 21 from the information of the dynamic map M1 as shown in FIG. 20, identifies the communication path with the communication target, estimates the communication state from the propagation path corresponding to the identified communication path, and determines the communication target, the communication method, the communication parameters, and the like on the basis of the estimation result.

As a result, it is possible to realize optimum communication control after grasping the communication situations to some extent, and it is possible to realize highly reliable communication.

<Configuration Example of the Communication System Using the Dynamic Map>

Figure 22:
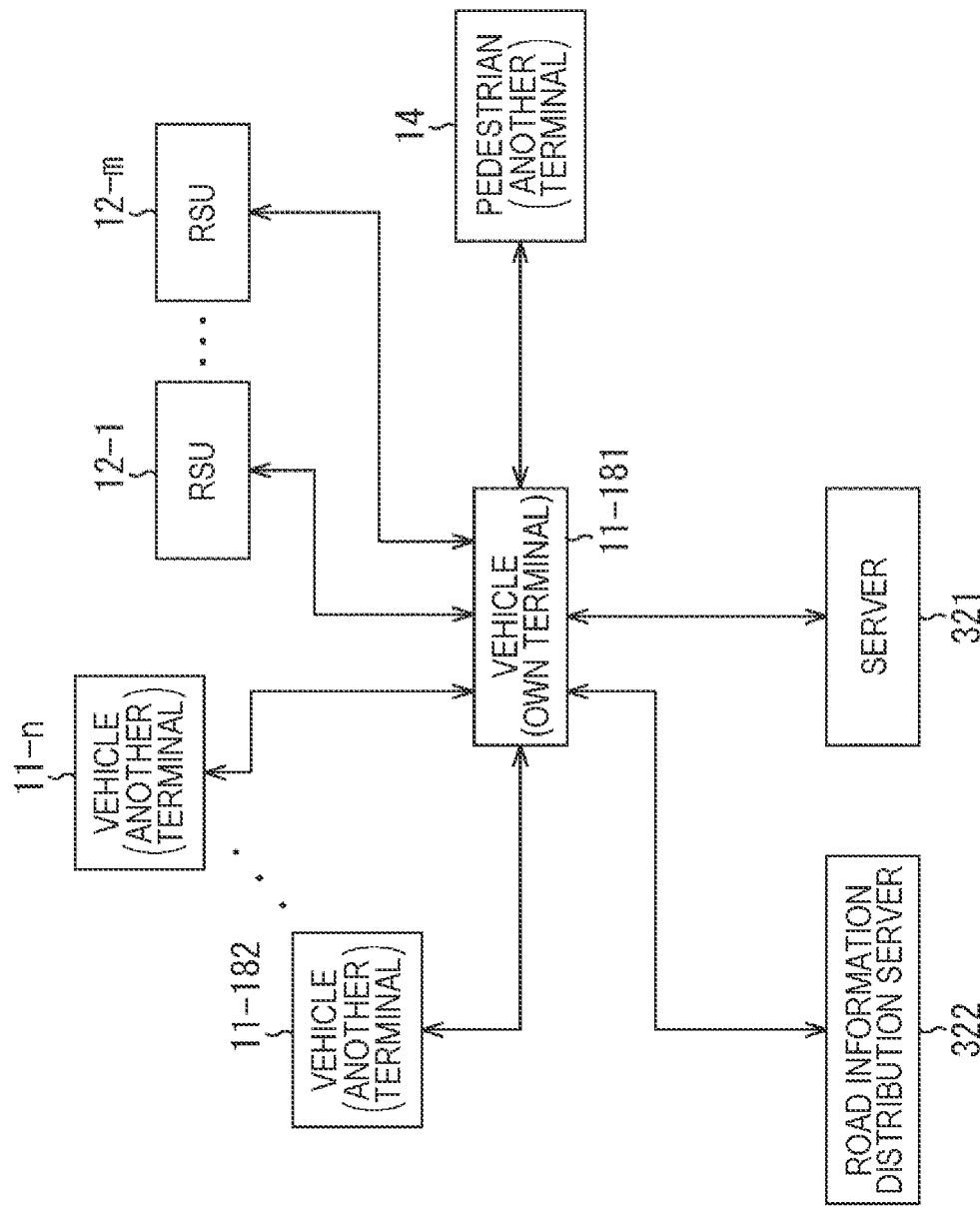
FIG. 22 is a diagram explaining a configuration example of a third embodiment in a communication system of the present disclosure.

FIG. 22 is a configuration example of a configuration example 41 of the communication system using the dynamic map.

Note that, in FIG. 22, the configurations having the same functions as the communication system 41 of FIG. 5 are designated by the same reference numerals, and the description thereof will be omitted as appropriate.

That is, in FIG. 22, the difference from the communication system 41 of FIG. 5 is that a server 321 and a road information distribution server 322 are provided.

The server 321 acquires the respective position information from vehicles 11-181 to 11-n, also acquires the road information distributed from the road information distribution server 322, generates a dynamic map, and distributes the dynamic map to the vehicles 11-181 to 11-n.

The road information distribution server 322 generates road information such as traffic congestion, traffic lights, and road surface conditions, and supplies it to the server 321.

<Configuration Example of the Server that Generates the Dynamic Map>

Figure 23:
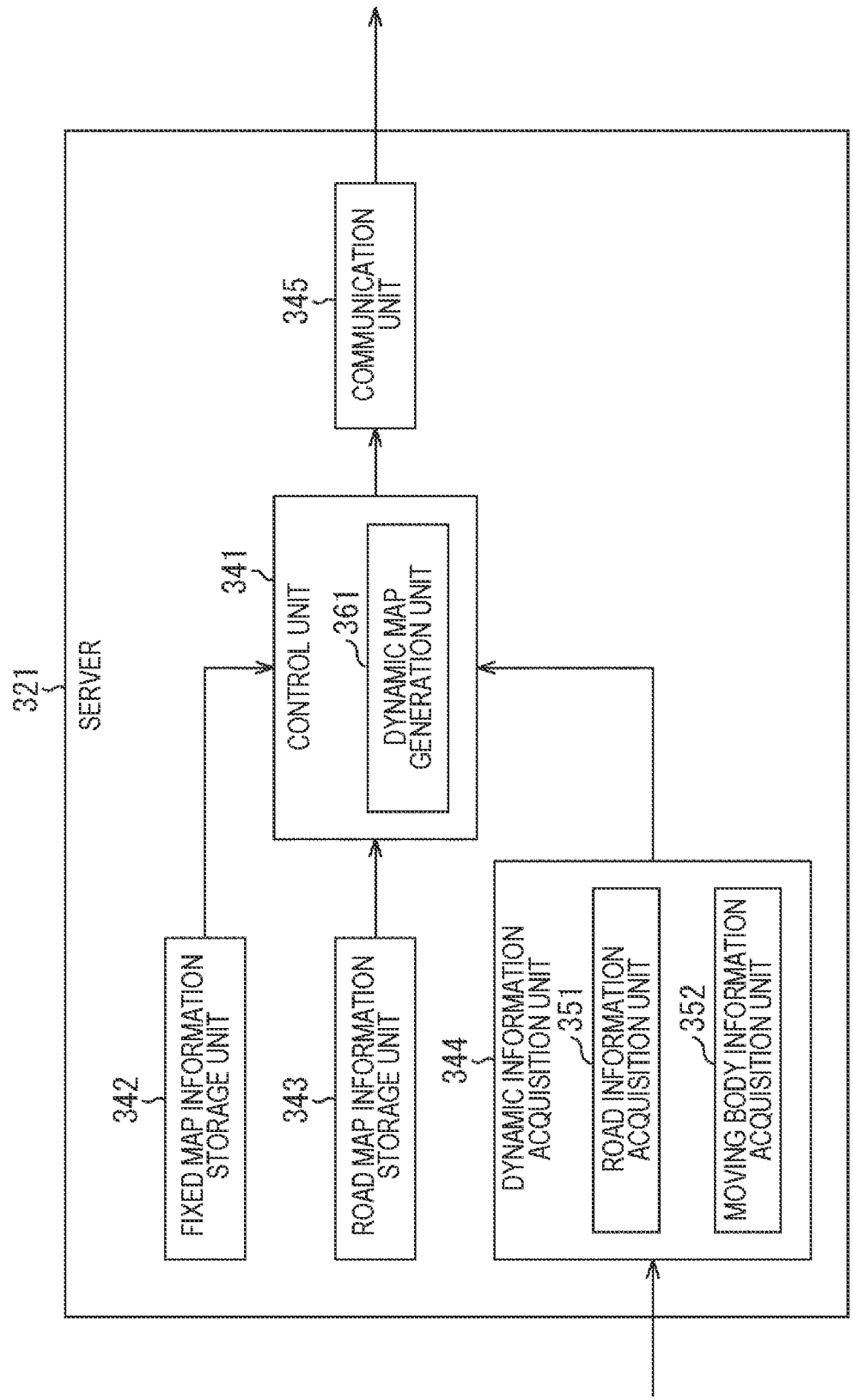
FIG. 23 is a diagram explaining a configuration example of a server of FIG. 22.

Next, a configuration example of the server 321 that generates the dynamic map will be described with reference to FIG. 23.

The server 321 includes a control unit 341, a fixed map information storage unit 342, a road map information storage unit 343, a dynamic information acquisition unit 344, and a communication unit 345.

The control unit 341 includes a processor, a memory, and the like, and controls the entire operation of the server 321. Furthermore, the control unit 341 includes a dynamic map generation unit 361, and controls the communication unit 345 to distribute the dynamic map generated by the dynamic map generation unit 361 to the vehicle 11.

The dynamic map generation unit 361 generates a dynamic map on the basis of information of three-dimensional structures such as signs and buildings stored in the fixed map information storage unit 342, a road map stored in the road map information storage unit 343, a dynamic road information acquired by the dynamic information acquisition unit 344, and position information of the vehicle 11 or the pedestrian 14.

The fixed map information storage unit 342 stores the information of the three-dimensional structures such as buildings as a fixed map and supplies it to the control unit 341.

The road map information storage unit 343 stores the road map information and supplies it to the control unit 341.

The dynamic information acquisition unit 344 includes a road information acquisition unit 351 and a moving body information acquisition unit 352, acquires road information and moving body information, and supplies them to the control unit 341.

The road information acquisition unit 351 acquires information including traffic congestion information, operating state information of a traffic light or the like, and road surface condition information, and the like supplied from the road information distribution server 322 as road information, and supplies it to the control unit 341.

The moving body information acquisition unit 352 acquires position information from a terminal, which is a moving body such as the vehicle 11 and the pedestrian 14, as moving body information, and supplies it to the control unit 341.

The communication unit 345 is controlled by the control unit 341 and transmits and receives various data to and from the terminal of a moving body such as the vehicle 11 and the pedestrian 14, the server 321, and the road information distribution server 322.

<Configuration Example of the Communication Management Unit that Executes the Communication Management Processing Using the Dynamic Map>

Figure 24:
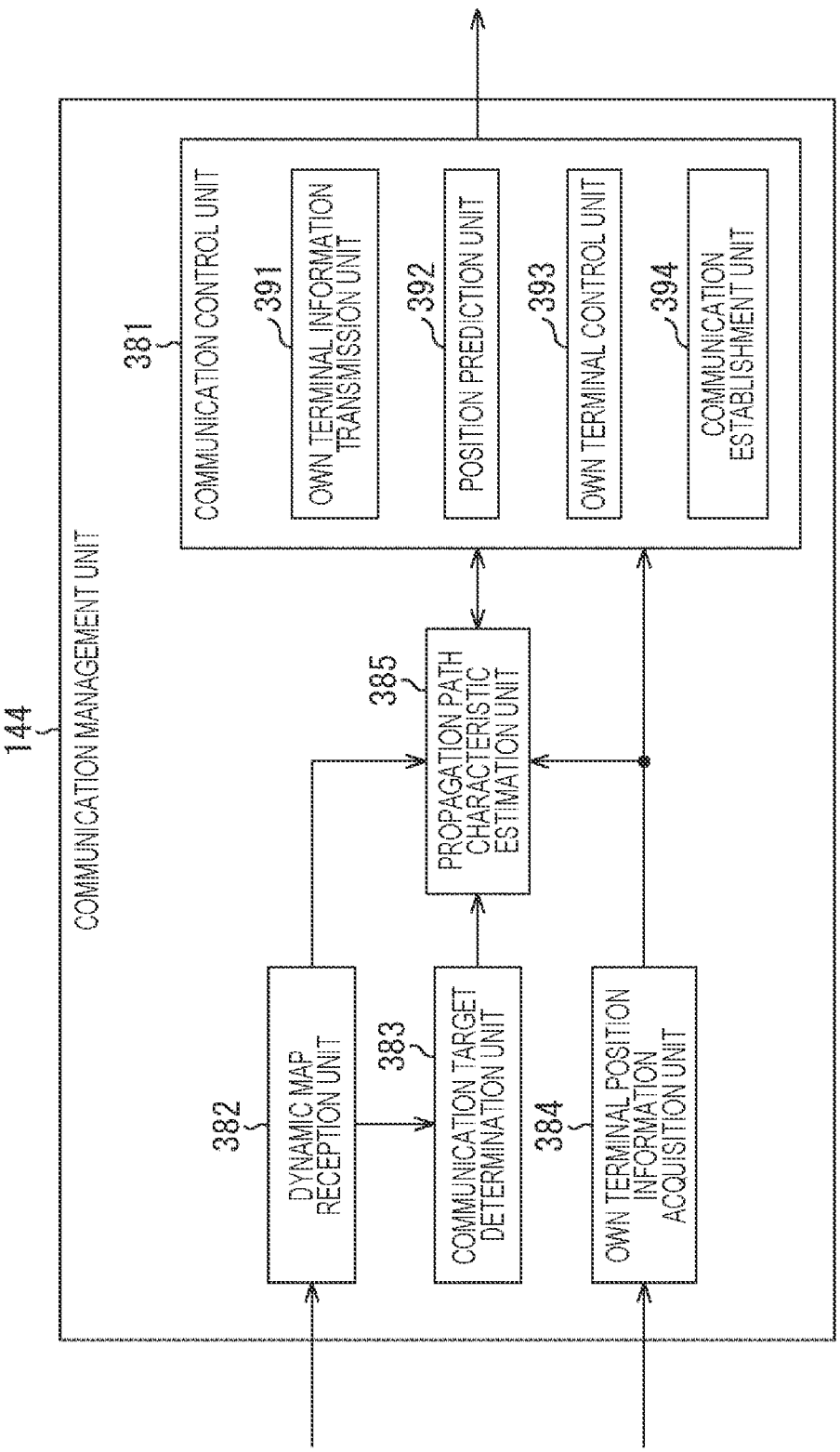
FIG. 24 is a diagram explaining a configuration example of the third embodiment of the communication management unit of FIG. 6.

Next, a detailed configuration example of the communication management unit 144 that executes the communication management processing using the dynamic map will be described with reference to FIG. 24.

The communication management unit 144 includes a communication control unit 381, a dynamic map reception unit 382, a communication target determination unit 383, an own terminal position information acquisition unit 384, and a propagation path characteristic estimation unit 385.

The communication control unit 381 includes an own terminal information transmission unit 391, a position prediction unit 392, an own terminal control unit 393, and a communication establishment unit 394, and controls the entire operation of the communication management unit 144. Note that since the communication establishment unit 394 is similar to the communication establishment unit 224, the description thereof will be omitted.

The own terminal information transmission unit 391 controls the communication unit 103 to transmit the own terminal position information acquired by the own terminal position information acquisition unit 384 to the server 321.

The position prediction unit 392 predicts the information of the current and future positions of the own terminal as geographical information on the basis of the own terminal position information acquired by the own terminal position information acquisition unit 384 and the route information of the own terminal, and supplies the information to the propagation path characteristic estimation unit 385. At this time, for example, a Kalman filter or the like may be used to predict the position handling a plurality of pieces of position information. Note that the position prediction unit 392 may acquire the position information of the own terminal by the dynamic map reception unit 382 instead of the own terminal position information acquired by the own terminal position information acquisition unit 384.

The own terminal control unit 393 controls the communication unit 103 on the basis of a propagation characteristic estimation result based on the dynamic map, identifies the communication target, the communication method, and the communication parameters, and controls the communication unit 103 to establish communication.

The dynamic map reception unit 382 receives the dynamic map distributed from the server 321 by the V2N communication. As the dynamic map, a map using three-dimensional information such as surrounding buildings may be used.

Note that, in the present disclosure, description is given of the case where the dynamic map is provided from the server 321 by the V2N communication, but the dynamic map may be provided via the base station 31, the RSU 12, or the like. Furthermore, it may be provided as application data or may be provided as a communication parameter in communication control.

The communication target determination unit 383 determines a transmission target of the V2X communication on the basis of the surrounding vehicles, infrastructures, pedestrian terminal information, and the like obtained from the dynamic map, and the own terminal position information.

The own terminal position information acquisition unit 384 acquires the self position estimated by the self-position estimation unit 132 as the own terminal position, and supplies the self position to the propagation path characteristic estimation unit 385 and the communication control unit 381.

The propagation path characteristic estimation unit 385 estimates the propagation path characteristics of the transmission source and the transmission destination in a virtual space on the basis of the dynamic map, the communication target, the own terminal position information, and the geographical information predicted by the position prediction unit 392, and determines a communication means on the basis of the estimation result.

The propagation path characteristic estimation unit 385 may estimate the propagation path characteristics between transmission and reception by using the geographical information of the three-dimensional map as a dynamic map. For example, the information of three-dimensional structures of buildings between transmission and reception is used to estimate the propagation path characteristics, for example, by estimating the reflection characteristics of radio waves.

At this time, the propagation path characteristic estimation unit 385 may limit the layer information of the dynamic map to estimate the propagation path characteristics.

For example, in a case where a rougher estimation is performed, the propagation path characteristic estimation unit 385 may estimate the propagation path characteristics only on the basis of the most static layer information in the dynamic map, and in a case where a detailed estimation is performed, the propagation path characteristic estimation unit 385 may estimate the propagation path characteristics by taking into account not only the static layer, but also the dynamic layer.

The propagation path characteristic estimation unit 385 determines an appropriate communication means in a given virtual communication environment. Therefore, the propagation path characteristic estimation unit 385 uses a variation set of various transmission methods and simulates the propagation path characteristics of each of them in a virtual space.

The communication parameters used in the simulation include, for example, communication parameters set in the first embodiment.

Estimated propagation path characteristics include an estimated SINR at a reception terminal, a path loss value, fading, shadowing, and the like. In addition to this, the interference level given to another terminal, resource occupancy rate, and bandwidth congestion degree information may be taken into account in estimating the propagation path characteristics.

<Communication Management Processing in Beamforming Communication Using the Dynamic Map>

Next, the communication management processing in the beamforming communication using the dynamic map will be described with reference to the flowchart of FIG. 25.

In step S191, the control unit 341 determines whether or not the predetermined time has elapsed, and in a case where the predetermined time has elapsed, the processing proceeds to step S192.

In step S192, the road information acquisition unit 351 controls the communication unit 345, accesses the road information distribution server 322, acquires the road information, and supplies the road information, as the traffic information, to the dynamic map generation unit 361 of the control unit 341. By this processing, the dynamic map generation unit 361 acquires the road information corresponding to the information of the third layer in the dynamic map M1 of FIG. 20.

In step S193, the moving body information acquisition unit 352 controls the communication unit 345 to acquire the position information supplied from the vehicle 11 and the pedestrian 14, and supplies the position information as the moving body information to the dynamic map generation unit 361 of the control unit 341. By this processing, the dynamic map generation unit 361 acquires the moving body information corresponding to the information of the fourth layer in the dynamic map M1 of FIG. 20.

In step S194, the dynamic map generation unit 361 reads fixed map information stored in the fixed map information storage unit 342. By this processing, the dynamic map generation unit 361 acquires the fixed map information corresponding to the information of the second layer in the dynamic map M1 of FIG. 20.

In step S195, the dynamic map generation unit 361 reads road map information stored in the road map information storage unit 343. By this processing, the dynamic map generation unit 361 acquires the road map information corresponding to the information of the first layer in the dynamic map M1 of FIG. 20.

In step S196, the dynamic map generation unit 361 generates the dynamic map by using the road map information corresponding to the information of the first layer, the fixed map information corresponding to the information of the second layer, the road information corresponding to the information of the third layer, and the moving body information corresponding to the information of the fourth layer.

In step S197, the control unit 341 controls the communication unit 345 to transmit the dynamic map generated by the dynamic map generation unit 361 to the vehicle 11.

In step S198, the control unit 341 determines whether or not the end is instructed, and in a case where the end is not instructed, the processing returns to step S191.

Furthermore, in step S191, in a case where the predetermined time has not elapsed, the processing of steps S192 to S197 is skipped.

That is, in the server 321, the processing of steps S191 to S198 is repeated until the end is instructed, a dynamic map is generated at a predetermined time interval, and the dynamic map is sequentially transmitted to the vehicle 11.

In step S211, the dynamic map reception unit 382 of the communication management unit 144 in the vehicle 11 controls the communication unit 103 to determine whether or not the dynamic map has been transmitted, and in a case where the dynamic map has been transmitted, the processing proceeds to step S212.

In step S212, the dynamic map reception unit 386 receives the dynamic map via the communication unit 103 and supplies the dynamic map to the communication target determination unit 383 and the propagation path characteristic estimation unit 385.

In step S213, the propagation path characteristic estimation unit 385 predicts the position of the own terminal (transmission terminal) and the position of another terminal (reception terminal), which is a communication target, on the basis of the dynamic map.

More specifically, the communication target determination unit 383 determines the terminal, which is a communication target, from surrounding another terminal on the basis of the dynamic map, and supplies the determination result to the propagation path characteristic estimation unit 385. Furthermore, the own terminal position information acquisition unit 384 supplies the estimation result of the self-position estimation unit 132 to the propagation path characteristic estimation unit 385 as the own terminal position information. Moreover, the position prediction unit 392 supplies the current or future position information predicted on the basis of the route information planned by the route planning unit 161 and the own terminal position information to the propagation path characteristic estimation unit 385.

The propagation path characteristic estimation unit 385 predicts positions of the own terminal information (transmission terminal) and another terminal (reception terminal) on the dynamic map, which is a communication target, on the basis of the position information of the another terminal, which is a communication target, the own terminal position information, and prediction result of the current and future position information.

Note that the position of the own terminal (transmission terminal) identified by the propagation path characteristic estimation unit 385 and the position of another terminal (reception terminal), which is a communication target, can be predicted only from the own terminal position information and the dynamic map. That is, in this case, since the dynamic map itself is a position prediction result, it can be considered that the server 321 itself that generates the dynamic map realizes the function corresponding to the position prediction unit 392. Therefore, the position prediction unit 392 may be omitted.

In step S214, the propagation path characteristic estimation unit 385 acquires the surrounding three-dimensional map corresponding to the own terminal position information and the position information of another terminal, which is a communication target, on the basis of the dynamic map.

In step S215, the propagation path characteristic estimation unit 385 estimates the propagation path characteristics on the basis of the own terminal position information, the position information of the another terminal, which is a communication target, and the surrounding three-dimensional map.

At this time, the propagation path characteristic estimation unit 385 may estimate an assumed reception SINR when the beam steering is performed, and for example, simulate a reception SINR when 360-degree beam steering is performed centering on the own terminal (transmission terminal).

For the simulation, for example, a ray tracing simulation may be used.

Figure 26:
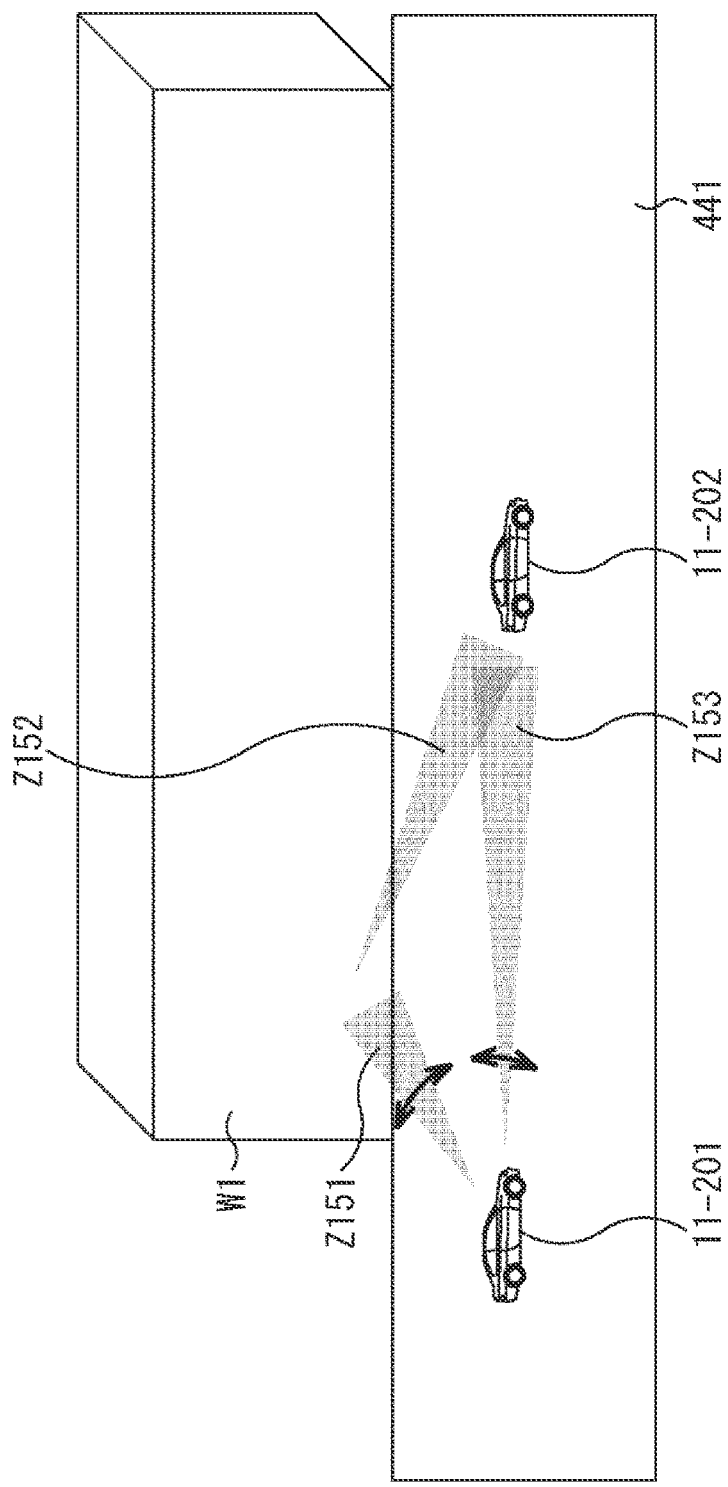
FIG. 26 is a diagram explaining communication management processing in beamforming communication using a dynamic map.

Here, a specific example will be described with reference to FIG. 26. For example, as shown in FIG. 26, a case is considered where vehicles 11-201, 11-202 are traveling on a road 441 along a building W1, which is a wall-like structure, leftward in the drawing and the vehicle 11-201, which is the own terminal, realizes the V2V communication with the vehicle 11-202.

In this case, as a result of estimating propagation path characteristics by a simulation of a reception SINR when 360-degree beam steering is performed centering on the own terminal (transmission terminal), it is recognized that estimated reception SINR by beam steering in the straight direction indicated by a range 2153 is favorable. Furthermore, in a case where beam steering is performed for a range 2151 obtained by displacement of about 45 degrees from the straight direction, it is recognized that the estimated reception SINR is relatively favorable due to a range 2152 caused by the influence of reflection by the building W1.

Therefore, in the case of the propagation path estimation result as shown in FIG. 12, the propagation path characteristic estimation unit 385 determines that a range of about ±15 degrees with respect to the straight direction as indicated by a range Z133 and a range of ±15 degrees about −45 degree direction with respect to the straight direction as indicated by the range 2152 are the ranges for performing beam steering.

In step S216, the propagation path characteristic estimation unit 385 determines the range of beam steering on the basis of the propagation path characteristics, which are the estimation result.

In step S217, the propagation path characteristic estimation unit 385 supplies information of the determined beam steering range to the communication control unit 381. Therefore, the own terminal control unit 393 of the communication control unit 381 controls the communication unit 103 to perform beam steering for the determined range.

In step S218, the communication control unit 381 determines whether or not the end of processing has been instructed, and in a case where the end has not been instructed, the processing returns to S211, and subsequent processing is repeated.

Note that, regarding the simulation, a method other than the above may be used. For example, in a case where that the own terminal (transmission terminal) determines that there is a possibility of being in the NLOS state, as a parameter related to wireless communication, for example, a frequency band may be changed from 6 GHz to 700 MHz to estimate the propagation path characteristics in communicating using a communication resource that is robust for the NLOS state. Furthermore, in the case of realizing robust communication by increasing the transmission power, in a case where the MCS and the like are changed simultaneously, for example, in a case where a change is made from 16QAM to QPSK, in a case where the MIMO is used, in a case where the MIMO is changed to SISO communication, transmission path characteristics may be determined in various ways by a simulation in the above cases, and a communication means may be selected.

By the above processing, it is possible to estimate the propagation path characteristics by simulation using a dynamic map as geographical information, and then select the communication means with the best communication conditions in advance, so that the communication means that ensures the communication state to some extent can be selected and switched at a stage before the communication state is deteriorated, and the communication can be continued.

Thus, a highly reliable communication can be realized.

<Communication Management Processing that Switches Between Beamforming Communication and Another Communication Using the Dynamic Map>

In the above, the description is given of the example of setting the steering range of beamforming using the dynamic map, but in a case where blockage is expected to occur, the beamforming communication may be switched to omnidirectional communication.

Therefore, with reference to the flowchart of FIG. 27, communication management processing for switching between the beamforming communication and another communication using the dynamic map will be described.

Figure 25:
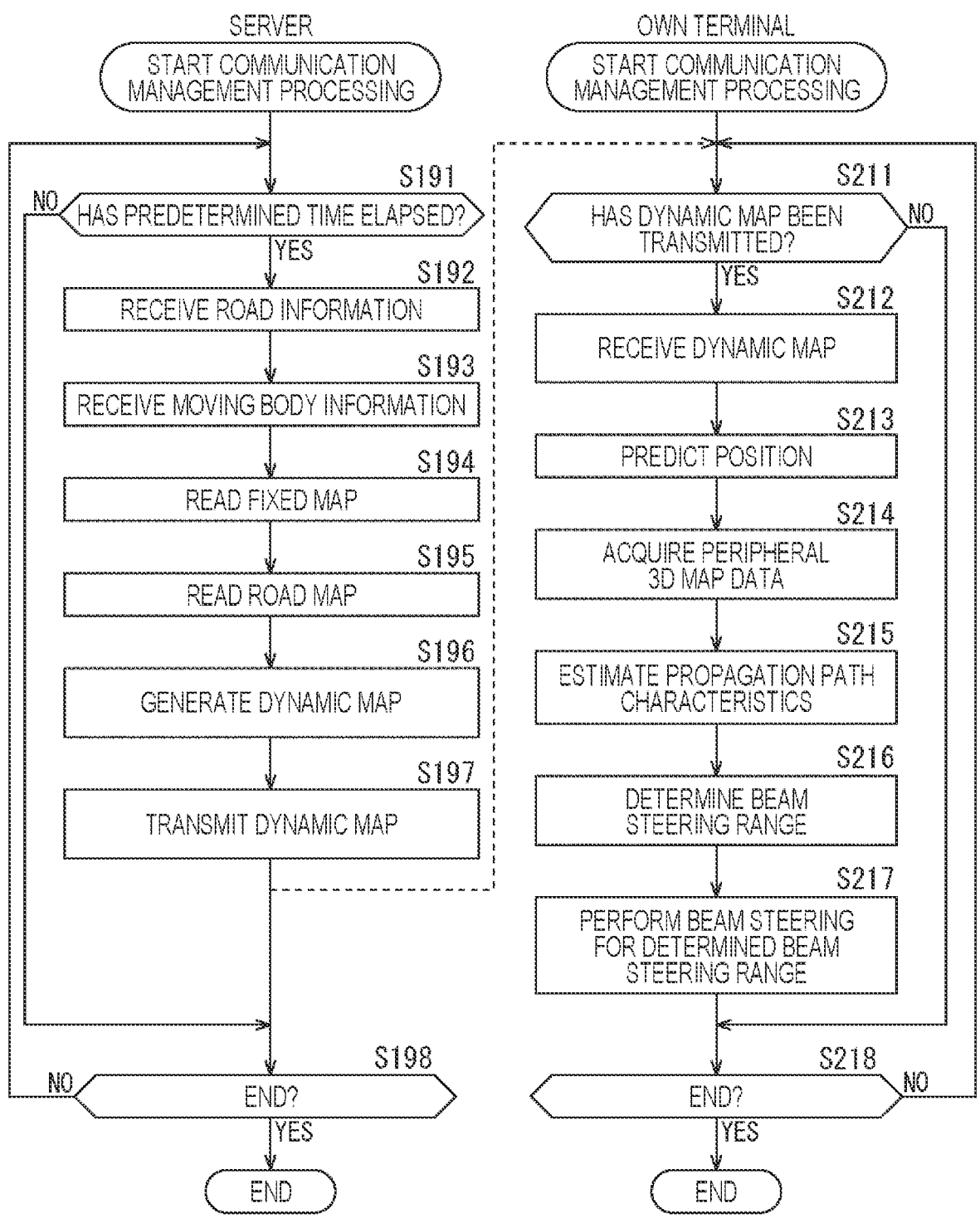
FIG. 25 is a flowchart explaining communication management processing in beamforming communication using a dynamic map.
Figure 27:
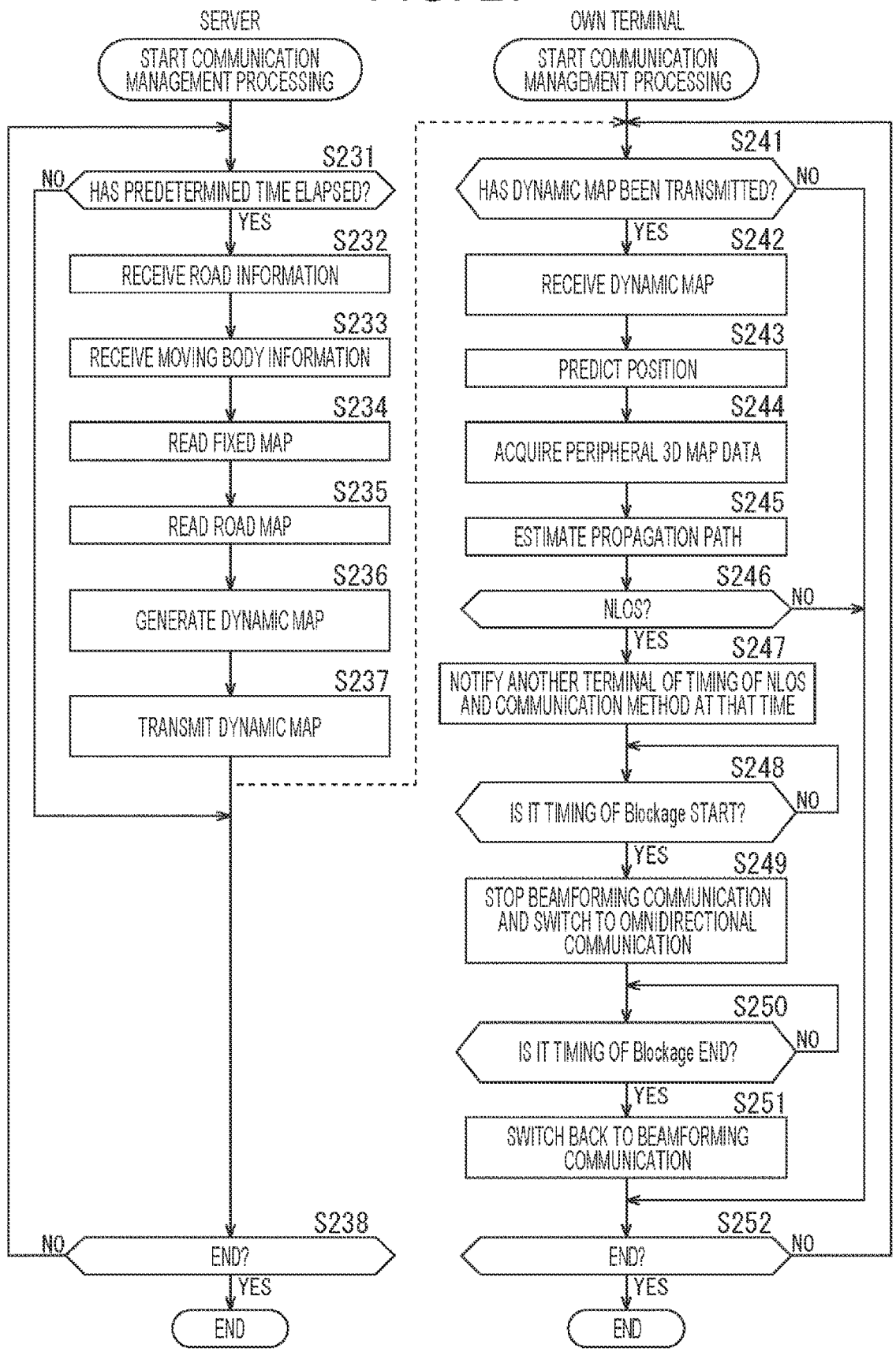
FIG. 27 is a flowchart explaining communication management processing that switches between beamforming communication and another communication using a dynamic map.

Note that since the processing of steps S231 to S238 and steps S241 to S244, S251 in the flowchart of FIG. 27 is the same as the processing of steps S191 to S198 and steps S211 to S214, S218 in FIG. 25, the description thereof will be omitted.

In step S245, the propagation path characteristic estimation unit 385 determines a path loss value in time series when beamforming is performed as the propagation path characteristic estimation using the dynamic map.

In step S246, the propagation path characteristic estimation unit 385 determines whether or not the NLOS state in which the propagation path is blocked occurs on the basis of the time-series moving body information of the vehicle 11, which is a moving body, on the basis of the information of the dynamic map, particularly the information of the fourth layer.

Figure 28:
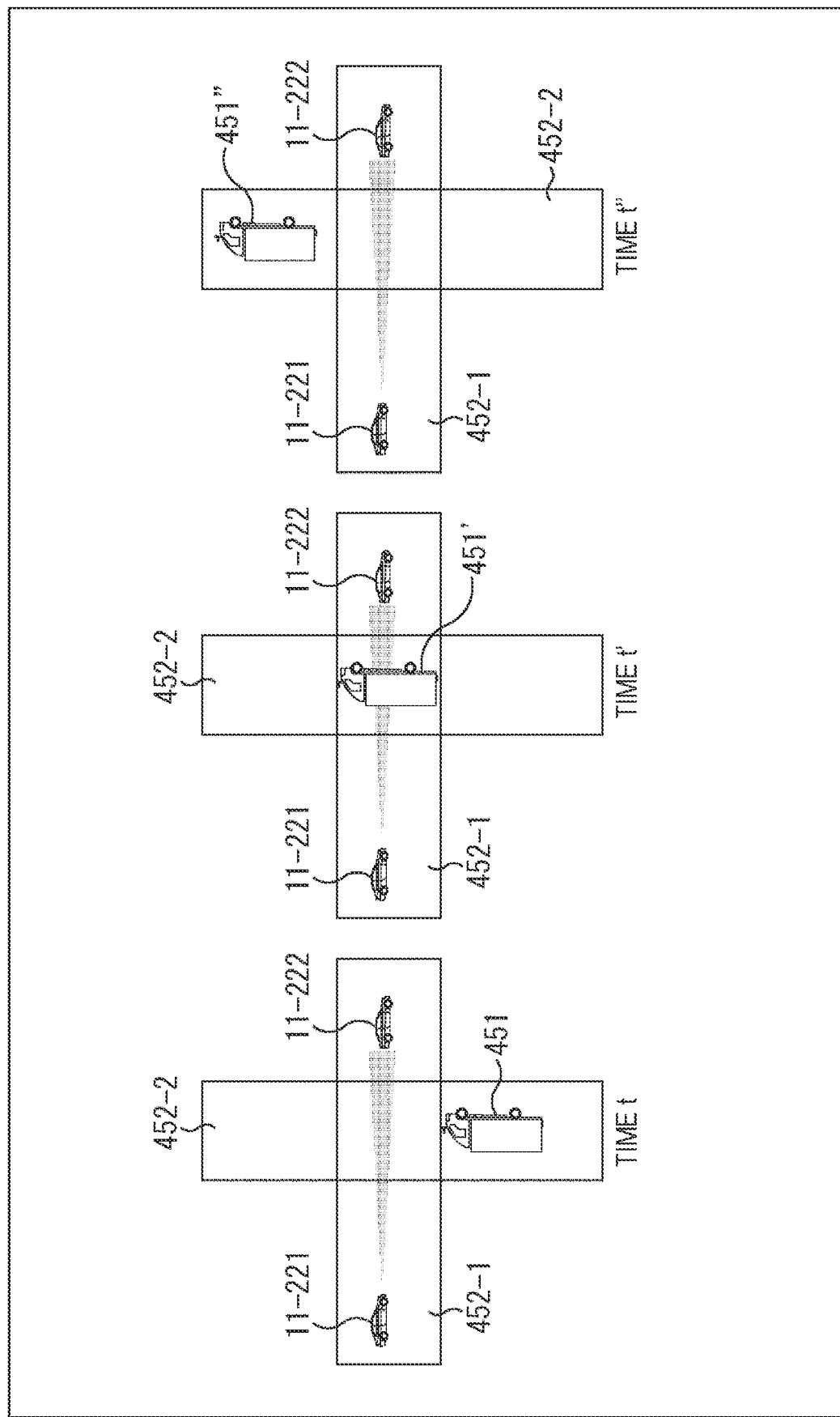
FIG. 28 is a diagram explaining communication management processing that switches between beamforming communication and another communication using a dynamic map.

That is, as shown in the left part of FIG. 28, the case is considered in which, at time t, vehicles 11-221, 11-222 are traveling on a road 452-1 in the drawing rightward in the drawing.

In this case, when the vehicle 11-221, which is the own terminal, is performing beamforming communication with the vehicle 11-222, which is a communication target, there is no obstruction between the vehicles 11-221, 11-222, which is the line of sight (LOS) state. It is thus estimated that the path loss value is favorable.

However, according to the simulation based on the information of the dynamic map, a large truck 451 is traveling upward in the drawing on a road 462-2 orthogonal to a road 462-1. At this time, at time t' when a predetermined time has elapsed from the time t, as shown in the central part of FIG. 28, it is estimated that a large truck 451' interrupts between the vehicles 11-221, 11-222 and the NLOS state occurs due to blockage, and it is estimated that the path loss value at this time would be significantly worsened.

Then, at time t" when time has further passed, as shown in the right part of FIG. 28, a large truck 451" passes between the vehicles 11-221, 11-222, and the NLOS state is cleared. Then, it is estimated that the LOS state with no obstruction on the propagation path is obtained again, and the path loss value is improved.

In such a case, the propagation path characteristic estimation unit 385 considers that the NLOS state occurs, and the processing proceeds to step S247.

In step S247, the propagation path characteristic estimation unit 385 notifies the communication control unit 381 to transmit the information of the start timing of the NLOS state, the timing of the end of the NLOS state, and the information of the communication method in the NLOS state to the vehicle 11-222, which is a communication object, in FIG. 28. Here, for example, a notification of the information instructing stop of the beamforming in the millimeter wave band and switching of the communication method to omnidirectional communication using a low frequency of 6 GHz or less is given.

In response to this notification, the communication control unit 381 controls the communication unit 103 to give a notification of the information of the start timing of the NLOS state, the timing of the end of the NLOS state, and information indicating switching to an omnidirectional communication method in the NLOS state. In this case, for example, the notification is given through a sidelink control channel, which is a control channel in a sidelink.

At this time, the communication management unit 144 of the vehicle 11-222 in FIG. 28 controls the communication unit 103 to receive the information of the start timing of the NLOS state, the timing of the end of the NLOS state, and the information indicating switching to an omnidirectional communication method in the NLOS state.

In step S248, the propagation path characteristic estimation unit 385 determines whether or not the timing of each state is reached, and repeats similar processing until the timing of becoming the NLSO state due to blockage is reached.

In step S248, when the timing of becoming the NLSO state due to blockage is reached, the processing proceeds to step S249.

In step S249, the propagation path characteristic estimation unit 385 sends a command to the communication control unit 381 to stop the beamforming in the millimeter wave band and switch the communication method to omnidirectional communication using a low frequency of 6 GHz or less. Therefore, the own terminal control unit 393 controls the communication unit 103 to stop the beamforming in the millimeter wave band and switch the communication method to omnidirectional communication using a low frequency of 6 GHz or less.

That is, as shown in the central part of FIG. 28, at the time t' when the NLSO state is reached due to blockage, the beamforming in the millimeter wave band is stopped and the communication method is switched to omnidirectional communication using a low frequency of 6 GHz or less.

As a result, even when the large truck 451 cuts in between the vehicles 11-221, 11-222 and the communication path is blocked, the communication can be continued by omnidirectional communication.

In step S250, the propagation path characteristic estimation unit 385 determines whether or not the timing when the NLSO state due to blockage ends is reached, and until the timing when the NLSO state due to blockage ends, similar processing is repeated.

Then, in step S250, when the timing of the end of the NLSO state due to blockage is reached, the processing proceeds to step S251.

In step S251, the propagation path characteristic estimation unit 385 sends a command to the communication control unit 381 to return to the beamforming in the millimeter wave band. Therefore, the own terminal control unit 393 controls the communication unit 103 to return to the beamforming in the millimeter wave band.

Note that the communication management unit 144 of the vehicle 11-222, which is a reception side, also executes processing similar to the processing in steps S248 to S251 on the basis of the information whose notification is given through the sidelink control channel, which is a control channel in a sidelink.

By the above processing, when the dynamic map is used as the geographical information and the NLOS is preliminarily expected to occur on the basis of the information of the moving body in time series, it is possible to preliminarily give a notification to stop the beamforming communication at the timing when the NLOS has occurred and switch to an omnidirectional communication method, so that the communication can be switched to omnidirectional communication only at the timing of being the NLOS.

Note that, in the above, the description is given of the example of setting the beam steering range using the dynamic map and the example of predicting the NLOS state and changing the communication method, but buffer control may be performed using the dynamic map.

That is, by acquiring the position information of peripheral terminals and the information of buffer status of each terminal, they are stored as area buffer status information. Then, the buffer of the own terminal is managed on the basis of available resource information (which may be provided from the base station or may be grasped by sensing) and the buffer status information of the peripheral terminals.

For example, in a case where the buffer status of peripheral terminals is high, the buffer processing (transmission) by the own terminal should be avoided if possible.

On the other hand, in a case where the buffer status of the peripheral terminals is expected to be low in the traveling direction, the buffer of the own terminal should be processed if possible in an area where the buffer status of the peripheral terminals is low.

In either case, it is possible to realize highly reliable communication.

5. Example of Execution by Software

Incidentally, the series of processing described above can be executed by hardware, but it can also be executed by software. In a case where the series of processing is executed by software, a program that constitutes the software is installed, from a recording medium, in a computer incorporated in a dedicated hardware or, for example, in a general-purpose computer and the like that can execute various functions when various programs are installed.

FIG. 29 illustrates a configuration example of a general-purpose computer. This personal computer incorporates a central processing unit (CPU) 1001. An input/output interface 1005 is connected to the CPU 1001 via a bus 1004. A read only memory (ROM) 1002 and a random access memory (RAM) 1003 are connected to the bus 1004.

An input unit 1006 including an input device including a keyboard, a mouse, or the like with which the user inputs an operation command, an output unit 1007 that outputs a processing operation screen or an image of processing results to a display device, a storage unit 1008 including a hard disk drive or the like storing a program or various data, and a communication unit 1009 including a local area network (LAN) adapter or the like and executing communication processing via a network represented by the Internet are connected to the input/output interface 1005. Furthermore, a drive 1010 that reads and writes data with respect to a removable medium 1011, e.g., a magnetic disk (including a flexible disk), an optical disk (including a compact disc-read only memory (CD-ROM), a digital versatile disc (DVD)), a magneto-optical disk (including mini disc (MD)), a semiconductor memory, or the like is connected.

The CPU 1001 executes a program stored in the ROM 1002 or various processing according to a program that is read from the removable medium 1011, e.g., a magnetic disk, an optical disk, a magneto-optical disk, a semiconductor memory, or the like, installed on the storage unit 1008, and loaded on the RAM 1003 from the storage unit 1008. Data or the like required for the CPU 1001 to execute various processing are also stored in the RAM 1003 as appropriate.

In a computer configured in the aforementioned manner, for example, the aforementioned series of processing is carried out by the CPU 1001 loading a program stored in the storage unit 1008 on the RAM 1003 via the input/output interface 1005 and the bus 1004 and executing the program.

The program to be executed by the computer (CPU 1001) can be provided by being recorded on the removable medium 1011, for example, as a package medium or the like. Furthermore, the program can be provided via a wired or wireless transmission medium such as a local area network, the Internet, or digital satellite broadcasting.

In a computer, the program can be installed on the storage unit 1008 via the input/output interface 1005 by mounting the removable medium 1011 on the drive 1010. Furthermore, the program can be received by the communication unit 1009 via a wired or wireless transmission medium and installed on the storage unit 1008. In addition, the program can be pre-installed on the ROM 1002 or the storage unit 1008.

Note that the program executed by the computer may be a program that is processed in chronological order along the order described in the present description or may be a program that is processed in parallel or at a required timing, for example, when call is carried out.

Note that the CPU 1001 in FIG. 29 realizes the functions of the automatic driving control unit 112 of FIGS. 3 and 4.

Furthermore, in the present description, the system means a cluster of a plurality of constituent elements (an apparatus, a module (component) or the like), and it does not matter whether or not all the constituent elements are present in the same enclosure. Therefore, a plurality of apparatuses that is housed in different casings and connected by network, and a single apparatus in which a plurality of modules is housed in a single casing are both the system.

Note that an embodiment of the present disclosure is not limited to the aforementioned embodiment, and various changes may be made within a scope without departing from the gist of the present disclosure.

For example, the present disclosure can adopt a configuration of cloud computing in which one function is shared and cooperatively processed by a plurality of apparatuses via a network.

Furthermore, each step described in the above-described flowcharts can be executed by a single apparatus or shared and executed by a plurality of apparatuses.

Moreover, in a case where a single step includes a plurality of pieces of processing, the plurality of pieces of processing included in the single step can be executed by a single apparatus or can be divided and executed by a plurality of devices.

Note that the present disclosure may also adopt the configuration described below.

<1> A control apparatus including:
a position prediction unit that predicts a position of an own terminal having a communication function;
an information acquisition unit that acquires geographic information around the position of the own terminal predicted by the position prediction unit; and
a communication control unit that controls communication between the own terminal and another terminal having the communication function other than the own terminal on the basis of the geographic information.

<2> The control apparatus according to <1>, further including:
another terminal position information acquisition unit that acquires position information of the another terminal at predetermined time intervals; and
an own terminal position information acquisition unit that acquires position information of the own terminal at predetermined time intervals, in which
the position prediction unit predicts a current or future position of the own terminal on the basis of the position information of the own terminal and the position information of the another terminal.

<3> The control apparatus according to <1> or <2>, in which the communication control unit controls the communication by setting communication parameters of the communication.

<4> The control apparatus according to any of <1> to <3>, in which the communication control unit controls the communication by setting a configuration of a communication link of the communication.

<5> The control apparatus according to any of <1> to <4>, in which the communication control unit controls the communication by setting a beam steering range of beamforming of the communication.

<6> The control apparatus according to any of <1> to <5>, in which the communication control unit controls the communication by setting relay communication of the communication.

<7> The control apparatus according to any of <1> to <6>, in which the communication control unit controls the communication by setting to switch a communication method of the communication at a timing when blockage in the communication occurs according to presence or absence of occurrence of the blockage in the communication based on the geographic information around the own terminal.

<8> The control apparatus according to <7>, in which in a case where the communication method of the communication is beamforming communication, the communication control unit controls the communication by setting to switch the communication method to relay communication at the timing when the blockage occurs.

<9> The control apparatus according to any of <1> to <8>, further including
a mapping table storage unit that stores a mapping table in which communication information including a communication result of the own terminal and the another terminal is mapped in association with position information, in which
the communication control unit refers to the mapping table on the basis of the geographic information around the own terminal and controls the communication on the basis of optimum communication information among corresponding communication information.

<10> The control apparatus according to <9>, in which the mapping table is generated by being mapped in association with position information from a database in which the position information, a communication type, parameters, and communication quality are registered and that relates to transmission and reception between the own terminal and the another terminal by another information processing apparatus.

<11> The control apparatus according to any of <1> to <8>, further including
a propagation path characteristic estimation unit that estimates propagation path characteristics of the communication on the basis of a three-dimensional map as the geographic information around the own terminal, in which
the communication control unit controls the communication on the basis of the propagation path characteristics estimated by the propagation path characteristic estimation unit.

<12> The control apparatus according to <11>, in which the communication control unit controls the communication by setting a beam steering range of the communication on the basis of the propagation path characteristics estimated by the propagation path characteristic estimation unit.

<13> The control apparatus according to <11>, in which the communication control unit controls the communication by setting to switch a communication method at a timing when blockage in the communication occurs based on the propagation path characteristics estimated by the propagation path characteristic estimation unit.

<14> The control apparatus according to <13>, in which in a case where the communication method is beamforming communication, the communication control unit controls the communication by setting to switch the communication method to an omnidirectional communication method at the timing when the blockage occurs.

<15> The control apparatus according to <11>, in which the three-dimensional map includes a dynamic map including a plurality of layers according to a level of change with time.

<16> The control apparatus according to <15>, in which
the dynamic map is generated by another information processing apparatus,
the control apparatus further includes a dynamic map acquisition unit that acquires the dynamic map generated by the another information processing apparatus, and
the propagation path characteristic estimation unit estimates the propagation path characteristics of the communication on the basis of the dynamic map acquired by the dynamic map acquisition unit.

<17> A control method including:
position prediction processing of predicting a position of an own terminal having a communication function;
information acquisition processing of acquiring geographic information around the position of the own terminal predicted by the position prediction processing; and
control processing of controlling communication between the own terminal and another terminal having the communication function other than the own terminal on the basis of the geographic information.

<18> A program causing a computer to function as:
a position prediction unit that predicts a position of an own terminal having a communication function;
an information acquisition unit that acquires geographic information around the position of the own terminal predicted by the position prediction unit; and
a communication control unit that controls communication between the own terminal and another terminal having the communication function other than the own terminal on the basis of the geographic information.

<19> A vehicle including:
a position prediction unit that predicts a position of an own terminal having a communication function;
an information acquisition unit that acquires geographic information around the position of the own terminal predicted by the position prediction unit;
a communication control unit that controls communication between the own terminal and another terminal having the communication function other than the own terminal on the basis of the geographic information; and
a vehicle control unit that controls an operation of the vehicle on the basis of information acquired by the communication function.

REFERENCE SIGNS LIST 11, 11-1 to 11-$n$ Vehicle
12, 12-1 to 12-$m$ RSU
13 Network
14 Pedestrian
31 Base station
103 Communication unit
112 Automatic driving control unit
131 Detection unit
132 Self-position estimation unit
144 Communication management unit
134 Planning unit 345
161 Route planning unit
211 Communication control unit
212 Another terminal information acquisition unit
213 Another terminal information storage unit
214 Own terminal position information acquisition unit
215 Own terminal position information storage unit
221 Own terminal information transmission unit
222 Position prediction unit
223 Own terminal control unit
224 Communication establishment unit
231 Control unit
232 Communication unit
233 Storage unit
241 Communication control unit
251 Own terminal information transmission unit
252 Own terminal control unit
253 Communication establishment unit
271 Server
281 Control unit
282 Communication unit
283 Communication information database storage unit
283 Mapping table storage unit
291 Communication information database generation unit
292 Mapping table generation unit
221 Own terminal information transmission unit
222 Position prediction unit
223 Own terminal control unit
224 Communication establishment unit
301 Communication control unit
302 Mapping table storage unit
311 Own terminal information transmission unit
312 Position prediction unit
313 Own terminal control unit
314 Communication establishment unit
315 Mapping table acquisition unit
321 Server
341 Control unit
342 Fixed map information storage unit
343 Road map information storage unit
344 Dynamic information acquisition unit
345 Communication unit
351 Road information acquisition unit
352 Moving body information acquisition unit
361 Dynamic map generation unit
381 Communication control unit
382 Dynamic map reception unit 383 Communication target determination unit
384 Own terminal position information acquisition unit
385 Propagation path characteristic estimation unit
391 Own terminal information transmission unit
392 Position prediction unit
393 Own terminal control unit
394 Communication establishment unit

The invention claimed is:

1. A control apparatus, comprising:
a position prediction unit configured to predict a position of a first terminal having a communication function;
an information acquisition unit configured to acquire geographic information around the predicted position of the first terminal; and
a communication control unit configured to:
set a beam steering range of beamforming of communication between the first terminal and a second terminal having the communication function, wherein the first terminal is different from the second terminal; and
control the communication between the first terminal and the second terminal based on the geographic information and the set beam steering range of the beamforming.

2. The control apparatus according to claim 1, further comprising:
a first terminal position information acquisition unit configured to acquire position information of the first terminal at first time intervals; and
a second terminal position information acquisition unit configured to acquire position information of the second terminal at second time intervals,
wherein the position prediction unit is further configured to predict at least one of a current position or a future position of the first terminal based on the position information of the first terminal and the position information of the second terminal.

3. The control apparatus according to claim 1, wherein the communication control unit is further configured to:
set communication parameters of the communication; and
control the communication based on the set communication parameters.

4. The control apparatus according to claim 1, wherein the communication control unit is further configured to:
set a configuration of a communication link of the communication; and
control the communication based on the set configuration of the communication link.

5. The control apparatus according to claim 1, wherein the communication control unit is further configured to:
set relay communication of the communication; and
control the communication based on the set relay communication.

6. The control apparatus according to claim 1, wherein the communication control unit is further configured to:
switch a communication method of the communication at a timing of occurrence of a blockage in the communication, wherein presence or absence of the occurrence of the blockage in the communication is based on the geographic information around the first terminal; and
control the communication based on the switched communication method.

7. The control apparatus according to claim 6, wherein in a case where the communication method of the communication is beamforming communication, the communication control unit is further configured to:
switch the communication method to relay communication at the timing of the occurrence of the blockage; and
control the communication based on the relay communication.

8. The control apparatus according to claim 1, further comprising a mapping table storage unit configured to store a mapping table in which communication information including a communication result of the first terminal and the second terminal is mapped in association with position information of the first terminal, wherein
the communication control unit is further configured to:
refer to the mapping table based on the geographic information around the first terminal; and
control the communication based on optimum communication information corresponding to the communication information.

9. The control apparatus according to claim 8, wherein
the mapping table is generated based on a database in which the position information, a communication type, parameters, and communication quality are registered, and
the database is related to transmission and reception between the first terminal and the second terminal.

10. The control apparatus according to claim 1, further comprising a propagation path characteristic estimation unit configured to estimate propagation path characteristics of the communication based on a three-dimensional map as the geographic information around the first terminal, wherein
the communication control unit is further configured to control the communication based on the estimated propagation path characteristics.

11. The control apparatus according to claim 10, wherein the communication control unit is further configured to:
set the beam steering range of the communication based on the estimated propagation path characteristics; and
control the communication based on the set beam steering range.

12. The control apparatus according to claim 10, wherein the communication control unit is further configured to:
switch, based on the estimated propagation path characteristics, a communication method at a timing of occurrence of a blockage in the communication; and
control the communication based on the switched communication method.

13. The control apparatus according to claim 12, wherein in a case where the communication method is beamforming communication, the communication control unit is further configured to:
switch the communication method to an omnidirectional communication method at the timing of the occurrence of the blockage; and
control the communication based on the omnidirectional communication method.

14. The control apparatus according to claim 10, wherein
the three-dimensional map includes a dynamic map, and
the dynamic map includes a plurality of layers based on a level of change associated with the plurality of layers with time.

15. The control apparatus according to claim 14, wherein
the dynamic map is generated by an information processing apparatus,
the control apparatus further includes a dynamic map acquisition unit configured to acquire the dynamic map generated by the information processing apparatus, and the propagation path characteristic estimation unit is further configured to estimate the propagation path characteristics of the communication based on the acquired dynamic map.

16. A control apparatus, comprising:
a position prediction unit configured to predict a position of a first terminal having a communication function;
an information acquisition unit configured to acquire geographic information around the predicted position of the first terminal; and
a communication control unit configured to:
control, based on the geographic information, communication between the first terminal and a second terminal having the communication function, wherein the first terminal is different from the second terminal;
in a case where a communication method of the communication is beamforming communication, switch the communication method to relay communication at a timing of occurrence of a blockage in the communication, wherein presence or absence of the occurrence of the blockage in the communication is based on the geographic information around the first terminal; and
control the communication based on the relay communication.

17. A control apparatus, comprising:
a position prediction unit configured to predict a position of a first terminal having a communication function;
an information acquisition unit configured to acquire geographic information around the predicted position of the first terminal;
a communication control unit configured to control, based on the geographic information, communication between the first terminal and a second terminal having the communication function, wherein the first terminal is different from the second terminal; and
a propagation path characteristic estimation unit configured to estimate propagation path characteristics of the communication based on a three-dimensional map as the geographic information around the first terminal,
wherein the communication control unit is further configured to:
set a beam steering range of the communication based on the estimated propagation path characteristics; and
control the communication based on the set beam steering range of the communication.

* * * * *